United States Patent
Pintauro et al.

(10) Patent No.: US 9,350,036 B2
(45) Date of Patent: May 24, 2016

(54) COMPOSITE MEMBRANES, METHODS OF MAKING SAME, AND APPLICATIONS OF SAME

(75) Inventors: Peter N. Pintauro, Brentwood, TN (US); Andrew Park, Nashville, TN (US); Jason Ballengee, Cedar Hill, TX (US)

(73) Assignee: VANDERBILT UNIVERSITY, Nashville, TN (US)

( * ) Notice: Subject to any disclaimer, the term of this patent is extended or adjusted under 35 U.S.C. 154(b) by 729 days.

(21) Appl. No.: 13/567,857

(22) Filed: Aug. 6, 2012

(65) Prior Publication Data
US 2014/0349213 A1    Nov. 27, 2014

Related U.S. Application Data

(60) Provisional application No. 61/515,804, filed on Aug. 5, 2011.

(51) Int. Cl.
*H01M 8/10* (2006.01)

(52) U.S. Cl.
CPC ............ *H01M 8/1044* (2013.01); *H01M 8/109* (2013.01); *H01M 8/1023* (2013.01); *H01M 8/1032* (2013.01); *H01M 8/1039* (2013.01); *H01M 8/1053* (2013.01); *H01M 8/1067* (2013.01); *H01M 8/1081* (2013.01); *H01M 2008/1095* (2013.01); *H01M 2250/20* (2013.01); *H01M 2300/0082* (2013.01); *H01M 2300/0091* (2013.01); *H01M 2300/0094* (2013.01);
(Continued)

(58) Field of Classification Search
CPC ............ H01M 8/1044; H01M 8/1081; H01M 8/1053; H01M 8/1067; H01M 8/109; H01M 8/1023; H01M 8/1032; H01M 8/1039

USPC .......................................... 429/492; 264/460
See application file for complete search history.

(56) References Cited

U.S. PATENT DOCUMENTS 5,919,583 A    7/1999    Grot et al.

FOREIGN PATENT DOCUMENTS

CN    1873064 A    12/2006
CN    101685232 A    3/2010

OTHER PUBLICATIONS

Lee, K.M. et al., Nafion Nanofiber Membranes, 2009, ECS Transactions, vol. 25, pp. 1451-1458.*
(Continued)

*Primary Examiner* — Kaire O'Neill Apicella
(74) *Attorney, Agent, or Firm* — Locke Lord LLP; Tim Tingkang Xia, Esq.

(57) ABSTRACT

In one aspect of the present invention, a method of fabricating a composite membrane includes: forming a first polymer solution from a first polymer and a second polymer solution from a second polymer, respectively, where the first polymer includes a charged polymer and the second polymer includes an uncharged polymer; electrospinning, separately and simultaneously, the first and second polymer solutions to form a dual fiber mat with first polymer fibers and second polymer fibers; and processing the dual fiber mat by softening and flowing one of the first or second polymer fibers to fill in the void space between the other of the first and second polymer fibers so as to form the composite membrane. In some embodiments, the composite membrane may be a proton exchange membrane (PEM) or an anion exchange membrane (AEM).

20 Claims, 18 Drawing Sheets

(52) U.S. Cl.
CPC ............... *Y02E60/521* (2013.01); *Y02P 70/56* (2015.11); *Y02T 90/32* (2013.01)

(56) References Cited

OTHER PUBLICATIONS

Choi, J. et al., Nanofiber composite membranes with low equivalent weight perfluorosulfonic acid polymers, Jun. 14, 2010, Journal of Materials Chemistry, 20, 6282-6290.*
Ballengee, J.B. and Peter N. Pintauro, Composite Fuel Cell Membranes from Dual-Nanofiber Electrospun Mats, 2011, ACS Publications, Macromolecules 44, 7307-7314.*
S. J. Hamrock, Yandrastis, Michael A., Polymer Reviews, 46, 219 (2006).
X. L. Zhu, Yuxiu, Liu; Zhu, Lei, in Polymer Membranes for Fuel Cells, S. M. J. M. Zaidi, Takeshi Editor, Spring. Science+Business Media, LLC, New York (2009).
K. D. Kreuer, Journal of Membrane Science, 185, 29 (2001).
S. J. Hamrock, DOE Annual Progres Report: Membranes and MEAs for Dry, Hot Operating Conditions, in (2009).
C. C. de Araujo, K. D. Kreuer, M. Schuster, G. Portale, H. Mendil-Jakani, G. Gebel and J. Maier, Phys. Chem. Chem. Phys., 11, 3305 (2009).
M. Schuster, C. C. de Araujo, V. Atanasov, H. T. Andersen, K. D. Kreuer and J. Maier, Macromolecules, 42, 3129 (2009).
X. Y. Huang, R. Solasi, Y. Zou, M. Feshler, K. Reifsnider, D. Condit, S. Burlatsky and T. Madden, J Polym. Sci. Pt. BPolym. Phys., 44, 2346 (2006).
H. Tang, S. Peikang, S. P. Jiang, F. Wang and M. Pan, Journal of Power Sources, 170, 85 (2007).
J. B. Ballengee and P. N. Pintauro, "Nanofiber Composite Proton Exchange Membranes Fabricated by Dual-Fiber Electrospinning," Advanced Functional Materials, Submitted (2011).
B. Loppinet, G. Gebel and C. E. Williams, The Journal of Physical Chemistry B, 101, 1884 (1997).
J. B. Ballengee and P. N. Pintauro, J Electrochem. Soc., 158, B568 (2011).
H. Chen, J. D. Snyder and Y. A. Elabd, Macromolecules, 41, 128 (2008).
K. A. Page, F. A. Landis, A. K. Phillips and R. B. Moore, Macromolecules, 39, 3939 (2006).
A. Kusoglu, A. M. Karlsson, M. H. Santare, S. Cleghorn and W. B. Johnson, Journal of Power Sources, 170, 345 (2007).
C. G. Arges, The Electrochemical Society Interface, 19, 31 (2010).
B. Y. S. Lin, D. W. Kirk and S. J. Thorpe, J. Power Sources, 161, 474 (2006).
J. R. Varcoe and R. C. T. Slade, Fuel Cells, 5, 187 (2005).
Q. A. Zhang, Q. F. Zhang, J. H. Wang, S. B. Zhang and S. H. Li, Polymer, 51, 5407 (2010).
V. V. Shevchenko and M. A. Gumennaya, Theor. Exp. Chem., 46, 139 (2010).
M. R. Hibbs, M. A. Hickner, T. M. Alam, S. K. McIntyre, C. H. Fujimoto and C. J. Cornelius, Chem Mater, 20, 2566 (2008).
D. P. Tang, J. Pan, S. F. Lu, L. Zhuang and J. T. Lu, Sci. China-Chem., 53, 357 (2010).
S. Gu, R. Cai, T. Luo, Z. W. Chen, M. W. Sun, Y. Liu, G. H. He and Y. S. Van, Angew. Chem.—Int. Edit., 48, 6499 (2009).
S. Gu, R. Cai, T. Luo, K. Jensen, C. Contreras and Y. S. Van, ChemSusChem, 3, 555 (2010).
S. Gu, R. Cai and Y. S. Van, Chem. Commun., 47, 2856 (2011).
J. H. Wang, S. H. Li and S. B. Zhang, Macromolecules, 43, 3890 (2010).
J. Pan, S. F. Lu, Y. Li, A. B. Huang, L. Zhuang and J. T. Lu, Adv. Funct. Mater., 20, 312 (2010).
G. G. Wang, Y. M. Weng, D. Chu, R. R. Chen and D. Xie, J. Membr. Sci., 332, 63 (2009).
J. F. Zhou, M. Unlu, J. A. Vega and P. A. Kohl, J Power Sources, 190, 285 (2009).
M. Tanaka, M. Koike, K. Miyatake and M. Watanabe, Macromolecules, 43, 2657 (2010).
Q. A. Zhang, S. H. Li and S. B. Zhang, Chem. Commun., 46, 7495 (2010).
Z. Zhao, J. H. Wang, S. H. Li and S. B. Zhang, J. Power Sources, 196, 4445 (2011).
J. H. Wang, J. Wang, S. H. Li and S. B. Zhang, J. Membr. Sci., 368, 246 (2011).
J. L. Yan and M. A. Hickner, Macromolecules, 43, 2349 (2010).
M. Tanaka, M. Koike, K. Miyatake and M. Watanabe, Polym. Chem., 2, 99 (2011).
M. R. Hibbs, C. H. Fujimoto and C. J. Cornelius, Macromolecules, 42, 8316 (2009).
J. Choi, K. M. Lee, R. Wycisk, P. N. Pintauro and P. T. Mather, Abstr. Pap. Am. Chem. Soc., 237, 99 (2009).
J. B. Ballengee, P.N. Pintauro, Adv. Funct. Mater., In Press (2011).
E. Avram, E. Butuc, C. Luca and 1. Druta, J. Macromol. Sci.I-Pure Appl. Chem., A34, 1701 (1997).
Wu, J.; Yuan, X. Z.; Martin, J. J.; Wang, H.; Zhang, J.; Shen, J.; Wu, S.; Merida, W., Journal of Power Sources 2008, 184, (1), 104-119.
Kusoglu, A.; Karlsson, A. M.; Santare, M. H.; Cleghorn, S.; Johnson, W. B., Journal of Power Sources 2006, 161, (2), 987-996.
Patil, Y. P.; Jarrett, W. L.; Mauritz, K. A., Journal of Membrane Science in Press, Corrected Proof.
Kundu, S.; Simon, L. C.; Fowler, M.; Grot, S., Polymer 2005, 46, (25), 11707-11715.
Bauer, F.; Denneler, S.; Willert-Porada, M., Journal of Polymer Science Part B: Polymer Physics 2005, 43, (7), 786-795.
Sethuraman, V. A.; Weidner, J. W.; Haug, A. T.; Protsailo, L. V., In ECS: 2008; vol. 155, pp. B119-B124.
Kerres, J. A., Fuel Cells 2005, 5, (2), 230-247.
State Intellectual Property Office of P.R. China, Office Action for Chinese Application No. 201180062942.7, issued on Jun. 9, 2014.
Taylor, E. P.; Landis, F. A.; Page, K. A.; Moore, R. B., Polymer 2006, 47, (21), 7425-7435.
Landis, F. A.; Moore, R. B., Macromolecules 2000, 33, (16), 6031-6041.
Kyu, T.; Yang, J. C., Macromolecules 1990, 23, (1), 176-182.
Yang, J. C.; Kyu, T., Macromolecules 1990, 23, (1), 182-186.
Song, M.-K.; Kim, Y.-T.; Fenton, J. M.; Kunz, H. R.; Rhee, H.-W., Journal of Power Sources 2003, 117, (1-2), 14-21.
Kolde, J. A.; Bahar, B.; Wilson, M. S.; Zawodzinski, T. A.; Gottesfeld, S., Electrochemical Society Proceedings 1995, 95-23, 193-201.
Choi, J.; Lee, K. M.; Wycisk, R.; Pintauro, P. N.; Mather, P. T., Macromolecules 2008, 41, (13), 4569-4572.
Choi, J.; Lee, K. M.; Wycisk, R.; Pintauro, P. N.; Mather, P. T., Journal of the Electrochemical Society 2010, 157, (6), B914-B919.
Choi, J.; Lee, K. M.; Wycisk, R.; Pintauro, P. N.; Mather, P. T., Journal of Materials Chemistry 2010, 20, (30), 6282-6290.
Choi, J.; Wycisk, R.; Zhang, W. J.; Pintauro, P. N.; Lee, K. M.; Mather, P. T., Chemsuschem 2010, 3, (11), 1245-1248.
Lee, K. M.; Choi, J.; Wycisk, R.; Pintauro, P. N.; Mather, P., In ECS: 2009; vol. 25, pp. 1451-1458.
Muldoon,. J.; Lin, J.; Wycisk, R.; Takeuchi, N.; Hamaguchi, H.; Saito, T.; Hase, K.; Stewart, F. F.; Pintauro, P. N., Fuel Cells 2009, 9, (5), 518-521.
Chen, H.; Snyder, J. D.; Elabd, Y. A., Macromolecules 2008, 41, (1), 128-135.
Laforgue, A.; Robitaille, L.; Mokrini, A.; Ajji, A., Macromolecular Materials and Engineering 2007, 292, (12), 1229-1236.
Zhou, C. S.; Liu, Z.; Dai, 1. Y.; Xiao, D., Analyst 2010, 135, (5), 1004-1009.
Osborn, S. J..; Hassan, M. K.; Divoux, G. M.; Rhoades, D. W.; Mauritz, K. A.; Moore, R. B., Macromolecules 2007, 40, (10), 3886-3890.
Dong, B.; Gwee, L.; Salas-de la Cruz, D.; Winey, K. 1.; Elabd, Y. A, Nano Letters 2010, 10, (9), 3785-3790.
McLachlan, D. S.; Blaszkiewicz, M.; Newnham, R, Journal of the American Ceramic Society, 1990, 73, (8), 2187-2203.
Lin, J.; Lee, J. K.; Kellner, M.; Wycisk, R; Pintauro, P. N., Journal of the Electrochemical Society 2006, 153, (7), A1325-A1331.
Cleghorn, S.; Kolde, J.; Liu, W., Handbook of Fuel Cells—Fundamentrals, Technology and Applications, Vielstich, W.; Lamm, A.; Gasteiger, H. A, Eds. John Wiley & Sons, Ltd: Chichester, 2003; vol. 3, pp. 566-575.

(56) References Cited

OTHER PUBLICATIONS

Tang, Y. L.; Karlsson, AM.; Santare, M. H.; Gilbert, M.; Cleghorn, S.; Johnson, W. B., Materials Science and Engineering a—Structural Materials Properties Microstructure and Processing 2006, 425, (1-2), 297-304.

de Bruijn, F. A; Dam, V. A. T.; Janssen, G. J. M., Fuel Cells 2008, 8, (1), 3-22.

* cited by examiner (a)

(b)

(a)

(b)

(a)

(b)

COMPOSITE MEMBRANES, METHODS OF MAKING SAME, AND APPLICATIONS OF SAME

CROSS-REFERENCE TO RELATED PATENT APPLICATIONS

This application claims priority to and the benefit of, pursuant to 35 U.S.C. §119(e), U.S. provisional patent application Ser. No. 61/515,804, filed Aug. 5, 2011, entitled "NANOFIBER/NANOCAPILLARY NETWORK PROTON EXCHANGE MEMBRANE, MAKING OF SAME, AND APPLICATIONS OF SAME," by Peter N. Pintauro and Andrew Park, the disclosure of which is incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [43] represents the 43th reference cited in the reference list, namely, J. Choi, K. M. Lee, R. Wycisk, P. N. Pintauro and P. T. Mather, *Abstr. Pap. Am. Chem. Soc.*, 237, 99 (2009).

STATEMENT AS TO RIGHTS UNDER FEDERALLY-SPONSORED RESEARCH

This invention was made with government support under grant number DE-FG36-06GO16030 awarded by the Department of Energy, grant number W911NF-11-1-0454 awarded by the U.S. Army, and grant number CBET-1032948 awarded by the National Science Foundation. The government has certain rights in the invention.

FIELD OF THE INVENTION

The present invention relates generally to nanotechnologies, and more particularly to nanocomposite membranes, methods of making the same, and applications of the same.

BACKGROUND OF THE INVENTION

Fossil fuels are currently the predominant source of energy in the world. Due to concerns such as carbon dioxide emissions and the finite nature of the supply of fossil fuel, research and development and commercialization of alternative sources of energy have grown significantly over the preceding decades. One focus of research and development is hydrogen fuel cells, which can quietly and efficiently generate electrical power while producing only heat and water as significant byproducts.

One type of hydrogen fuel cell is a proton exchange membrane (PEM) fuel cell. A PEM is a membrane generally made from an ionomer and designed to conduct protons while being impermeable to gases such as oxygen or hydrogen. PEM fuel cells have potential to replace internal combustion engines, the current dominant source of energy for motor vehicles and other such mobile propulsion applications. At the anode electrode of a PEM fuel cell, hydrogen molecules are oxidized to hydrogen ions, i.e., protons, and electrons. The protons permeate across a polymer membrane that acts as an electrolyte (the PEM) while the electrons flow through an external circuit and produce electric power. At the cathode of a hydrogen/air fuel cell, oxygen reacts with electrons and protons that migrate across the PEM to produce water. Thus, in the past decade, research and development has focused on the membrane composition and structure of the PEM and methods of forming the PEM, where the PEM structure is robust and the manufacturing process thereof is simplified.

Alkaline anion-exchange membrane fuel cells (AAEM-FCs) are a potentially significant technology that could compete with the more popular and well-studied PEM fuel cells for a variety of applications [22]. The alkaline anion exchange membrane (AEM or AAEM) is a membrane generally made from ionomers with positively charged fixed ion-exchange sites and designed to conduct anions while being impermeable to gases such as oxygen or hydrogen. During alkaline fuel cell operation, the membrane conducts hydroxide ions. A fundamental drawback of all AEMs is the fact that hydroxide anions have a lower inherent mobility than protons which adversely affects ionic conduction in an AEM [27]. To compensate for these two problems, membrane researchers have focused their attention on the use of high ion-exchange capacity polymers, but this strategy exacerbates the problems of membrane brittleness in the dry state and poor mechanical strength when the membrane is fully hydrated [28].

Therefore, a heretofore unaddressed need exists in the art to address the aforementioned deficiencies and inadequacies.

SUMMARY OF THE INVENTION

One aspect of the present invention relates to a method of fabricating a composite membrane, which includes: forming an uncharged (or minimally charged) polymer solution and a polyelectrolyte (ionomer) solution, respectively, electrospinning, separately and simultaneously, the polyelectrolyte (ionomer) solution and the uncharged (or minimally charged) polymer solution to form polyelectrolyte (ionomer) fibers and uncharged (or minimally charged) polymer fibers, forming a dual fiber mat with the polyelectrolyte fibers and the uncharged (or minimally charged) polymer fibers and processing the dual fiber mat by either: (a) softening and flowing the polyelectrolyte (inoomer) fibers to fill in the void space between the uncharged (or minimally charged) polymer fibers so as to form the composite membrane or (b) softening and flowing the uncharged (or minimally charged) polymer fibers to fill the void space between the polyelectrolyte (ionomer) fibers. In some embodiments, the composite membrane may be a nanofiber-based cation-exchange membrane (a PEM) or a nanofiber-based anion-exchange membrane (an AEM).

In one embodiment, the forming of the uncharged (or minimally charged) polymer solution and the polyelectrolyte solution includes dissolving an uncharged (or minimally charged) polymer in a first solvent to form the uncharged (or minimally charged) polymer solution and dissolving a polyelectrolyte in a second solvent to form the polyelectrolyte solution.

In one embodiment, the processing of the dual fiber mat includes compressing the dual fiber mat and thermal annealing the dual fiber mat to soften and flow perfluorosulfonic acid ionomer fibers to fill in the void space between the uncharged (or minimally charged) polymer fibers.

In another embodiment, the processing of the dual fiber mat includes interconnecting the uncharged (or minimally charged) polymer fibers.

In one embodiment, the method may further include increasing density of the uncharged (or minimally charged) polymer fibers in the dual fiber mat by mechanically compressing the mat.

In another aspect, the present invention relates to a composite membrane. In one embodiment, the composite membrane includes a network of uncharged (or minimally charged) polymer fibers and a polymer matrix encompassing the network. The network is formed from a dual fiber mat of polyelectrolyte fibers and the uncharged (or minimally charged) polymer fibers. The polymer matrix is formed by softening and flowing the polyelectrolyte fibers of the dual fiber mat to fill void space between the uncharged (or minimally charged) polymer fibers. In some embodiments, the composite membrane may be a nanofiber-based cation-exchange membrane (a PEM) or a nanofiber-based anion-exchange membrane (an AEM).

A further aspect of the present invention relates to a method of fabricating a composite membrane, which includes forming an uncharged (or minimally charged) polymer solution and a polyelectrolyte solution, respectively, electrospinning, separately and simultaneously, the polyelectrolyte solution and the uncharged (or minimally charged) polymer solution to form polyelectrolyte fibers and uncharged (or minimally charged) polymer fibers, forming a dual fiber mat with the polyelectrolyte fibers and the uncharged (or minimally charged) polymer fibers and processing the dual fiber mat by softening and flowing the uncharged (or minimally charged) polymer fibers to fill in the void space between the polyelectrolyte fibers so as to form the composite membrane. In some embodiments, the composite membrane may be a nanofiber-based cation-exchange membrane (a PEM) or a nanofiber-based anion-exchange membrane (an AEM).

In one embodiment, the forming of the uncharged (or minimally charged) polymer solution and the polyelectrolyte solution includes dissolving an uncharged (or minimally charged) polymer in a first solvent to form the uncharged (or minimally charged) polymer solution and dissolving a polyelectrolyte in a second solvent to form the polyelectrolyte solution.

In one embodiment, the processing of the dual fiber mat includes compressing the dual fiber mat and exposing the dual fiber mat to solvent vapor to soften and flow the uncharged (or minimally charged) polymer fibers to fill in the void space between the polyelectrolyte fibers.

In another embodiment, the processing of the dual fiber mat includes compressing the dual fiber mat exposing the dual fiber mat to solvent vapor to soften and flow the uncharged (or minimally charged) polymer fibers to fill in the void space between the polyelectrolyte (ionomer) fibers and then thermal annealing the resulting film.

In yet another embodiment, the processing of the dual fiber mat includes interconnecting the polyelectrolyte fibers.

In one embodiment, the processing of the dual fiber mat includes crosslinking the polyelectrolyte (ionomer) in the fibers.

In one embodiment, a dual fiber mat is made by electrospinning a polyelectrolyte (ionomer) precursor and an uncharged (or minimally charged) polymer, where the precursors is functionalized to produce fixed-charge ion-exchange sites during the processing of the dual fiber mat into a nanofiber-based cation-exchange membrane (a PEM) or a nanofiber-based anion-exchange membrane (an AEM).

In one embodiment, two or more polyelectrolytes, polyelectrolyte precursors, or a combination thereof and two or more uncharged (or minimally charged) polymers are electrospun into a multi-fiber mat followed by one or more of the following steps: mat compression, solvent vapor exposure, thermal annealing, fiber welding, and precursor functionalization to produce a nanofiber-based cation-exchange membrane (a PEM) or a nanofiber-based anion-exchange membrane (an AEM). For example, one can electrospin perfluorosuslfonic acid nanofibers simultaneously with uncharged polyphenylsulfone (PPSU) and uncharged polyvinylidene fluoride (PVDF) nanofibers. During the mat processing, the PVDF is allowed to soften and flow around the Nafion and PPSU fibers. Thus, the mechanically weak but chemically inert PVDF polymer matrix is strengthen by the present of the high-strength PPSU nanofibers, which improves the overall mechanically properties of the membrane.

In one embodiment, the electrospinning rate of fiber deposition of the polyelectrolyte and the uncharged (or minimally charged) polymers is varied during mat fabrication so that after mat processing into a composite nanofiber-based cation exchange membrane (a PEM) or nanofiber-based anion-exchange membrane (an AEM). For these membranes, there is a step-change (layered) or a continues gradient in the volume fraction of polyelectrolyte in the membrane thickness direction In one embodiment, the method may further include increasing density of the polyelectrolyte fibers in the dual fiber mat prior to solvent vapor exposure and/or thermal annealing.

In one aspect, the present invention relates to a composite membrane. In one embodiment, the composite membrane includes a network of polyelectrolyte fibers and a polymer matrix encompassing the network. The network is formed from a dual fiber mat of uncharged (or minimally charged) polymer fibers and the polyelectrolyte fibers. The polymer matrix is formed by softening and flowing the uncharged (or minimally charged) polymer fibers of the dual fiber mat to fill void space between the polyelectrolyte fibers.

In one embodiment, the polyelectrolyte fibers are welded to create an interconnected 3-D fiber network prior to softening and flowing the uncharged (or minimally charged) polymer around the polyelectrolyte fibers. In some embodiments, the composite membrane may be a cation-exchange membrane (a PEM) or a nanofiber-based anion-exchange membrane (an AEM).

One aspect of the invention also provides a multi fiber mat method for fabricating a composite membrane. In one embodiment, the method includes forming one or more types of uncharged (or minimally charged) polymer solutions and one or more types of polyelectrolyte solutions, respectively; electrospinning, separately and simultaneously, the one or more types of polyelectrolyte solutions and the one or more types of uncharged (or minimally charged) polymer solutions to form a dual or multi fiber mat of one or more types of polyelectrolyte fibers and one or more types of uncharged (or minimally charged) polymer fibers; and processing the dual or multi fiber mat by softening and flowing at least one of the one or more types of polyelectrolyte fibers to fill in the void space between the one or more types of uncharged (or minimally charged) polymer fibers, or by softening and flowing at least one of the one or more types of uncharged (or minimally charged) polymer fibers to fill in the void space between the one or more types of polyelectrolyte fibers, so as to form the composite membrane.

In one embodiment, the composite membrane is a multi-layered composite membrane in which relative amounts of the polyelectrolyte fibers and the softened and flown uncharged (or minimally charged) polymer matrix, or relative amounts of the uncharged (or minimally charged) polymer fibers and the softened and flown polyelectrolyte matrix, vary in a thickness direction that is perpendicular to the membrane surface of the composite membrane, wherein the relative amounts vary in a step function or a continuous gradient function in the thickness direction of the composite membrane.

In one embodiment, the one or more types of polyelectrolyte solutions contain one or more polyelectrolytes, one or more polyelectrolyte precursors, or a combination thereof.

In one embodiment, the processing of the dual or multi fiber mat by softening and flowing the at least one of the one or more types of polyelectrolyte fibers comprises compressing the dual or multi fiber mat; and thermal annealing the dual or multi fiber mat to soften and flow the at least one of the one or more types of polyelectrolyte fibers to fill in the void space between the one or more types of uncharged (or minimally charged) polymer fibers.

In one embodiment, the processing of the dual or multi fiber mat comprises interconnecting at least one of the one or more types of uncharged (or minimally charged) polymer fibers.

In one embodiment, the processing of the dual or multi fiber mat by softening and flowing at least one of the one or more types of uncharged (or minimally charged) polymer fibers comprises compressing the dual or multi fiber mat; and exposing the dual or multi fiber mat to solvent vapor to soften and flow at least one of the one or more types of uncharged (or minimally charged) polymer fibers to fill in the void space between the one or more types of polyelectrolyte fibers. In another embodiment, wherein the processing of the dual or multi fiber mat by softening and flowing at least one of the one or more types of uncharged (or minimally charged) polymer fibers further comprises thermal annealing the dual or multi fiber mat.

In one embodiment, the processing of the dual or multi fiber mat comprises comprising interconnecting at least one of the one or more types of polyelectrolyte fibers.

In one embodiment, the processing of the dual or multi fiber mat comprises crosslinking the polyelectrolyte (ionomer) in the one or more types of polyelectrolyte fibers.

Another aspect of the invention also provides a composite membrane fabricated by a multi fiber mat method as disclosed above. Specifically, the composite membrane has a fiber network, wherein the fiber network is formed from a dual or multi fiber mat of one or more types of polyelectrolyte fibers and one or more types of uncharged (or minimally charged) polymer fibers; and a polymer matrix encompassing the fiber network, wherein the polymer matrix is formed by softening and flowing at least one of the one or more types of polyelectrolyte fibers of the dual or multi fiber mat to fill the void space between the one or more types of uncharged (or minimally charged) polymer fibers of the dual or multi fiber mat, or by softening and flowing at least one of the one or more types of uncharged (or minimally charged) polymer fibers of the dual or multi fiber mat to fill the void space between the one or more types of polyelectrolyte fibers of the dual or multi fiber mat.

The composite membrane contains nanofibers. Additionally, the composite membrane is a proton exchange membrane (PEM), or an anion exchange membrane (AEM).

In one embodiment, the composite membrane is a multi-layered composite membrane in which relative amounts of the polyelectrolyte fibers and the softened and flown uncharged (or minimally charged) polymer matrix, or relative amounts of the uncharged (or minimally charged) polymer fibers and the softened and flown polyelectrolyte matrix, vary in a thickness direction of the composite membrane, wherein the relative amounts vary in a step function or a continuous gradient function in the thickness direction of the composite membrane.

In one embodiment, the composite membrane is formed by electrospinning one or more types of polyelectrolyte solutions and one or more types of uncharged (or minimally charged) polymer solutions, where the one or more types of polyelectrolyte solutions contain one or more polyelectrolytes, one or more polyelectrolyte precursors, or a combination thereof.

In one embodiment, the composite membrane is formed by electrospinning one or more polyelectrolyte (ionomer) precursors and one or more uncharged (or minimally charged) polymers, wherein the one or more polyelectrolyte (ionomer) precursors are converted to polyelectrolyyes after forming the dual or multi fiber mat.

In another aspect, a method of fabricating a composite membrane includes forming one or more first-type polymer solutions from one or more first-type polymers and one or more second-type polymer solutions from one or more second-type polymers, respectively, where each of the one or more first-type polymers includes a charged polymer, or charged polymer precursors, and each of the one or more second-type polymers includes an uncharged polymer, electrospinning, separately and simultaneously, the one or more first-type polymer solutions and the one or more second-type polymer solutions to form a dual or multi fiber mat of one or more first-type polymer fibers and one or more second-type polymer fibers, and processing the dual or multi fiber mat by either (1) softening and flowing at least one of the one or more first-type polymer fibers to fill in the void space between the one or more second-types polymer fibers, or (2) softening and flowing at least one of the one or more second-type polymer fibers to fill in the void space between the one or more first-types polymer fibers, so as to form the composite membrane. In some embodiments, the composite membrane may be a cation-exchange membrane (a PEM) or a nanofiber-based anion-exchange membrane (an AEM).

In one embodiment, the forming of each first-type polymer solution includes dissolving a corresponding first-type polymer in a first solvent, and the forming of the second-type polymer solution includes dissolving a corresponding second-type polymer in a second solvent.

In one embodiment, one of the one or more first-type polymers comprises a polyelectrolyte (ionomer), and one of the one or more second-type polymers comprises an uncharged (or minimally charged) polymer.

In one embodiment, the processing of the dual or multi fiber mat by softening and flowing the at least one of the one or more second-type polymer fibers includes compressing the dual or multi fiber mat and exposing the dual or multi fiber mat to solvent vapor to soften and flow at least one of the one or more second-type polymer fibers to fill in the void space between the one or more first-type polymer fibers. In another embodiment, the processing of the dual or multi fiber mat further includes thermal annealing the dual or multi fiber mat.

In one embodiment, the processing of the dual fiber mat by softening and flowing at least one of the one or more first-type polymer fibers includes compressing the dual or multi fiber mat and thermal annealing the dual or multi fiber mat to soften and flow at least one of the one or more first-type polymer fibers to fill in the void space between the one or more second-type polymer fibers, where the first polymer is a perfluorosulfonic acid polymer.

In one embodiment, the processing of the dual or multi fiber mat comprises crosslinking the first-type polymers in the one or more first-type polymer fibers.

In a further aspect, the present invention relates to a composite membrane, which includes a fiber network and a polymer matrix encompassing the fiber network. The fiber network is formed from a dual or multi fiber mat of one or more first-type polymer fibers and one or more second-type polymer fibers. The polymer matrix is formed by softening and flowing at least one of the one or more of the first-type polymer fibers of the dual or multi fiber mat to fill in the void space between the one or more second-type polymer fibers of the dual or multi fiber mat, or by softening and flowing at least one of the one or more of the second-type polymer fibers of the dual or multi fiber mat to fill in the void space between the one or more first-type polymer fibers of the dual or multi fiber mat. The one or more first-type polymer fibers comprise charged polymer fibers, or charged polymer precursor fibers, and the one or more second-type polymer fibers comprise uncharged polymer fibers. In some embodiments, the composite membrane may be a cation-exchange membrane (a PEM) or a nanofiber-based anion-exchange membrane (an AEM).

In one embodiment, the one or more first-type polymer fibers comprise polyelectrolyte fibers, and the one or more second-type polymer fibers comprise uncharged (or minimally charged) polymer fibers.

In one embodiment, the composite membrane is a multi-layered composite membrane in which relative amounts of the first-type polymer fibers and the softened and flown second-type polymer matrix, or relative amounts of second-type polymer fibers and the softened and flown first-type polymer matrix, vary in a thickness direction of the composite membrane, where the relative amounts vary in a step function or a continuous gradient function in the thickness direction of the composite membrane.

In one embodiment, the composite membrane is formed by electrospinning one or more types of polyelectrolyte solutions and one or more types of uncharged (or minimally charged) polymer solutions, wherein the one or more types of polyelectrolyte solutions contain one or more polyelectrolytes, one or more polyelectrolyte precursors, or a combination thereof.

In one embodiment, the composite membrane is formed by electrospinning one or more polyelectrolyte (ionomer) precursors and one or more uncharged (or minimally charged) polymers, wherein the one or more polyelectrolyte (ionomer) precursors are converted to polyelectrolyyes after forming the dual or multi fiber mat.

In one embodiment, the polyelectrolytes (ionomers) are crosslinked in the one or more types of polyelectrolyte fibers.

In one aspect of the invention, a composite membrane comprises one or more polyelectrolyte polymer nanofibers surrounded by one or more uncharged (or minimally charged) polymers; or one or more uncharged (or minimally charged) polymer nanofibers surrounded by one or more polyelectrolyte polymers.

In one embodiment, the composite membrane is formed in a layered or gradient compositional structure in a membrane thickness direction, such that relative amounts of the uncharged (or minimally charged) polymer nanofibers and the polyelectrolyte polymers vary in the membrane thickness direction, continuously or in a layered (step-jump) morphology.

In one embodiment, the composite membrane is formed in a layered or gradient compositional structure in a membrane thickness direction, such that relative amounts of the polyelectrolyte polymer nanofibers and uncharged polymers vary in the membrane thickness direction, continuously or in a layered (step-jump) morphology.

One aspect of the present invention relates to a fuel cell including at least one composite membrane fabricated by any of the methods as described above.

Another aspect of the present invention relates to a fuel cell including at least one composite membrane as described above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
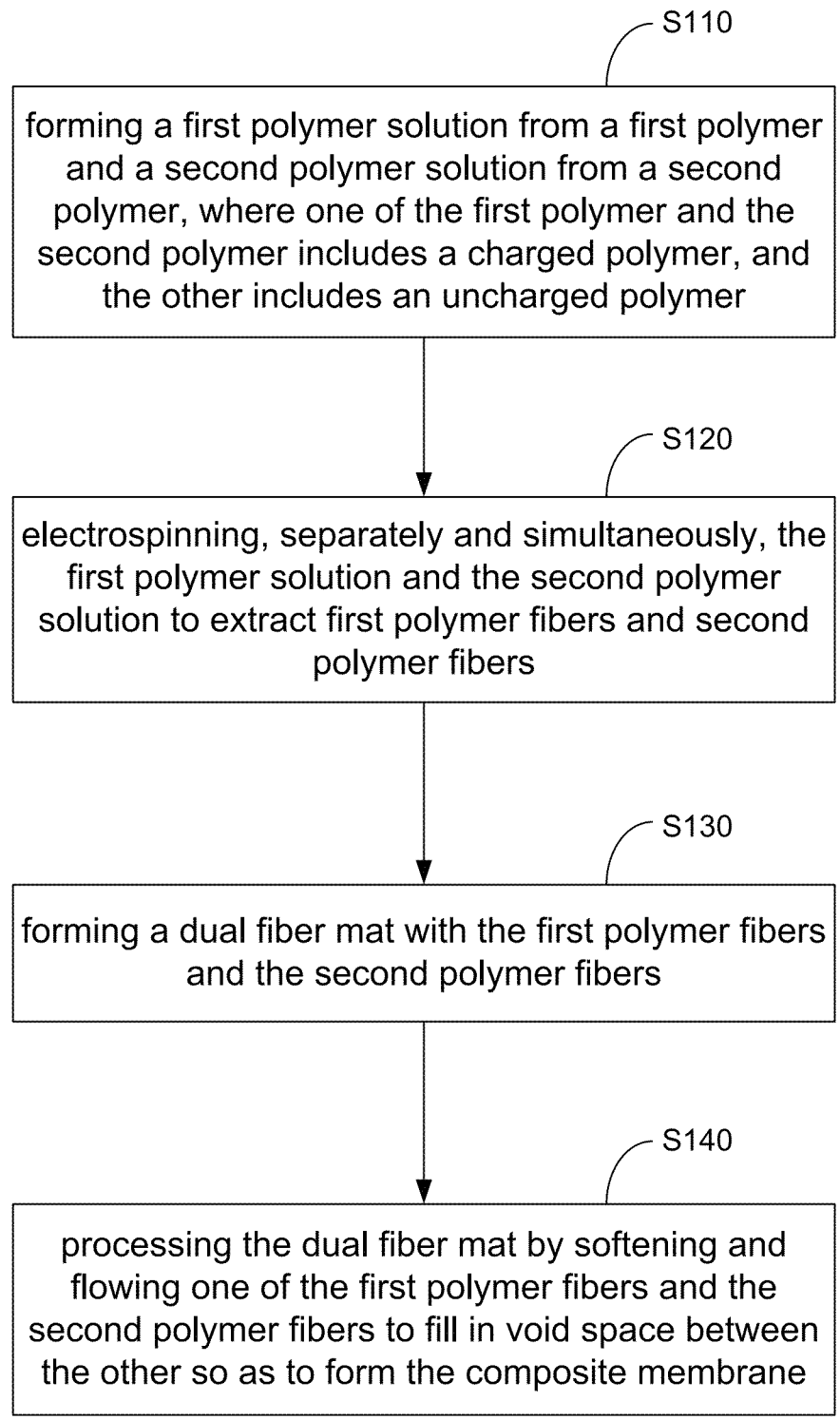
FIG. 1 shows a flowchart of forming a composite membrane according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

The terms "proton exchange membrane" or its abbreviation "PEM", as used herein, refer to a composite membrane generally made from ionomers and designed to conduct protons. The terms "proton exchange membrane fuel cell" or "PEM fuel cell", or its abbreviation "PEMFC", refer to a fuel cell using the PEM.

The terms "anion exchange membrane" or its abbreviation "AEM", as used herein, refer to a composite membrane generally made from ionomers and designed to conduct anions. The terms "anion exchange membrane fuel cell" or "AEM fuel cell", or its abbreviation "AEMFC", refer to a fuel cell using the AEM.

As used herein, the term "melt" refers to a transitional process of a substance from a solid state to a fluid-like state, such as liquid or gel. Specifically, the melting process in this disclosure refers to softening and flowing of the substance, and may be induced by pressure, temperature, other chemically inducing substances such as a solvent, or a combination thereof. Thus, melting of the substance, as used herein, is not limited to the physical phase transition of the substance from the solid state to the liquid state, and does not necessarily require elevated temperature or pressure.

As used herein, the term "conducting polymer" or "ionomer" generally refers to a polymer that conducts ions. More precisely, the ionomer refers to a polymer that includes repeat units of at least a fraction of ionized units. As used herein, the term "polyelectrolyte" generally refers to a type of ionomer, and particularly a polymer whose repeating units bear an electrolyte group, which will dissociate when the polymer is exposed to aqueous solutions (such as water), making the polymer charged. The conducting polymers, ionomers and polyelectrolytes may be generally referred to as "charged polymers". As used herein, the terms "polyelectrolyte fiber" or "charged polymer fiber" generally refer to the polymer fiber formed by polyelectrolytes or the likes. As used herein, polyelectrolyte, ionomer, and charged polymer can be used interchangeably.

As used herein, the terms "uncharged polymer" or "uncharged (or minimally charged) polymer" generally refer to the polymer that does not effectively conduct ions, particularly to the polymer whose repeating units do not bear an electrolyte group or bear a small number of electrolyte groups, and thus the polymer will not be charged or will have a very small charge when being exposed to aqueous solutions. As used herein, the terms "uncharged polymer fiber" or "uncharged (or minimally charged) polymer fiber" generally refer to the polymer fiber formed by the uncharged/uncharged (or minimally charged) polymer.

As used herein, if any, the term "quaternization" refers to a chemical process for creating quaternary ammonium fixed charge sites on a polymer chain by reaction, for example of chloromethyl groups with trimethylamine.

The term "ion exchange capacity" or its abbreviation "IEC" refers to the capacity of ion exchange, which is an exchange of ions between two electrolytes or between an electrolyte solution and a complex.

As used herein, if any, the term "scanning electron microscope" or its abbreviation "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, "nanoscopic-scale", "nanoscopic", "nanometer-scale", "nanoscale", "nanocomposites", "nanoparticles", the "nano-" prefix, and the like generally refers to elements or articles having widths or diameters of less than about 1 μm, preferably less than about 300 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, a "nanostructure" refers to an object of intermediate size between molecular and microscopic (micrometer-sized) structures. In describing nanostructures, the sizes of the nanostructures refer to the number of dimensions on the nanoscale. For example, nanotextured surfaces have one dimension on the nanoscale, i.e., only the thickness of the surface of an object is between 0.1 and 1000 nm. A list of nanostructures includes, but not limited to, nanoparticle, nanocomposite, quantum dot, nanofilm, nanoshell, nanofiber, nanoring, nanorod, nanowire, nanotube, nanocapillary structures, and so on.

Overview of the Invention

The present invention relates to composite membranes, such as nanofiber-based membranes, PEMs or AEMs, formed by a mat of dual or multi nanofibers, methods of making the same, and corresponding applications, where one or more uncharged (or minimally charged) polymer nanofibers and one or more ion conducting polymer nanofibers forms the network of the composite membranes, where one or more of the fibers are softened and flown to surround the other fiber or fibers.

In one aspect of this disclosure, among other things, the composite membrane (such as a nanofiber-based cation-exchange membrane, as a PEM or a nafion-based anion-exchange membranes as an AEM) has an inverse structure as to what is described in U.S. Patent Application No. 2010/0227247 to Peter Pintauro et al., which Peter Pintauro is also a co-inventor of the current invention. The new membrane structure as disclosed in the present invention is much more robust, as will be described below.

In U.S. Patent Application No. 2010/0227247, the membrane structure as described includes a network formed by charged nanofibers surrounded by uncharged polymer, and the method of forming the membrane includes a separate polymer impregnation step for the uncharged polymer. In contrast, one aspect of the present invention relates to a composite membrane, which includes a network of uncharged (or minimally charged) polymer nanofibers surrounded by charged polymer, where the network is formed by the dual fiber mat, and another aspect of the invention relates to a method of forming the membrane without the need for a separate polymer impregnation step, which was one of the required membrane fabrication steps in U.S. Patent Application No. 2010/0227247. The two different membrane structures (uncharged (or minimally charged)/uncharged polymer nanofibers reinforcing a charge polymer membrane and ion-exchange nanofibers surrounded by uncharged (or minimally charged)/uncharged polymer) may start from the same "dual fiber" mat structure. Thus, in one embodiment of the invention, the ion conducting polymer and the uncharged (or minimally charged)/uncharged polymer are simultaneously electrospun to form the dual fiber mat. The resulting dual fiber mat may be then processed in one of the two ways: (i) the ion conducting polymer nanofibers are allowed to "melt" without affecting the uncharged (or minimally charged)/uncharged polymer nanofibers, thus filling the void space between the uncharged (or minimally charged) polymer fibers to form a membrane where the uncharged (or minimally charged)/uncharged polymer nanofibers are surrounded by the ion conducting polymer; or (ii) the uncharged (or minimally charged)/uncharged polymer nanofibers are allowed to "melt" without affecting the charged (ion conducting) polymer nanofibers, thus filling the void volume between the ion conducting nanofibers to form a membrane where the ion conducting nanofibers are surrounded by the uncharged (or minimally charged)/uncharged polymer (which is a structure qualitatively similar to that described in U.S. Patent Application No. 2010/0227247). Hereinafter, the term "melt" refers to the softening and flowing of the polymer, where the nanofibers are subject to exposure to a selective solvent at near ambient temperature conditions, and does not necessarily require an elevated temperature. The absence of an impregnation step significantly simplifies the membrane fabrication process. Also, the present invention allows for the creation of gradients in the volume fraction of one or more nanofiber polymer components in the membrane thickness direction, including the creating of layered nanofiber structure of different relative composition in the final nanofiber composite final membrane. Such structures are not described in U.S. Patent Application No. 2010/0227247.

One aspect of the present invention relates to a method of fabricating a composite membrane, such as a nanofiber-based membrane cation-exchange membrane acting as a PEM or a nanofiber-based anion-exchange membrane acting as an AEM. The method includes: forming a first polymer solution from a first polymer and a second polymer solution from a second polymer, respectively, where the first polymer includes a charged polymer, and the second polymer includes an uncharged polymer; electrospinning, separately and simultaneously, the first polymer solution and the second polymer solution to form first polymer fibers and second polymer fibers; forming a dual fiber mat with the first polymer fibers and the second polymer fibers; and processing the dual fiber mat by softening and flowing one of the first polymer fibers and the second polymer fibers to fill in the void space between the other of the first polymer fibers and the second polymer fibers so as to form the composite membrane.

In another aspect, the present invention relates to a composite membrane, which includes a fiber network and a polymer matrix encompassing the fiber network. The fiber network is formed from a dual fiber mat of the first polymer fibers and the second polymer fibers. The polymer matrix is formed by softening and flowing one of the first polymer fibers and the second polymer fibers of the dual fiber mat to fill in the void space between the other of the first polymer fibers and the second polymer fibers so as to form the composite membrane. In some embodiments, the composite membrane may be a nanofiber-based ion-exchange membrane, a PEM or an AEM.

Yet another aspect of the present invention relates to a method of fabricating a composite membrane, which includes: forming an uncharged (or minimally charged) polymer solution and a polyelectrolyte solution, respectively; electrospinning, separately and simultaneously, the polyelectrolyte solution and the uncharged (or minimally charged) polymer solution to form polyelectrolyte fibers and uncharged (or minimally charged) polymer fibers; forming a dual fiber mat with the polyelectrolyte fibers and the uncharged (or minimally charged) polymer fibers; and processing the dual fiber mat by softening and flowing the polyelectrolyte fibers to fill in the void space between the uncharged (or minimally charged) polymer fibers so as to form the composite membrane. In some embodiments, the composite membrane may be a nanofiber-based ion-exchange membrane, a PEM or an AEM.

In one embodiment, the processing the dual fiber mat includes: compressing the dual fiber mat; and thermal annealing the dual fiber mat to soften and flow a perfluorosulfonic acid polyelectrolyte fibers to fill in the void space between the uncharged (or minimally charged) polymer fibers.

In a further aspect, the present invention relates to a composite membrane. In one embodiment, the proton exchange membrane includes a network of uncharged (or minimally charged) polymer fibers and a polymer matrix encompassing the network. The network is formed from a dual fiber mat of polyelectrolyte fibers and the uncharged (or minimally charged) polymer fibers. The polymer matrix is formed by softening and flowing the polyelectrolyte fibers of the dual fiber mat to fill void space between the uncharged (or minimally charged) polymer fibers. In some embodiments, the composite membrane may be a nanofiber-based ion-exchange membrane, a PEM or an AEM.

Yet a further aspect of the present invention relates to a method of fabricating a composite membrane, which includes: forming an uncharged (or minimally charged) polymer solution and a polyelectrolyte solution, respectively; electrospinning, separately and simultaneously, the polyelectrolyte solution and the uncharged (or minimally charged) polymer solution to form polyelectrolyte fibers and uncharged (or minimally charged) polymer fibers; forming a dual fiber mat with the polyelectrolyte fibers and the uncharged (or minimally charged) polymer fibers; and processing the dual fiber mat by softening and flowing the uncharged (or minimally charged) polymer fibers to fill in the void space between the polyelectrolyte fibers so as to form the composite membrane. In some embodiments, the composite membrane may be a nanofiber-based ion-exchange membrane, a PEM or an AEM.

Another aspect of the present invention relates to a method of fabricating a composite membrane which includes: forming an uncharged (or minimally charged) polymer solution and a polyelectrolyte solution, respectively; electrospinning, separately and simultaneously, the polyelectrolyte solution and the uncharged (or minimally charged) polymer solution to form polyelectrolyte fibers and uncharged (or minimally charged) polymer fibers; forming a dual fiber mat with the polyelectrolyte fibers and the uncharged (or minimally charged) polymer fibers; and processing the dual fiber mat by allowing both the charged polymer and the uncharged (or minimally charged) polymer to soften and flow so that no void space is present in the final polymer. In some embodiments, the composite membrane may be a nanofiber-based ion-exchange membrane, a PEM or an AEM.

In one embodiment, the processing the dual fiber mat includes: compressing the dual fiber mat; and exposing the dual fiber mat to solvent vapor to soften and flow the uncharged (or minimally charged) polymer fibers to fill in the void space between the polyelectrolyte fibers.

In one embodiment, processing the dual fiber mat includes: compressing the dual fiber mat; exposing the dual fiber mat to solvent vaporto soften and flow the uncharged (or minimally charged) polymer fibers to fill in the void space between the polyelectrolyte fibers, followed in some cases by thermal annealing.

In another aspect, the present invention relates to a composite membrane. In one embodiment, the proton exchange membrane includes a network of polyelectrolyte fibers and an uncharged (or minimally charged) polymer matrix encompassing the network. The network is formed from a dual fiber mat of uncharged (or minimally charged) polymer fibers and the polyelectrolyte fibers. The polymer matrix is formed by softening and flowing the uncharged (or minimally charged) polymer fibers of the dual fiber mat to fill void space between the polyelectrolyte fibers. In some embodiments, the composite membrane may be a nanofiber-based ion-exchange membrane, a PEM or an AEM.

One aspect of the invention also provides a multi fiber mat method for fabricating a composite membrane. The method includes forming one or more types of uncharged (or minimally charged) polymer solutions and one or more types of polyelectrolyte solutions, respectively; electrospinning, separately and simultaneously, the one or more types of polyelectrolyte solutions and the one or more types of uncharged (or minimally charged) polymer solutions to form a dual or multi fiber mat of one or more types of polyelectrolyte fibers and one or more types of uncharged (or minimally charged) polymer fibers; and processing the dual or multi fiber mat by softening and flowing at least one of the one or more types of polyelectrolyte fibers to fill in the void space between the one or more types of uncharged (or minimally charged) polymer fibers, or by softening and flowing at least one of the one or more types of uncharged (or minimally charged) polymer fibers to fill in the void space between the one or more types of polyelectrolyte fibers, so as to form the composite membrane.

The one or more types of polyelectrolyte solutions may contain one or more polyelectrolytes, one or more polyelectrolyte precursors, or a combination thereof.

In one embodiment, the processing of the dual or multi fiber mat by softening and flowing the at least one of the one or more types of polyelectrolyte fibers comprises compressing the dual or multi fiber mat; and thermal annealing the dual or multi fiber mat to soften and flow the at least one of the one or more types of polyelectrolyte fibers to fill in the void space between the one or more types of uncharged (or minimally charged) polymer fibers.

In another embodiment, the processing of the dual or multi fiber mat by softening and flowing at least one of the one or more types of uncharged (or minimally charged) polymer fibers comprises compressing the dual or multi fiber mat; and exposing the dual or multi fiber mat to solvent vapor to soften and flow at least one of the one or more types of uncharged (or minimally charged) polymer fibers to fill in the void space between the one or more types of polyelectrolyte fibers. In another embodiment, wherein the processing of the dual or multi fiber mat by softening and flowing at least one of the one or more types of uncharged (or minimally charged) polymer fibers further comprises thermal annealing the dual or multi fiber mat.

In one embodiment, the processing of the dual or multi fiber mat comprises crosslinking the polyelectrolyte (ionomer) in the one or more types of polyelectrolyte fibers.

Another aspect of the invention also provides a composite membrane fabricated by a multi fiber mat method as disclosed above. Specifically, the composite membrane has a fiber network, wherein the fiber network is formed from a dual or multi fiber mat of one or more types of polyelectrolyte fibers and one or more types of uncharged (or minimally charged) polymer fibers; and a polymer matrix encompassing the fiber network, wherein the polymer matrix is formed by softening and flowing at least one of the one or more types of polyelectrolyte fibers of the dual or multi fiber mat to fill the void space between the one or more types of uncharged (or minimally charged) polymer fibers of the dual or multi fiber mat, or by softening and flowing at least one of the one or more types of uncharged (or minimally charged) polymer fibers of the dual or multi fiber mat to fill the void space between the one or more types of polyelectrolyte fibers of the dual or multi fiber mat.

The composite membrane can be formed in a multilayered composite structure in which relative amounts of the polyelectrolyte fibers and the softened and flown uncharged (or minimally charged) polymer matrix, or relative amounts of the uncharged (or minimally charged) polymer fibers and the softened and flown polyelectrolyte matrix, vary in a thickness direction that is perpendicular to the membrane surface of the composite membrane, wherein the relative amounts vary in a step function or a continuous gradient function in the thickness direction of the composite membrane.

In one embodiment, the composite membrane is formed by electrospinning one or more types of polyelectrolyte solutions and one or more types of uncharged (or minimally charged) polymer solutions, where the one or more types of polyelectrolyte solutions contain one or more polyelectrolytes, one or more polyelectrolyte precursors, or a combination thereof.

In one embodiment, the composite membrane is formed by electrospinning one or more polyelectrolyte (ionomer) precursors and one or more uncharged (or minimally charged) polymers, wherein the one or more polyelectrolyte (ionomer) precursors are converted to polyelectrolyyes after forming the dual or multi fiber mat.

In one aspect of the invention, a composite membrane comprises one or more polyelectrolyte polymer nanofibers surrounded by one or more uncharged (or minimally charged) polymers; or one or more uncharged (or minimally charged) polymer nanofibers surrounded by one or more polyelectrolyte polymers.

In one embodiment, the composite membrane is formed in a layered or gradient compositional structure in a membrane thickness direction, such that relative amounts of the uncharged (or minimally charged) polymer nanofibers and the polyelectrolyte polymers vary in the membrane thickness direction, continuously or in a layered (step-jump) morphology.

In another embodiment, the composite membrane is formed in a layered or gradient compositional structure in a membrane thickness direction, such that relative amounts of the polyelectrolyte polymer nanofibers and uncharged polymers vary in the membrane thickness direction, continuously or in a layered (step-jump) morphology.

These and other aspects of the present invention are more specifically described below.

IMPLEMENTATIONS AND EXAMPLES OF THE INVENTION

Without intent to limit the scope of the invention, exemplary methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

FIG. 1 shows a flowchart of forming a composite membrane according to one embodiment of the present invention. In some embodiments, the composite membrane may be a nanofiber-based membrane, such as a PEM or an AEM. As shown in FIG. 1, the method includes: forming a first polymer solution from a first polymer and a second polymer solution from a second polymer, where one of the first polymer and the second polymer includes a charged polymer, and the other of the first polymer and the second polymer includes an uncharged polymer (step S110); electrospinning, separately and simultaneously, the first polymer solution and the second polymer solution to form first polymer fibers and second polymer fibers (step S120); forming a dual fiber mat with the first polymer fibers and the second polymer fibers (step S130); and processing the dual fiber mat by softening and flowing one of the first polymer fibers and the second polymer fibers to fill in the void space between the other of the first polymer fibers and the second polymer fibers so as to form the composite membrane (step S140).

As described above, one of the first polymer and the second polymer includes a charged polymer, and the other of the first polymer and the second polymer includes an uncharged polymer. In some embodiments, an example of uncharged polymer includes polyphenylsulfone (PPSU), chloromethylated polysulfone, and examples of charged polymers include 3M660 perfluorosulfonic acid ionomer, and Nafion. Details of the examples of uncharged and charged polymer will be discussed later in the examples section.

In one embodiment, three or more different polymer solutions are electrospun separately and simultaneously where at least one polymer is a charged polymer and at least one polymer is an uncharged polymer.

In one embodiment, the first polymer solution and the second polymer solution may be formed by dissolving a first polymer in a first solvent to form the first polymer solution and dissolving a second polymer in a second solvent to form the second polymer solution. The first solvent and the second solvent may be the same or different depending on the type of polymers used as the first and second polymers. Details of the polymer used will be explained hereinafter with concrete examples.

Figure 2:
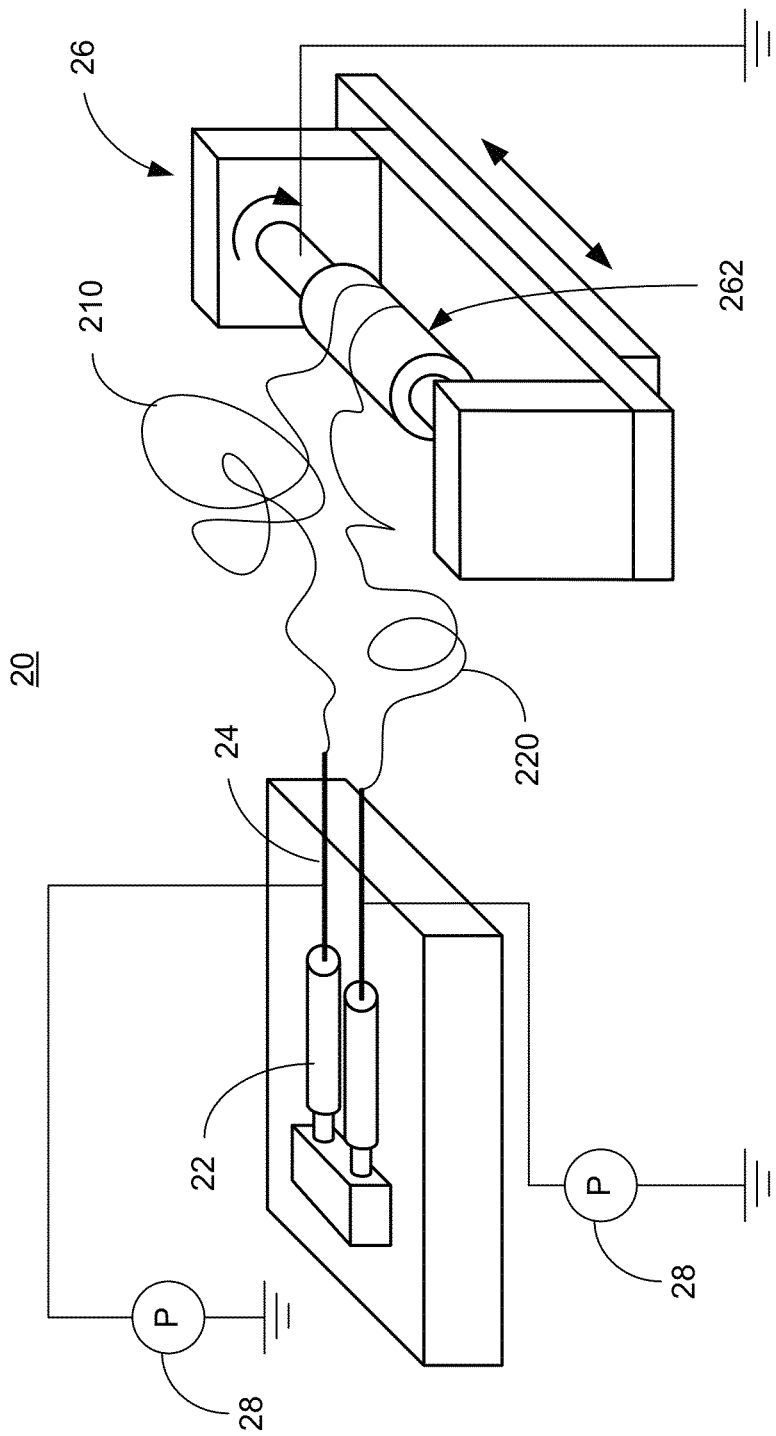
FIG. 2 shows schematically an apparatus for electrospinning, separately and simultaneously, the polymer solutions according to one embodiment of the present invention.

Electrospinning of the polymer solutions may be performed with a variety of electrospinning apparatuses or devices known to the person of ordinary skill in the art. For example, FIG. 2 shows schematically an apparatus for electrospinning, separately and simultaneously, the polymer solutions according to one embodiment of the present invention. The apparatus 20 includes two syringes 22 and a target 26, and each syringe 22 has a needle 24. Further, a power supply 28 is connected to each of the needles 24, respectively, and the target 26 is grounded.

When electrospinning is performed, the first polymer solution and the second polymer solution are respectively provided to the syringe 22 separately. For each needle 24, an electrical potential is applied for drawing out the polymer solution in the corresponding syringe 22. Specifically, for each needle 24, the electrical potential can be increased until the electrostatic forces in the polymer solution overcome the surface tension of the polymer solution at the tip of the needle 24. As this surface tension is overcome, the polymer solution can be drawn out of the needle 24 toward the target 26. It should be appreciated that the flow rates for each polymer solution and the electrical potentials applied to each of the two needles 24 may be controlled separately and differently such that the electrospinning for both the first and second polymer solutions may be performed simultaneously.

As the drawn out polymer solutions travel through the air, at least a portion of the solvent evaporates, resulting in the first polymer fiber 210 and the second polymer fiber 220. The first polymer fiber 210 and the second polymer fiber 220 may be then collected by the rotating cylinder 262 of the target 26. Thus, the first polymer fiber 210 and the second polymer fiber 220 may be obtained and organized to form the dual fiber mat for further processing.

Figure 3:
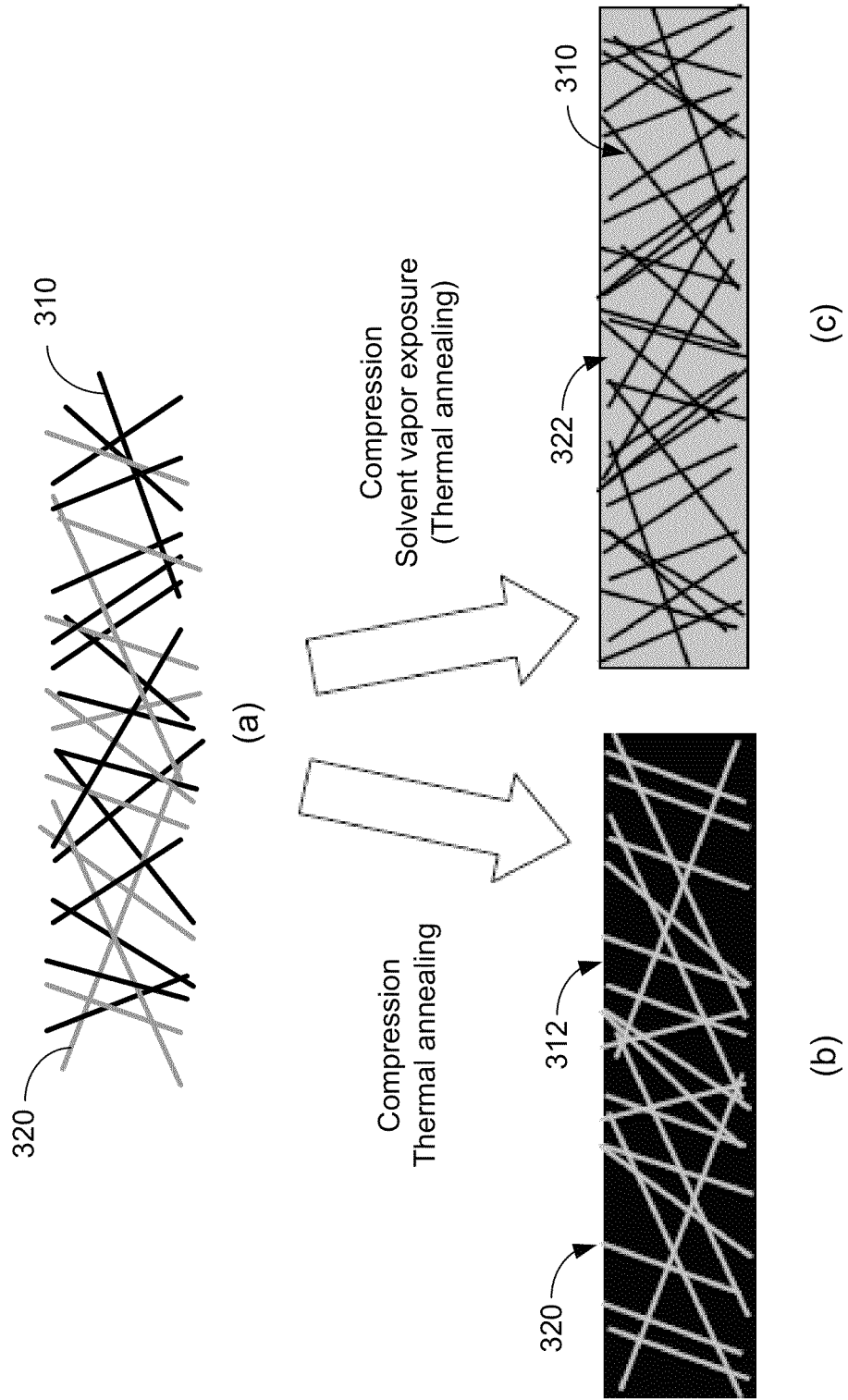
FIG. 3 shows schematically (a) a dual fiber mat for softening and flowing one of the nanofibers to form of the composite membrane according to one embodiment of the present invention, (b) a composite membrane formed by softening and flowing the charged polymer fibers to fill in the void space between the uncharged polymer fibers, and (c) a composite membrane formed by softening and flowing the uncharged polymer fibers to fill in the void space between the charged polymer fibers.

FIG. 3 shows schematically the process to the dual fiber mat for softening and flowing one of the nanofibers to form of the composite membrane according to one embodiment of the present invention. As shown in figure (a), the nanofibers of the dual fiber mat include polyelectrolyte fibers (charged polymer fibers) 310, which are shown as the black polymer fibers, and uncharged (or minimally charged) polymer fibers (uncharged polymer fibers) 320, which are shown as the gray polymer fibers. The polyelectrolyte fibers 310 and the uncharged (or minimally charged) polymer fibers 320 have been organized to form a three-dimensional dual fiber mat. It should be appreciated that the black and gray colors of the polymer fibers 310 and 320 are merely provided for distinguishing purposes of different polymer fibers, and are not intended to limit the actual colors of the polymer fibers 310 and 320.

As described above, the composite membrane, such as a nanofiber-based membrane, a PEM or an AEM, may be formed by processing the dual fiber mat by softening and flowing one of the first polymer fibers and the second polymer fibers to fill in the void space between the other of the first polymer fibers and the second polymer fibers so as to form the composite membrane. Thus, different processes may be performed to the dual fiber mat for softening and flowing one of the polymer fibers to fill in the void space between the other polymer fibers.

In one embodiment, for example, the dual fiber mat may go through compressing and thermal annealing processes such that a composite membrane structure as shown in figure (b) is formed, where the polyelectrolyte fibers 310 are softened and flown to form a polymer matrix 312 that fills in the void space between the uncharged (or minimally charged) polymer fibers 320. In other words, the composite membrane structure as shown in figure (b) includes a network of the uncharged (or minimally charged) polymer fibers 320, and a polymer matrix 312 formed by softening and flowing the charged polymer (polyelectrolyte) to fill in the void space between the uncharged (or minimally charged) polymer fibers 320.

In an alternative embodiment, the dual fiber mat may go through compressing, solvent vapor exposure and/or thermal annealing processes such that a composite membrane structure as shown in figure (c) is formed, where the uncharged (or minimally charged) polymer fibers 320 are softened and flown to form a polymer matrix 322 that fills in the void space between the polyelectrolyte fibers 310. In some embodiments, the solvent vapor may be chloroform solvent vapor. In other words, the composite membrane structure as shown in figure (c) includes a network of the polyelectrolyte fibers 310, and a polymer matrix 322 formed by softening and flowing the uncharged polymer (uncharged (or minimally charged) polymer) to fill in the void space between the polyelectrolyte fibers 310.

The method of forming the composite membrane as shown in FIG. 3 is inherently simpler and more robust than an impregnation scheme, and the final polymer morphology is not limited by dispersion/compatibility problems that often plague blended membrane systems. As will be shown below, the resulting membranes have attractive properties for fuel cell and other applications.

It should be appreciated that, for any of the composite membrane structure as shown in figures (b) and (c) of FIG. 3, polymer welds or interconnections between intersecting fibers of the dual fiber mat, although not explicitly shown, may be formed for increasing strength of the composite membrane and for interconnectivity of ionically conductive fibers. Further, for any of the composite membrane structure as shown in figures (b) and (c) of FIG. 3, additional processes may be provided for increasing density of the first polymer fibers in the dual fiber mat, or for interconnecting the first polymer fibers. For example, for the composite membrane structure in figure (b), additional processes may be provided for increasing density of the uncharged (or minimally charged) polymer fibers 320 in the dual fiber mat, or for interconnecting the uncharged (or minimally charged) polymer fibers 320. Similarly, for the composite membrane structure in figure (c), additional processes may be provided for increasing density of the polyelectrolyte fibers 310 in the dual fiber mat, or for interconnecting the polyelectrolyte fibers 310.

It should be appreciated that, in some embodiments, the composite membrane and the methods forming the composite membrane allow for flexibility in forming a phase-separated nanomorphology. For example, the composite membrane may be customized by the independent selection of a number of variables including, but not limited to, the selection of the polyelectrolyte polymer and the uncharged (or minimally charged) polymer; the general diameter of the nanofibers; the fraction of volume occupied by the nanofibers; the total number of different types (different composition) nanofibers; and other suitable variables.

As described above, embodiments of the composite membrane and methods of forming the composite membrane may be used in a variety of applications, such as fuel cells including at least one composite membrane as described above (e.g., PEM fuel cells or AEM fuel cells). In some embodiments, other applications of the composite membrane may include electrodialysis separations, membrane sensors, electrolyses, and other such suitable applications.

Example One

In this example, a composite membrane, comprising about 70 vol % 660 equivalent weight perfluorosulfonic acid and about 30 vol % polyphenylsulfone (PPSU), was fabricated and characterized. The dual fiber electrospinning method as disclosed in the application was utilized for the fabrication of the membrane, where the two polymers were simultaneously electrospun into a dual-fiber mat. Follow-on processing converted the mat into a fully dense and functional fuel cell ion-exchange membrane with polyphenylsulfone nanofibers embedded in an ionomer matrix. The proton conductivity of the composite membrane was high, e.g., about 0.070 S/cm at about 80° C. and about 50% relative humidity. The dimensional stability of the membrane upon water uptake was excellent, with an in-plane (areal) swelling of only about 5% in room temperature water. In this example, PPSU, which is an uncharged polymer, is used as the first polymer, and 3M660 ionomer, which is a charged polymer, is used as the second polymer. The melting (or softening and flowing) process of the 3M660 ionomer includes compressing and thermal annealing processes. The characteristics of the fabricated membrane are shown in FIGS. 4A-7.

High temperature/low humidity fuel cell operation is desirable for automotive hydrogen/air fuel cells. High temperature operation (i.e. higher than 100° C.) allows for faster electrode kinetics and minimizes catalyst poisoning, but feed gas humidification is more difficult, requiring pressurization of feed gases which decreases system efficiency [1, 2]. Thus, high-temperature/low-humidity fuel cell operation is highly desirable. While the benchmark PEM, DuPont's Nafion® perfluorosulfonic acid, has proven to perform adequately at temperatures up to 80° C. at high humidity, it cannot operate at harsher hot and dry conditions. Nafion's proton conductivity dramatically decreases at high temperature and low humidity because there is insufficient water content to deprotonate sulfonic acid sites and to form water filled channels through which protons migrate during conduction [3].

One approach to increasing the high-temperature/low-humidity fuel cell operating range of perfluorosulfonic acid (PFSA) materials and other fuel cell ionomers is to increase the polymer ion-exchange capacity (IEC) above that of Nafion (which has an IEC of 0.91 meq/g). High IEC materials have more fixed-charge acidic functional groups and are more hydrophilic, thus allowing for a higher proton conductivity under low relative humidity conditions. 3M Company, for example, has synthesized a series of high IEC PFSA polymers with equivalent weights (EWs) in the 580-825 range. The 580 EW material (an IEC of 1.72 meq/g) is highly conductive, with a proton conductivity of 0.146 S/cm at 120° C. and 50% RH vs. 0.039 S/cm for Nafion [4]. Similarly, highly sulfonated poly(p-phenylene sulfone) films with IEC of 4.5 meq/g were found to be very good proton conductors, with a conductivity seven-times higher than that of Nafion at 135° C. and 35% RH [5]. Unfortunately, most/all high IEC proton conducting polymers suffer from one or more problems associated with: (i) membrane brittleness when dry, (ii) water solubility (especially in high temperature water), and (iii) dimensional stability (i.e., excessive swelling/shrinking in the wet/dry states) [6-8]. Methods to alleviate one or more of these problems include ionomer crosslinking, blending, and the use of block copolymers.

Nanofiber electrospinning methods have been employed to fabricate fuel cell proton conducting membranes with a high ion-exchange capacity and improved/lower water swelling [9-13]. These composite membranes were prepared, by electrospinning ionomer into a porous nanofiber mat and then impregnating an uncharged/hydrophobic polymer into the interfiber void space. Such an approach decouples the properties of the proton conducting ionomer from the uncharged polymer which provides mechanical strength to the membranes and improves the membrane's dimensional stability. Ionomers such as 1.21 meq/g and 1.36 meq/g PFSA (from 3M Company) and 2.1-2.5 meq/g sulfonated polysulfone were electrospun into porous nanofiber mats with fiber diameters <200 nm. The mats were compressed to increase the ionomer fiber volume fraction and then impregnated with Norland Optical Adhesive 63 (NOA63), a polyurethane liquid prepolymer which was subsequently UV-crosslinked in-situ to create a mechanically robust reinforcing matrix that surrounded every ionomer fiber. Highly sulfonated polyhedral oligomeric silsesquioxane (sPOSS, with an IEC of 4.8 meq/g) was added to PFSA nanofibers to further increase the proton conductivity. Thus, a membrane including 1.21 meq/g PFSA+sPOSS nanofibers embedded in a NOA63 matrix had a proton conductivity of 0.107 S/cm at 120° C. and 50% RH with half the in-plane dimensional swelling of a neat PFSA/sPOSS film [12].

In an effort to eliminate the polymer impregnation step during nanofiber composite membrane fabrication, the inventor Pintauro and co-worker developed a membrane fabrication strategy based on dual nanofiber electrospinning [14]. Nafion and uncharged polyphenylsulfone (PPSU) are simultaneously electrospun from separate syringes onto a common collecting surface. The resulting dual-fiber mat is then processed in one of two ways: (1) the PPSU material is allowed to soften and flow to fill the void space between Nafion nanofibers or (2) the Nafion polymer softens and flows around the PPSU web. In both cases, no polymer impregnation is needed and the final membrane (either Nafion nanofibers embedded in a PPSU matrix or a PPSU nanofiber mat reinforcing Nafion) was found to be fully dense and defect free. The final membranes had an excellent combination of properties in terms of proton conduction and dimensional stability (e.g. the proton conductivity decreased in proportion to the volume fraction of PPSU in the membrane but the in-plane water swelling dropped by a factor of 5).

Figure 4A:
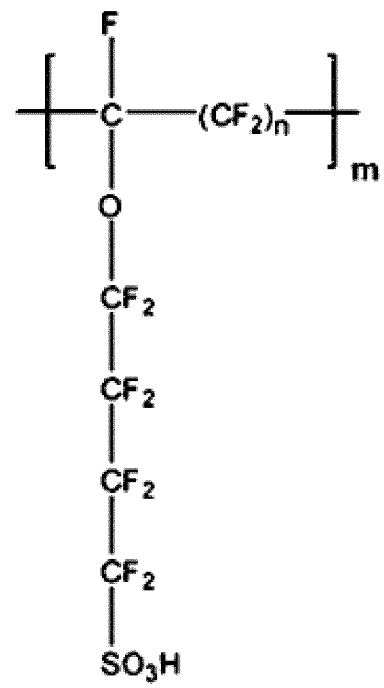
FIG. 4A shows schematically the chemical structure of 660 equivalent weight perfluorosulfonic acid according to one embodiment of the present invention.
Figure 4B:
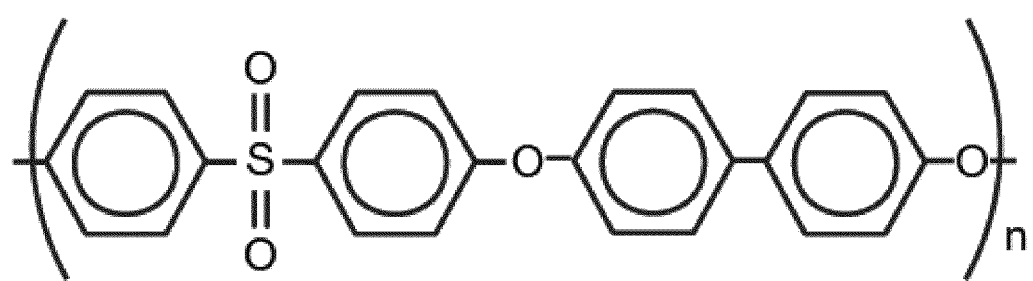
FIG. 4B shows schematically the chemical structure of polyphenylsulfone (PPSU) according to one embodiment of the present invention.

In this example, the use of the dual-fiber electrospinning technique to fabricate composite membranes of 3M Company's 660 equivalent weight ionomer (IEC=1.52 meq/g), hereinafter referred to as 3M660, and polyphenylsulfone (PPSU). The chemical structure of 3M660 is shown in FIG. 4A, where n=6.66, and the chemical structure of PPSU is shown in FIG. 4B. The two polymers were simultaneously electrospun into a dual-fiber electrospun mat with follow-on processing that allowed for the softening and flow of the 3M660 ionomer into the PPSU interfiber void space. The resulting membrane morphology was a 3M660 film reinforced by a mat of PPSU nanofibers. The final membrane was found to have excellent properties (proton conductivity and dimensional stability) for high temperature fuel cell applications.

PFSA polymers do not form true solutions, but rather micellar dispersions in organic solvents [15]. Thus, PFSA lacks the requisite chain entanglements for electrospinning and a carrier polymer must be added to improve electrospinnability, as described elsewhere [11, 12, 15, 16]. In this example, 1,000 kDa MW polyethylene oxide (PEO) was used as the carrier polymer.

3M660 and PEG solutions were prepared separately by dissolving 3M660 powder (from an evaporated liquid solution that was provided to us by 3M Company) and PEG powder (Sigma-Aldrich) into a mixed solvent of 2:1 wt. ratio n-propanol:water. The solutions were then combined where PEO constituted 0.3% of the total polymer weight.

PPSU (Radel R 5500NT from Solvay Advanced Polymers LLC) solutions were prepared by dissolving polymer in an 80:20 wt. ratio n-methyl-2-pyrrolidone:acetone solvent. The PPSU solution and 3M660/PEO solutions were drawn into separate syringes and electrospun using 22 gauge needles (Hamilton Company) onto a common rotating drum collecting surface. Electrospinning conditions are summarized in Table 1. The total electrospun volume of each polymer component fixed the composition of the final membrane. In the present study the nanofiber mat was composed of 70 vol % PFSA and 30 vol % PPSU.

TABLE 1

Electrospinning conditions for 3M660/PPSU dual-fiber mat

| Parameter | 3M660 | PPSU |
|---|---|---|
| Polymer Comp. | 99.7:0.3, 3M660:PEO (30 wt % total polymer in solution) | 25 wt % |
| Solvent | n-propanol:water in a 2:1 wt. ratio | NMP:acetone in a 8:2 wt. ratio |
| Voltage | 7.0 kV | 7.5 kV |
| SCD | 5.5 cm | 8.5 cm |

An electrospun dual-fiber mat (where 70% of the fibers are PFSA) was compressed at about 15,000 psi and 127° C. for about 10 seconds. The sample was rotated 90° three times and successively compressed to ensure even compression. The mat was then annealed in vacuum at 150° C. for 2 hours. During annealing, the 3M660 softened and flowed to fill the interfiber void space between PPSU fibers, as has been first reported in the reference [14] for Nation PFSA/PEO dual fiber mats. The membranes were then soaked in 1M $H_2SO_4$ for 16 hours and liquid water for 6 hours to ensure full protonation of sulfonic acid sites and the removal (leaching) of PEO from the membrane.

A Hitachi S-4200 scanning electron microscope was used to image electrospun mats and membranes. Samples were sputter-coated with a 5 nm gold layer to provide electrical conductivity and improve imaging. Freeze-fractured cross-sections were obtained after membrane immersion in liquid nitrogen.

In-plane membrane conductivity was measured by an AC impedance technique using a BekkTech 4-electrode cell. Measurements were performed in an ESPEC Corp. temperature/humidity controlled environmental chamber (Model: SH-241). Conductivity was also measured in room temperature liquid water. Conductivity was calculated by the following Equation (1).

$$\sigma = \frac{L}{w \times \delta \times R} \quad (1)$$

where $\sigma$ [S/cm] is proton conductivity, R [$\Omega$] is the measured resistance between the electrodes, L [cm] is the distance between the electrodes, w [cm] is the width of the sample in the dry state (usually 1 cm), and $\delta$ [cm] is the dry thickness of the sample (typically between 0.0030 and 0.0060 cm).

Water uptake as a function of relative humidity was determined with a sorption analyzer (TA Instruments Q5000 SA). A membrane sample was dried at 80° C. under dry nitrogen gas until the weight stabilized (about 3 hours) and then equilibrated at 20%, 40%, 60% and 80% humidity for 1 hour. After each humidity equilibration step, the membrane weight was recorded.

Water uptake in room temperature liquid water was determined after soaking the membrane in IM sulfuric acid for 16 hours, and then water for 6 hours. The surface of the membrane was wiped dry and the membrane's mass, area, and volume were recorded. The volumetric, gravimetric, and in-plane (areal) swelling was determined by the following Equation (2).

$$WaterSwelling(\%) = \frac{x_{wet} - x_{dry}}{x_{dry}} \times 100 \quad (2)$$

where x is the membrane's volume, mass, or area. IEC was determined by a conventional soaking and titration procedure. Polymer cations were exchanged by immersing a membrane sample (in the H+ form) in 1M NaCl for a minimum of 48 hours. After ion-exchange, the membrane was removed and the soak solution was titrated with 0.01 N NaOH solution until a pH of 7 was attained. IEC was calculated by the following Equation (3).

$$IEC = \frac{V \times N}{m_{dry}} \times 1000 \quad (3)$$

where IEC denotes ion-exchange capacity [meq/g], V [L] is the volume of titrating solution, N [mol/L] is the normality of the titrating solution, and $m_{dry}$ [g] is the dry mass of the membrane.

Figure 5:
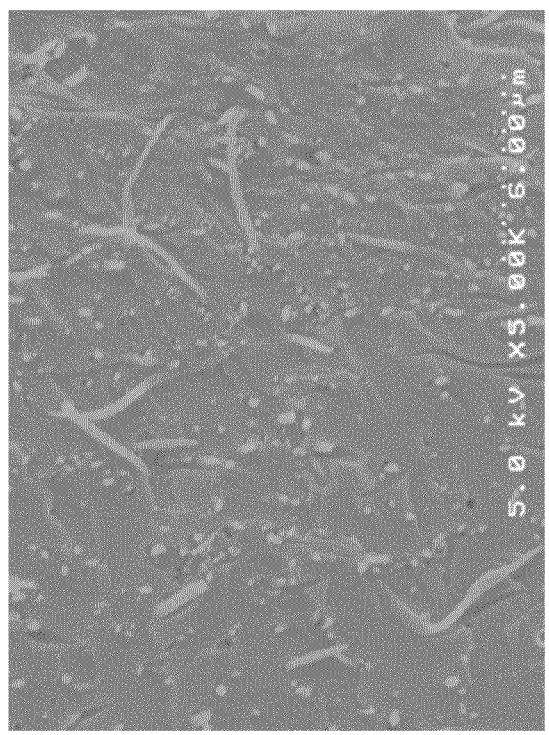
FIG. 5 shows SEM micrographs of (a) an electrospun dual-fiber mat of 3M660/poly(ethylene oxide) (PEO) fibers and PPSU fibers and (b) a freeze-fracture cross-section of a dense 3M660/PPSU nanofiber composite membrane where 3M660 has been softened and allowed to flow between PPSU fibers according to one embodiment of the present invention.
Figure 5:
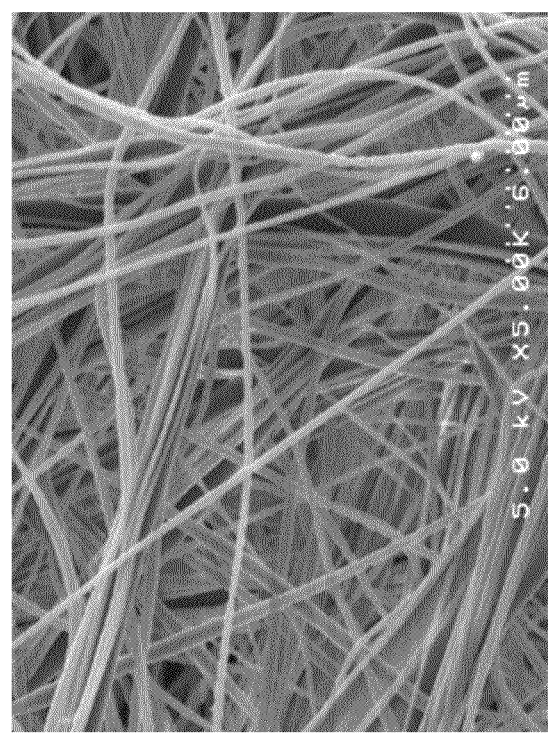

The SEM images of the surface of a dual-fiber electrospun mat are shown in FIG. 5, where the scale bars of the SEM images are 6 μm. The 3M660/PEO fibers and the PPSU fibers are visually indistinguishable by SEM, but 70% of the fibers are composed of 3M660/PEO, as determined by later IEC experiments. The average fiber diameter for the mat is 335 nm. The fiber mat was processed into a dense membrane by hot-pressing and annealing, at 150° C. for 2 hours. The cross-section of a densified/annealed membrane is shown in figure (b) of FIG. 5. The PFSA has softened and flowed into the PPSU inter-fiber void space. The membrane structure is similar to that in reference [14], with a 3M660 EW PFSA matrix reinforced by a nonwoven nanofiber mat of PPSU fibers. PFSA flow during nanofiber mat annealing has been observed by several investigators [11, 17]. The PFSA flow is attributed to morphological re-arrangements of the ionic domains above the a-transition temperature, as suggested by Moore and coworkers [18, 19].

Following densification/annealing, the membrane was soaked in 1M $H_2SO_4$ and water to ensure full protonation of all sulfonic acid fixed-charge sites and to remove any residual PEO from the membrane. Removal of PEO from the membrane is important; previous studies have shown that small amounts of PEO in PFSA reduce the ionomer conductivity, whereas acid and water treatments effectively extract PEO with full recovery of proton conductivity [11]. The amount of PEO within the membrane in the present studies was very small (0.3 wt %, as compared to the ionomer) and thus its removal from the membrane did not have any visible or structural effect on the membrane (i.e. PEO removal did not leave any defect voids in the final membrane). Fully processed membranes were typically 40-60 μm in dry thickness.

Figure 6:
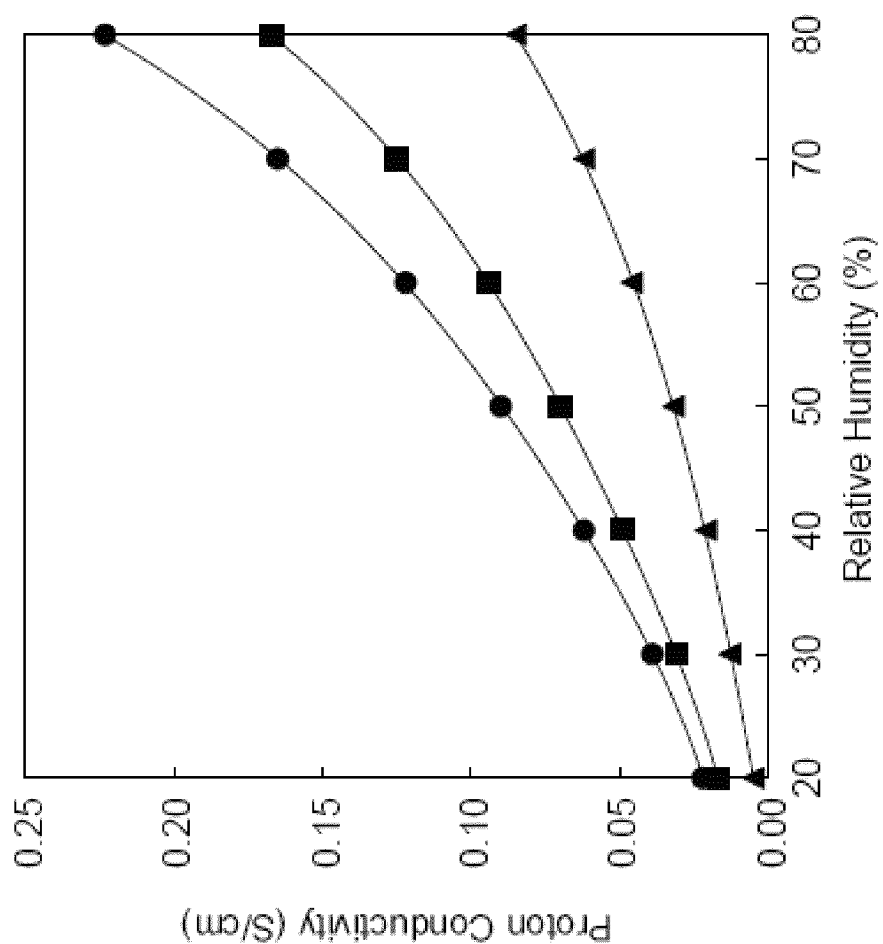
FIG. 6 shows a chart of in-plane proton conductivity as a function of relative humidity at 80° C. according to one embodiment of the present invention.

FIG. 6 shows a chart of in-plane proton conductivity as a function of relative humidity at 80° C. according to one embodiment of the present invention. In FIG. 6, the curve marked with (●) represents the in-plane proton conductivity of Solution-cast 3M660 membrane, the curve marked with (■) represents the in-plane proton conductivity of 3M660/PPSU composite membrane, and the curve marked with (▲) represents the in-plane proton conductivity of Nafion 212 membrane. The resulting 3M660/PPSU dense membrane has a high concentration of fixed charge sulfonic acid groups; the IEC was 1.23 meq/g, corresponding to a 3M660 membrane mass fraction of 0.81 and a membrane volume fraction of 0.70. The additional number of charge carriers, as compared to Nafion, result in a proton conductivity that is significantly higher than commercial Nafion 212, as shown in FIG. 6, where proton conductivity is plotted as a function of relative humidity at 80° C. Over the entire 20-80% humidity range, the conductivity of the EW660 nanofiber composite membrane was twice that of Nafion. The composite's conductivity is lower than a neat solution-cast 3M660 film due to dilution of sulfonic acid groups with PPSU. Thus, at 80° C. and 50% RH the composite has a conductivity of 0.070 S/cm compared to 0.032 S/cm for Nafion and 0.090 S/cm for 3M660.

Figure 7:
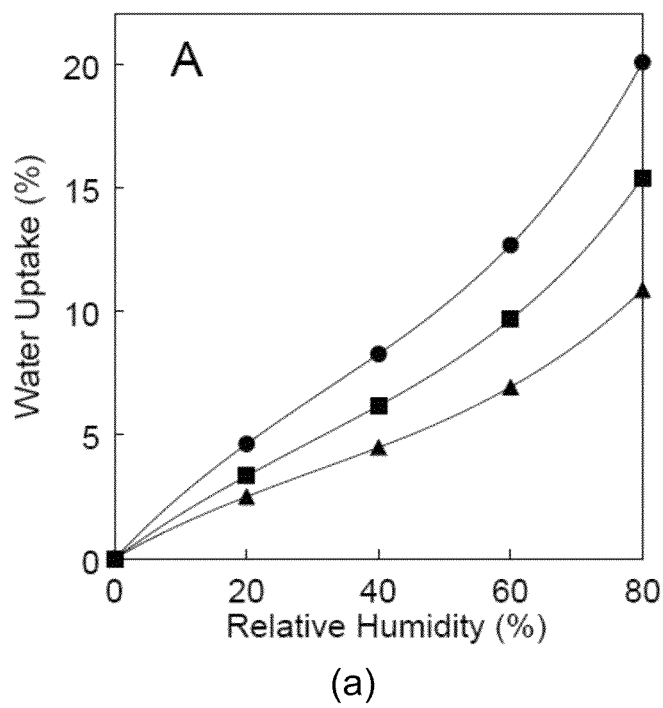
FIG. 7 shows charts of membrane water uptake as a function of relative humidity at 80° C. according to one embodiment of the present invention, where (a) shows Gravimetric water uptake and (b) shows water molecules per sulfonic acid group.
Figure 7:
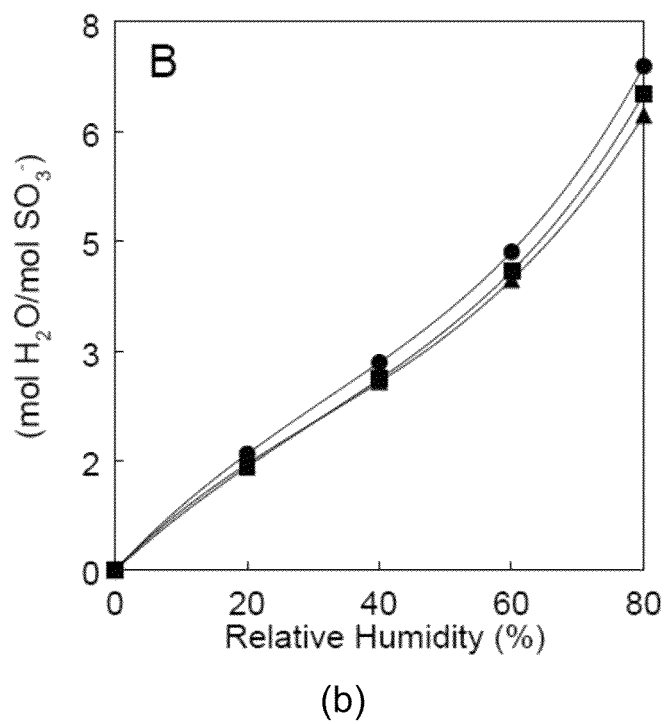

FIG. 7 shows charts of membrane water uptake as a function of relative humidity at 80° C. according to one embodiment of the present invention, where (a) shows gravimetric water uptake and (b) shows water molecules per sulfonic acid group. In FIG. 7, the curve marked with (●) represents the membrane water uptake of Cast 3M 660 membrane (IEC of 1.51 meq/g), the curve marked with (■) represents the membrane water uptake of 3M660/PPSU composite membrane (effective IEC of 1.23 meq/g), and the curve marked with (▲) represents the membrane water uptake of Nafion 212 membrane (IEC of 0.91 meq/g). High IEC films are more hydrophilic than ionomer films with a lower IEC. The increased concentration of acidic functional groups increases the osmotic driving force for membrane water swelling. As seen in figure (a) of FIG. 7, gravimetric water uptake is a strong function of the effective membrane IEC. A cast film of 3M660 (IEC of 1.51 meq/g) sorbs more water than the 3M660/PPSU composite film (IEC of 1.23 meq/g), which sorbs more than commercial Nafion 212 (IEC of 0.91 meq/g). Since the PPSU component of the nanofiber composite does not contain acidic functional groups and does not sorb water, there is a reduction in both IEC and water sorption for nanofiber composites as compared to a neat film of 3M660. While there is significantly higher water uptake for the neat 3M660 film, the number of water molecules per sulfonic acid site is constant, regardless of the IEC and the PFSA polymer type (Nafion vs. PFSA), as shown in figure (b) of FIG. 7.

High water content with minimal changes in areal swelling is important membrane properties for fuel cell applications [7, 8]. High water content is required for high proton conductivity whereas low in-plane swelling (as opposed to out-of-plane or thickness swelling) is highly desirable for increasing the useful lifetime of a fuel cell membrane during on/off cycling [20, 21]. The 3M660/PPSU composite membrane exhibited excellent dimensional stability, with an areal swelling that is lower than a neat 3M660 film and even lower than commercial Nafion (see Table 2). The low in-plane swelling is attributed to the absence of through-plane connectivity of the PPSU fibers, which allows the membrane to swell predominantly in the thickness direction upon water sorption, as discussed elsewhere (14).

TABLE 2

Membrane swelling and proton conductivity in room temperature water for a nanofiber composite membrane (70 vol % 660 EW PFSA matrix and 30 vol % PPSU fibers), a neat film of 3M 660EW polymer, and Nafion 212.

| Membrane | Mass Swelling [%] | Volumetric Swelling [%] | In-Plane Swelling [%] | Proton Conductivity [mS/cm] |
|---|---|---|---|---|
| 660EW/PPSU Composite | 53 | 87 | 5 | 107 |
| Cast 660 EW film | 71 | 137 | 84 | 132 |
| Nafion 212 | 16 | 35 | 25 | 95 |

According to the exemplary embodiment, membranes with high proton conductivity and low in-plane water swelling have been fabricated using the dual nanofiber electrospinning approach of the invention. 3M660 equivalent weight perfluorosulfonic acid polymer and polyphenylsulfone were simultaneously electrospun into a dual fiber mat with an average fiber diameter of 335 nm. Follow-on processing induced flow of the 3M660 polymer, resulting in a final membrane morphology where the 3M660 ionomer was reinforced by a nonwoven polyphenylsulfone nanofiber mat. The 3M660 component of the membrane imparted high conductivity to the membrane; the composite film had over twice the conductivity of commercial Nafion at 80° C. and 50% RH. The polyphenylsulfone nanofibers reduced the volumetric, gravimetric, and in-plane water swelling of the composite membrane relative to a neat film of 3M660 ionomer, with a lower areal swelling than Nafion 212. The combination of high proton conductivity and low planar swelling make this composite membrane an excellent candidate for long-term, high-temperature fuel cell operation.

Example Two

In this exemplary embodiment of the invention, nanofiber composite anion exchange membranes were created by electrospinning two polymers: a chloromethylated polysulfone that would ultimately serve as the hydroxide ion conductor and an uncharged polyphenylsulfone to limit water swelling and provide mechanical strength to the final membrane. After electrospinning, the chloromethyl groups were converted into quaternary ammonium moieties for hydroxide ion conduction. The polyphenylsulfone nanofibers were then selectively made to flow and fill the void space in the dual fiber mat, thus forming a dense, defect free membrane. The final membrane morphology was a quaternized polysulfone interconnecting nanofiber network embedded in a polyphenylsulfone matrix. For a membrane containing 63 vol % anion-exchange polymer fibers (with a fiber IEC of 2.5 mmol $g^{-1}$), the $OH^-$ ion conductivity was high (40 mS $cm^{-1}$ in 23° C. water) and the equilibrium water swelling at room temperature was moderately low (70 vol %).

In this example, chloromethylated polysulfone, which is a charged polymer precursor, is used as the first polymer, and PPSU, which is an uncharged polymer, is used as the second polymer. The melting (or softening and flowing) process of the PPSU includes compressing and solvent vapor exposure processes. FIGS. 8-11 show the characteristics of the nanofiber composite anion exchange membranes.

Alkaline anion-exchange membrane fuel cells (AAEMFCs) are a potentially significant technology that could compete with the more popular and well-studied PEM fuel cells for a variety of applications [22]. The primary driving force for investigating AAEMFCs is the prospect of replacing platinum group metals in the electrodes with a less expensive non-noble metal, such as nickel or silver [23-25]. Most commercial dialysis/electrodialysis AEMs, however, were not designed to withstand the harsh highly alkaline and high temperature operating environment of an AAEMFC [26]. Thus, a major challenge in AAEMFC development has been the identification of a suitable polymer electrolyte membrane that possesses high hydroxyl ion conductivity with good mechanical properties, moderate water swelling, and long-term chemical stability [27]. A fundamental drawback of all AEMs is the lower inherent mobility of hydroxide anions as compared to protons which adversely affects ionic conduction in an AEM [27]. To compensate for this problem, membrane researchers have focused their attention on the use of high ion-exchange capacity polymers, but this strategy exacerbates the problems of membrane brittleness in the dry state and poor mechanical strength when the membrane is fully hydrated [28].

There are numerous reports in the literature on the fabrication and testing of AEMs with mechanical and transport properties that may be suitable for AAEMFCs. The most common backbone materials include polysulfones [27, 29-35], poly(arylene ether)sulfones [25, 36-41], polyphenylene [27], and polyphenylene oxide [27, 42]. The fixed-charge ion-exchange sites are normally quaternary ammonium groups, but phosphonium moieties have also been investigated [29-31]. For the case of a quaternary ammonium polysulfone (QAPSF), an IEC as high as 2.5 mmol/g can be achieved before polymer dissolution in water [27].

In order to make functional membranes with dimensional stability (controlled water swelling) and good mechanical properties from highly charged polymers, a nanofiber composite membrane morphology and dual fiber fabrication scheme by the inventor Pintauro and co-workers [11-12, 43]. Proton conducting fuel cell membranes were successfully prepared by electrospinning a nanofiber mat from a sulfonated aromatic hydrocarbon polymer or from a perfluorosulfonic acid material, followed by filling the inter-fiber voids with an uncharged (or minimally charged), uncharged polymer. In such a forced assembly electrospun system, the polymer material for ion conduction is decoupled from the polymer that is used to impart mechanical strength to the membrane. The use of a nanofiber composite membrane morphology for PEMs significantly improved membrane mechanical properties while reducing water swelling [43]. Recently, it was shown by the inventor Pintauro and co-worker that a nanofiber composite membrane can be made without a separate polymer impregnation step [44, 45]. Two polymers (the ionomer and the uncharged polymer) are electrospun simultaneously followed by mat processing steps where one of the polymers softens, flows, and fills the inter-fiber voids while the nanofiber morphology of the second polymer remains intact.

In this example, it is shown that electrospinning methods can be used to fabricate a nanofiber composite AEM. Specifically, the dual fiber electrospinning method as used in fabricating the PEM is applied to fabricate a two-component membrane morphology, where charged nanofibers composed of quaternized polysulfone (the first polymer) are surrounded by uncharged polyphenylsulfone (the second polymer). A series of membranes with different effective IECs were made and then characterized by hydroxyl ion conductivity, equilibrium water uptake, and mechanical property analysis.

Dual fiber nanocomposite membranes were fabricated using an uncharged/uncharged (or minimally charged) polymer, Radel® polyphenylsulfone (from Solvay Advanced Polymers, LLC) as the second polymer, and a chloromethylated form of Udel® polysulfone (MW=35,000 g/mol), also from Solvay Advanced Polymers, LLC, as the first polymer. After mat processing, the chloromethylated Udel polysulfone was converted into a quaternary ammonium AEM, and then the mat was processed into a non-porous defect-free membrane. All reagents discussed below were used as received, without further purification.

Chloromethylated polysulfone (CMPSF) was synthesized by the procedure described by Avram and co-workers [46]. 4.5 g of pre-dried polysulfone was dissolved in 225 mL of chloroform, to which 3.06 g of paraformaldehyde was added. After raising the temperature of the solution to 50° C. and sparging the solution with nitrogen gas, 10.2 g of chlorotrimethylsilane and 0.53 g of tin (IV) chloride were added, the headspace was blanketed with nitrogen, and the reaction vessel was sealed under a reflux condenser. Reaction times between 24 and 72 hours yielded polysulfones with different extents of chloromethylation.

The electrospinning conditions for preparing a dual fiber mat with polyphenylsulfone (PPSU) and CMPSF are listed in Table 3. The same conditions were used for CMPSFs with different degrees of chloromethylation. The quaternary ammonium form of polysulfone could not be electrospun into a fiber mat; the polymer solution only electrosprayed into micron-size droplets. In the example, all mats contained 63 vol % CMPSF and 37 vol % PPSU.

TABLE 3

Electrospinning conditions for making a dual-fiber AEM mat

| | Polymer Concentration (w/w) | Applied Voltage (kV) | Flow Rate (mL/hr)[a] | Spinneret/Collector Distance (cm) |
|---|---|---|---|---|
| Radel PPSU | 25 (in 4:1 wt. ratio NMP/Acetone) | +8.5 | 0.7 | 9 |
| Udel CMPSF | 25 (in DMF) | +10.5 | 1.0 | 9 |

[a]Needle tip voltage relative to a grounded fiber collector

After electrospinning, the total nanofiber volume fraction of a dual fiber mat was about 0.25. The mat was compacted at 2,000 psi to increase the volume fraction of fibers to about 50%, then exposed to chloroform vapor for 2.25 minutes to weld intersecting CMPSF fibers. After drying at 70° C. to remove excess chloroform, the mats were soaked in an aqueous solution of 50% trimethylamine (TMA) for 48 hours, to convert the chloromethyl moieties of CMPSF to quaternary ammonium fixed-charge sites. The mat was then washed with deionized (DI) water to remove TMA, compressed at 15,000 psi for a few seconds to further increase the fiber volume fraction, and then exposed to tetrahydrofuran (THF) vapor at room temperature for 20 minutes. During the last vapor exposure step, uncharged PPSU fibers (the second polymer fibers) selectively softened and flowed to fill the void space between quaternary ammonium polysulfone (QAPSF) fibers, thus forming a dense and defect-free membrane. The resulting AEM was soaked in 1 M KOH solution exchanged several times over a 24 hr period to substitute hydroxide ions for Cl⁻ on all quaternary ammonium anion-exchange sites. The membranes were then washed in degassed DI water several times over 24 hours to remove excess KOH, then stored until further testing in sealed containers containing de-gassed DI water.

$^1$H NMR spectra for CMPSF and QAPSF polymers were collected on an AV-400 Bruker spectrometer. Solutions of both polymers were about 1% w/v in deuterated chloroform (for CMPSF) or dimethylsulfoxide (for QAPSF). NMR spectra were used to calculate the degree of chloromethylation for CMPSF and the IEC for QAPSF.

The morphology of the membranes at various stages of processing was monitored/characterized by SEM micrographs using a Hitachi 2-4200 instrument. The average fiber diameter of an electrospun mat was determined from SEM micrographs using ImageJ software. At least 80 fibers were included in an average fiber diameter calculation.

The in-plane hydroxyl ion conductivity of membranes was measured by electrochemical impedance spectroscopy, using a Gamry potentiostat and a four-probe Bekktech conductivity cell. Data were collected in room temperature (23° C.) liquid water. Conductivity was calculated by Equation (1):

$$\sigma = \frac{L}{w \times \delta \times R} \quad (1)$$

where σ=conductivity (S/cm), L=distance between the two working electrodes (cm), w=width of the membrane sample (cm), δ=membrane thickness (cm), and R is the calculated ionic resistance (Ω). Both δ and w are wet-state dimensions.

Liquid water uptake was calculated on a volumetric basis by comparing the physical dimensions (thickness and area) of a dry membrane with those of the same sample after water equilibration. All water uptake measurements were performed at 23° C.

Mechanical property data were taken on a TI-Instruments DMA in tensile mode. The strain rate was 0.1N/min, equilibrated at 30° C.

Figure 8:
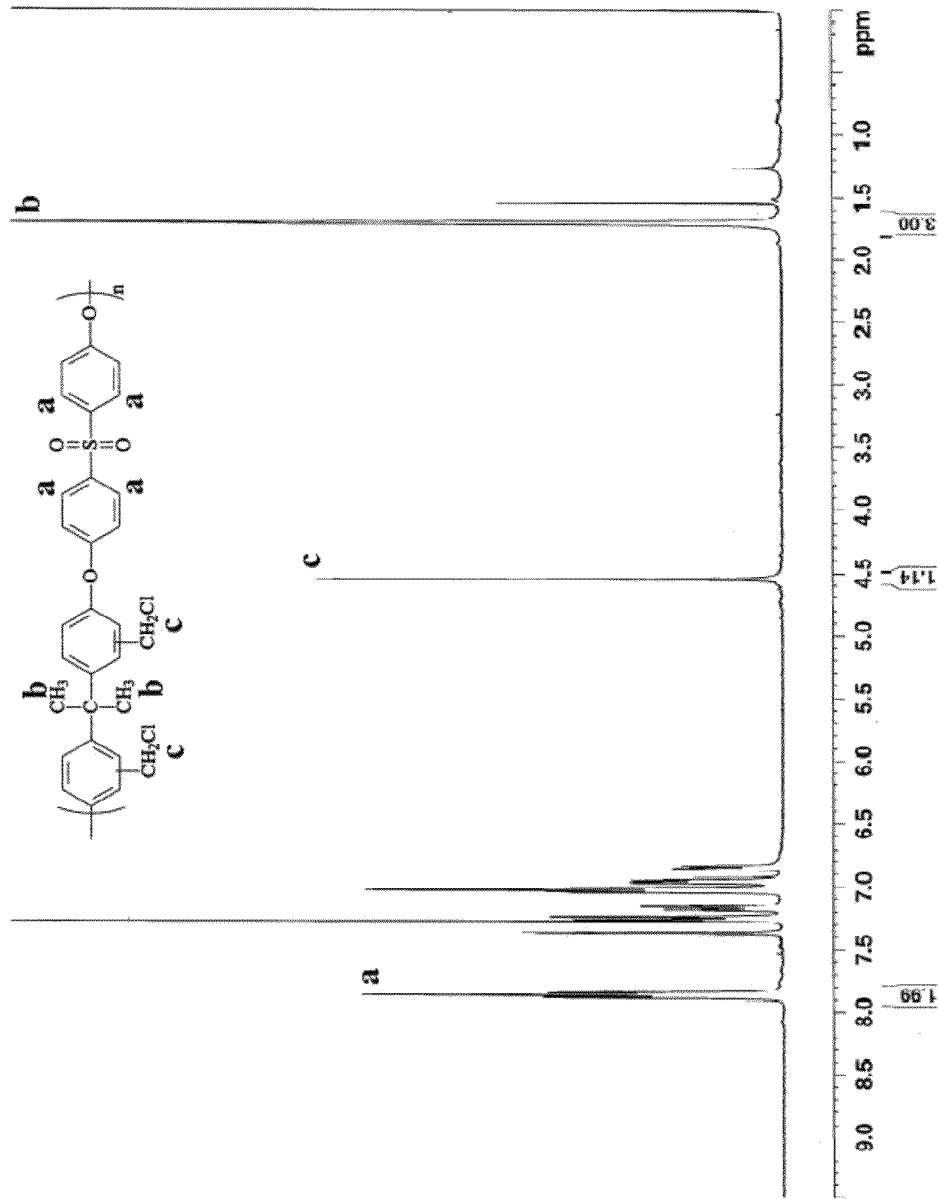
FIG. 8 shows a NMR spectrum of a chloromethylated polysulfone (CMPSF), showing peaks and the corresponding molecular hydrogens according to one embodiment of the present invention.

Before electrospinning, four synthesized CMPSF polymers were analyzed in terms of their degree of chloromethylation and their IEC after quaternization. The number of tethered chloromethyl groups per repeat unit of polysulfone (the degree of chloromethylation) was determined from $^1$H NMR spectra of polymer samples. A typical spectrum is shown in FIG. 8, which is a NMR spectrum of a chloromethylated polysulfone (CMPSF), showing peaks and the corresponding molecular hydrogens according to one embodiment of the present invention. FIG. 8 labels the peaks associated with the four hydrogens surrounding the sulfone group in the PS backbone (peak 'a'), the six hydrogens in the bis-phenyl-A component of the polysulfone backbone (peak 'b'), and the peak at 4.6 ppm (peak 'c') for hydrogens associated with the chloromethyl groups. From a simple ratio of these three peaks, the degree of chloromethylation was determined. Similarly, the IEC of QAPSF could be found by comparing the hydrogen peak from quaternary ammonium groups at 3.1 ppm to the same hydrogen signals from PS backbone groups.

Figure 9:
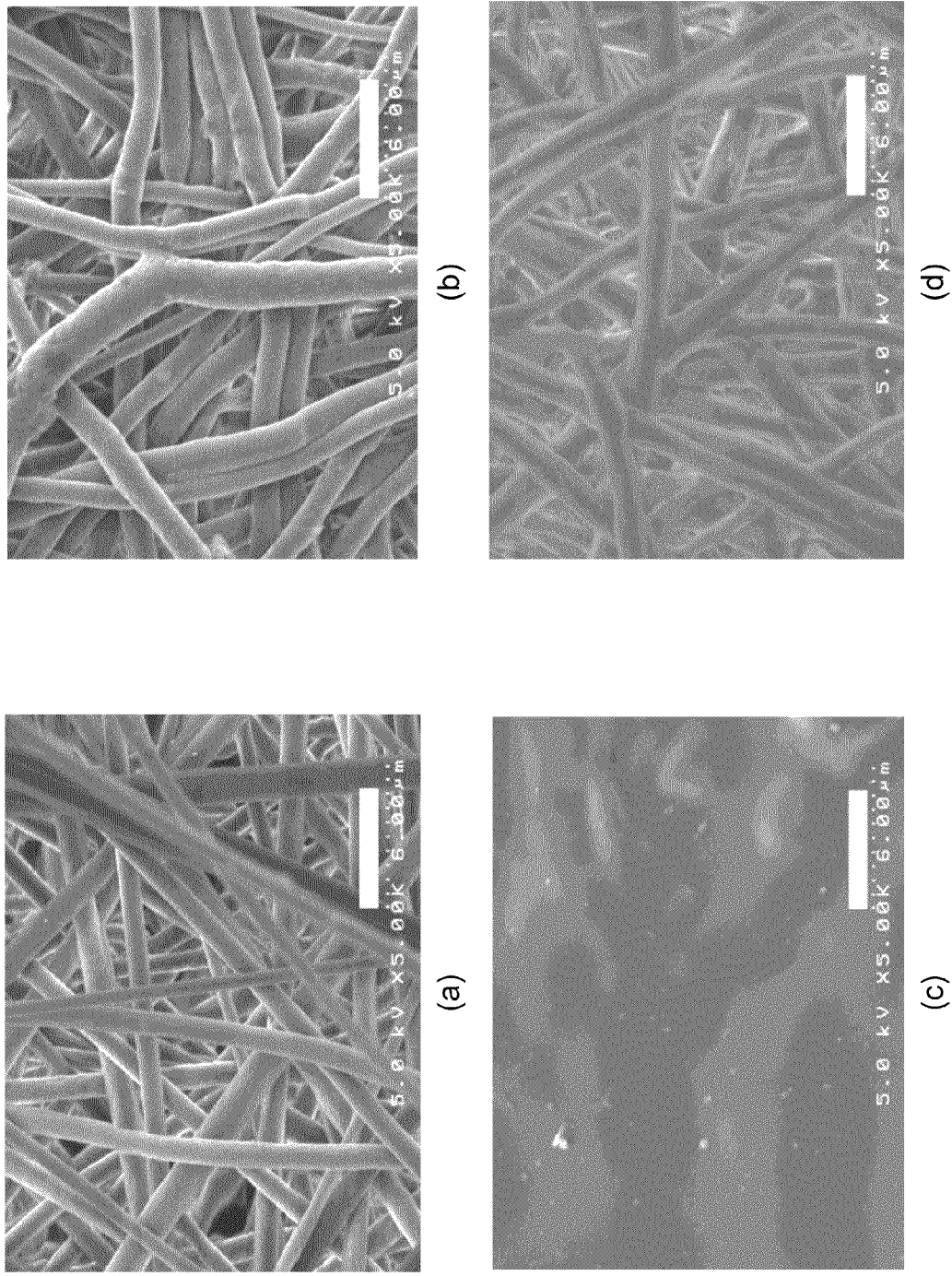
FIG. 9 shows SEM micrographs of (a) as-spun dual fiber mat of CMPSF and PPSU, (b) dual fiber mat of quaternized polysulfone (QAPSF) and PPSU (post-quaternization), (c) surface of composite membrane after PPSU has filled the void volume between QAPSF fibers, and (d) QAPSF fiber network after dissolving PPSU matrix with tetrhydrofuran (THF) from the composite membrane in (c) according to one embodiment of the present invention.

FIG. 9 shows SEM micrographs for the chloromethylated PS polymers according to one embodiment of the present invention. All scale bars in FIG. 9 represents 5 µm. Values for the degree of chloromethylation and the polymer IEC after quaternization are listed in Table 4. None of the quaternized polymers was soluble in water.

TABLE 4

Characterization of CMPSF polymers used for electrospinning

| Batch | Degree of Chloromethylation | Neat Film IEC (mmol/g) |
|---|---|---|
| 1 | 1.08 | 2.02 |
| 2 | 1.14 | 2.17 |
| 3 | 1.28 | 2.39 |
| 4 | 1.33 | 2.47 |

SEM micrographs of the dual fiber mat surface before and after quaternization are shown in figures (a) and (b) of FIG. 9. The fibers are indistinguishable in terms of polymer composition. The average fiber diameter was 950 nm before quaternization, and 1050 nm afterward. This slight increase in fiber diameter is associated with water vapor sorption by the hydrophilic QAPSF mats. No attempt was made to decrease/minimize the fiber diameter. A top-down SEM of a fully processed composite membrane, after PPSU melting and void volume filling, is shown in figure (c) of FIG. 9. No defect voids or pin holes are visible. Individual QAPSF nanofibers, however, cannot be observed. To prove that the QAPSF fibers remain intact after mat processing, the membrane in (c) was soaked in liquid THF to selectively dissolve the PPSU matrix while leaving QAPSF intact. The resulting QAPSF fiber network is shown in figure (d) of FIG. 9.

Figure 10:
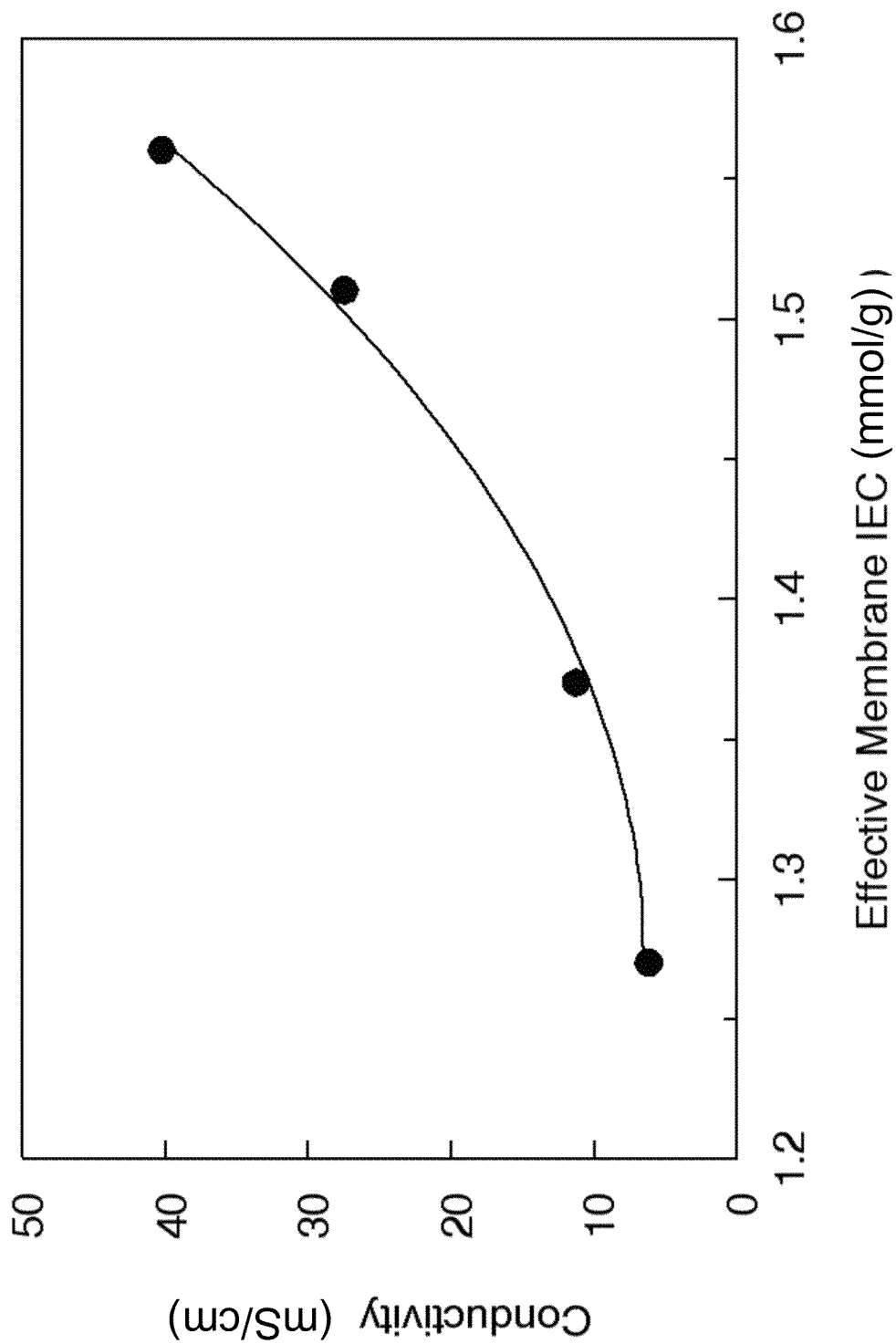
FIG. 10 shows a chart of in-plane OH⁻ ion conductivity in water at 23° C. versus membrane IEC for the composite membranes according to one embodiment of the present invention.

Measured in-plane hydroxyl ion conductivities for the composite membranes are plotted as a function of effective membrane ion-exchange capacity (given as the product of the QAPSF fiber volume fraction and the fiber IEC) in FIG. 10, which shows in-plane OH⁻ ion conductivity in water at 23° C. versus membrane IEC for the composite membranes according to one embodiment of the present invention. For comparison purposes, the properties (OH⁻ conductivity and water swelling) of neat QAPSF solution cast membranes are listed in Table 5.

TABLE 5

Conductivity and Water Swelling Properties of Neat/Homogeneous Membranes from Quaternized Polysulfone

| Neat Film IEC (mmol/g) | OH⁻ Conductivity[1] (mS/cm) | Equilibrium Water Swelling [2] (%) |
|---|---|---|
| 2.02 | 9.8 | 48 |
| 2.17 | 15.0 | 70 |
| 2.37 | 29.6 | 141 |
| 2.49 | 32.6 | 170 |

[1] In-plane conductivity, measured in water at 23° C.
[2] Volumetric liquid water swelling at 23° C.

For the two composite membranes with the lowest effective IEC, the conductivity scaled linearly with QAPSF volume fraction in the membrane. For the two higher IEC fiber films, the conductivity was greater than expected, based on the fiber IEC, the volume fraction of fibers in the composite membrane (0.63), and the conductivity of a neat/homogeneous high IEC QAPSF film (see Table III). This result is associated with the lower water uptake of high IEC fibers in a composite membrane (due to the presence of the uncharged (or minimally charged) PPSU matrix) which results in a higher volumetric concentration of fixed-charges and a higher OH⁻ conductivity.

Figure 11:
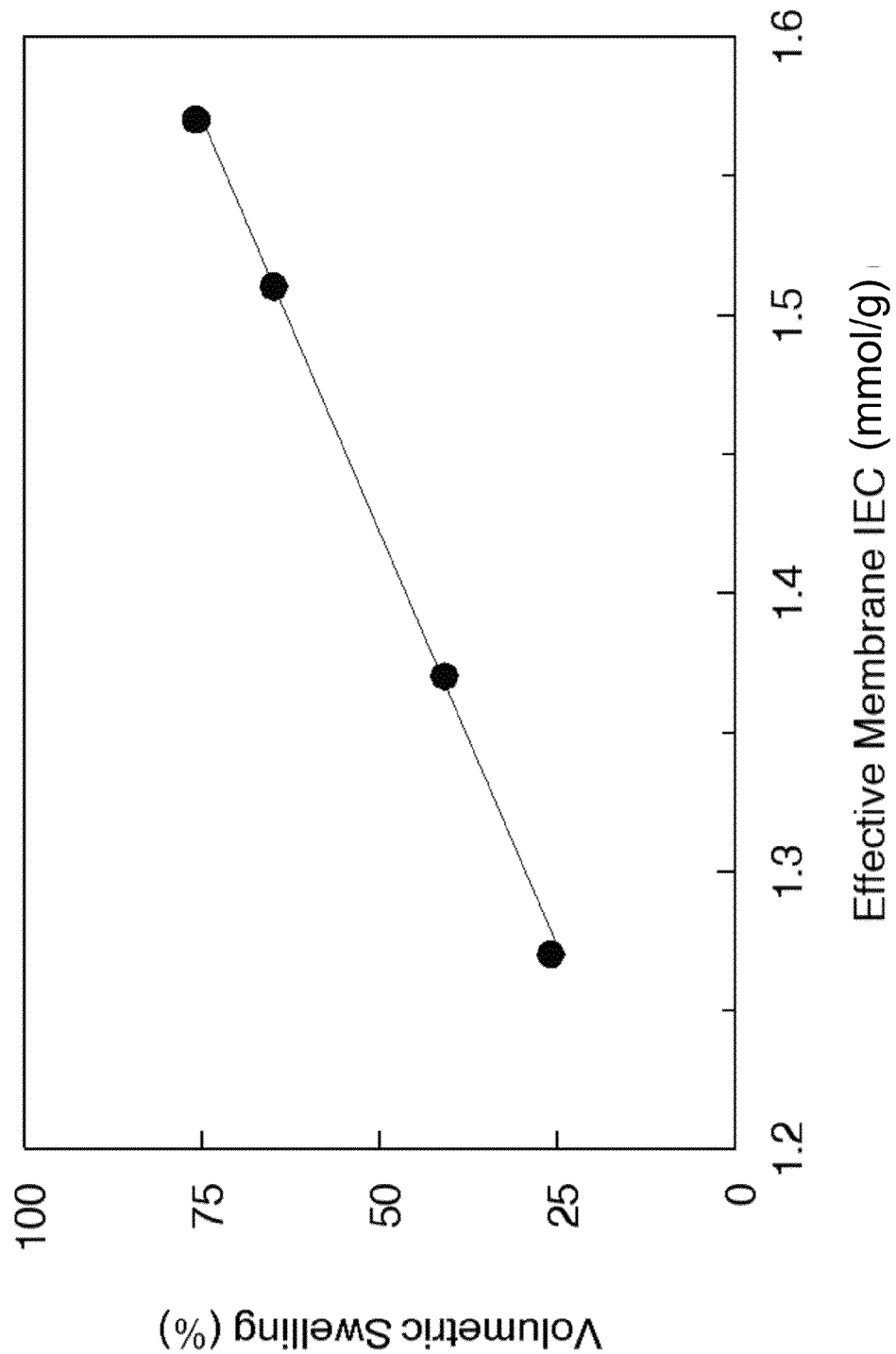
FIG. 11 shows a chart of equilibrium volumetric water swelling of membranes at 23° C. vs. IEC for the composite membranes according to one embodiment of the present invention.

FIG. 11 shows a chart of equilibrium volumetric water swelling of membranes at 23° C. vs. IEC for the composite membranes according to one embodiment of the present invention. Membrane water swelling is plotted as a function of effective membrane IEC in FIG. 11. At all IECs, membrane swelling by water is reduced by the uncharged (or minimally charged) PPSU matrix that surrounds the QAPSF fiber network. The best gains in water swelling (the greatest difference in swelling between the neat polymer and composite membranes) occurred at the higher IECs, where swelling is reduced by a factor of about 2.5. Thus, water swelling of the composite membranes was less than expected, based on the membrane volume fraction of fibers, the fiber IEC, and the inherent swelling of QAPSF polymer at a given IEC.

Stress/strain data were collected on the composite membrane with the highest IEC (an effective IEC of 1.57 mmol/g, where the membrane fibers are 2.49 mmol/g QAPSF). After drying in an oven at 70° C. to remove water, the membrane exhibited good strength (a stress at break of 17 MPa), but its elongation at break was only 2.5%. When the same test was performed on a water-equilibrated membrane, the stress at break increased to 25 MPa and the elongation at break increase to 7%. While the nanofiber composite membranes are stiff with a low strain at break, they are significantly more flexible and more robust mechanically than a homogenous membrane composed of the same anion-exchange polymer as the fiber network. For example, a homogeneous quaternized polysulfone membrane with an IEC of 2.49 mmol/g could not be tested for mechanical properties in either the wet or dry states; dry, cast film samples shattered on handling, and wet samples swelled to gel-like proportions and lost all mechanical strength.

Briefly, in this example, anion-exchange membranes composed of an interconnected network of submicron diameter quaternary ammonium polysulfone (QAPSF) fibers embedded in polyphenylsulfone (PPSU) have been fabricated and characterized. The dual fiber electrospinning approach was used to make the membranes, where chloromethylated polysulfone and polyphenylsulfone were separately and simultaneously electrospun into a dual fiber mat. The mat was then transformed into a dense and defect-free membrane by the following processing steps: mat compression, welding and then quaternization of chloromethylated fibers, a second mat compression to further increase the fiber volume fraction, and finally mat exposure to THF solvent to allow the polyphenylsulfone fibers to soften, flow, and fill the void volume between the charged fibers. All membranes had a quaternized polysulfone volume fraction of about 0.63 and a polyphenylsulfone volume fraction of about 0.37. The effective ion-exchange capacity of the final membrane was varied by using different chloromethylated polysulfones during electrospinning (different extents of chloromethylation). When a highly chloromethylated polysulfone was employed, the final composite membrane IEC (1.57 mmol g⁻¹) and conductivity (40 mS/cm in 23° C. water) were high, but the equilibrium water swelling was exceptionally low (70% at 23° C. vs. 170% for a homogeneous membrane with the same IEC as the fibers in the composite film). The low water swelling was attributed to the presence of the polyphenylsulfone matrix which limited water uptake by the charged fibers. Additionally, nanofiber composite membranes with a high effective IEC exhibited improved mechanical properties when wet and dry, as compared to homogenous films of quaternized polysulfone. The resulting membranes are excellent candidates for use in alkaline fuel cells.

In the present example, the chloromethylated polymer nanofibers were quaternized by reaction with trimethylamine, thus creating tetramethylammoinium ion-exchange sites. One can alternatively converted the chloromethylated fibers to an anion-exchange polymer with phosphonium ion-exchange groups ro with quanidinium ion-exchange groups by functionalization with the proper reagent.

Example Three

FIGS. 12-17 show an Example Three of the present invention, where PEMs are fabricated and used for PEM fuel cells. In this example, Nafion, which is a charged polymer, and PPSU, which is an uncharged polymer, are used as the first polymer and the second polymer (to electrospin Nafion PEO was used as a carrier polymer, so the fibers were a Nafion/PEO). When the Nafion/PEO is used as the second polymer, the melting (or softening and flowing) process of the Nafion/PEO includes compressing and thermal annealing processes. When the PPSU is used as the second polymer, the melting (or softening and flowing) process of the PPSU includes compressing, solvent vapor exposure and thermal annealing processes.

According to the exemplary embodiment, Nafion and polyphenylsulfone are simultaneously electrospun into a dual-fiber mat. Follow-on processing of the mat produces two distinct membrane structures (1) Nafion nanofibers embedded in uncharged (or minimally charged)/uncharged polyphenylsulfone and (2) Nafion reinforced by a polyphenylsulfone nanofiber network. For structure (1), the Nafion component of the fiber mat is allowed to soften and flow to fill the PPSU interfiber void space without damaging the PPSU fiber structure (by use of a mat compression step followed by thermal annealing). For structure (2), the PPSU material in the mat is allowed to soften and flow into the void space between Nafion nanofibers without damaging the Nafion fiber structure (by mat compression, exposure to chloroform solvent vapor, and then thermal annealing). Both membrane structures exhibit similar volumetric/gravimetric water swelling and in-plane proton conductivity, where the conductivity scales linearly with Nafion volume fraction and the swelling is less than expected based on the relative amounts of Nafion. The in-plane liquid water swelling of membranes with Nafion reinforced by a polyphenylsulfone nanofiber network is always less than that of the inverse structure. On the other hand, the mechanical properties of membranes with Nafion nanofibers embedded structure (1), polyphenylsulfone are superior to membranes with the opposite structure. Compared to other fuel cell membranes, the nanofiber composite membranes exhibit very low in-plane water swelling and better mechanical properties, which translates into improved membrane/MEA longevity in a hydrogen/air open circuit voltage humidity cycling durability test with no loss in power production as compared to a Nafion 212 membrane.

Nafion has been widely studied as the membrane material in hydrogen/air fuel cells due to its high proton conductivity and inherent thermal/mechanical/chemical stability [47]. For long-term use with numerous on/off cycles, such as the case for automotive applications, researchers have found that Nafion undergoes undesirable dimensional swelling and shrinking which eventually leads to membrane degradation [48, 49]. During hydrogen/air fuel cell operation at an elevated temperature (e.g., 80° C.), the proton-exchange membrane swells with water due to the presence of humid feed gases and the production of water at the cathode. After shutdown, the system cools, the supply of humid gases ceases, and the membrane dehydrates and shrinks Tensile and compressive forces on the membrane are generated during membrane swelling/shrinking events due to physical constraints on the membrane (as part of the membrane-electrode-assembly, MEA) in a fuel cell fixture [50]. These forces cause unwanted membrane/electrode delamination, membrane creep, and pinhole formation [51, 52]. Few membrane materials have been fabricated to address this problem, although there have been numerous studies where Nafion swelling has been investigated [51, 53-56].

Water swelling of a charged polymer can be controlled by the presence of physical crosslinks. Such crosslinks are generated by blending the ionomer with a hydrophobic/uncharged polymer. Solution cast blended films of Nafion and an uncharged polymer are problematic due to the incompatibility of Nafion with typical membrane casting solvents (i.e., Nafion forms a micellar dispersion and not a true polymer solution in typical membrane casting solvents such as dimethylformamide and dimethylacetamide) and with the uncharged polymer itself. With poorly dispersed blends there is little or no control of membrane swelling and no improvement in membrane mechanical properties [57]. Nonetheless, there have been a number of Nafion blending studies in the fuel cell literature involving the addition of polyvinylidene fluoride (PVDF) [58-61]. One study found that PVDF and Nafion had poor miscibility below 60 wt % Nafion loading [62]. Water swelling was controlled (reduced from 37% for Nafion to about 27% for a blend membrane with 80 wt % Nafion), but the proton conductivity was dramatically reduced (from 0.052 S/cm for neat Nafion to 0.012 S/cm for the Nafion/PVDF blend).

An alternative strategy to blended Nafion fuel cell membranes is an impregnated composite membrane construct. For fuel cell applications, the most well known impregnated membrane material is the GORE-SELECT product line from W. L. Gore & Associates where Nafion is impregnated into an expanded Teflon sheet. In one iteration of the GORE-SELECT membrane, the conductivity was half that of Nafion 112 (due to the presence of the uncharged (or minimally charged) PTFE support material), but dimensional stability was improved (linear in-plane shrinkage upon dehydration was reduced from 11% for Nafion to 3%) [63]. The impregnation processing step is the primary drawback of this type of composite membrane material. Typically, multiple ionomer solution impregnations are required with intermittent solvent evaporation (membrane drying) steps. Complete filling of the uncharged (or minimally charged) matrix void volume is often challenging and there could be undesirable membrane swelling issues if the solvent of the ionomer impregnation solution sorbs into the uncharged (or minimally charged) matrix polymer.

Separate Nafion and polyethylene oxide (PEO) solutions were prepared by dissolving Nafion powder (prepared by evaporating the solvent from LIQUION 1115, Ion Power, Inc.) and PEO powder (Sigma-Aldrich, 400 kDa MW) into a 2:1 weight ratio n-propanol:water mixture. These two solutions were then combined to form a Nafion/PEO electrospinning solution where PEO constituted 1 wt % of the total polymer content.

PPSU (Radel R 5500NT from Solvay Advanced Polymers, LLC) solutions were prepared by dissolving polymer powder in a 80:20 wt. ratio of n-methyl-2pyrrolidone:acetone. The PPSU solution and Nafion/PEO solution were each drawn into separate syringes, e.g., the syringes 22 as shown in FIG. 2, and electrospun using 22 g needles (Hamilton Company). PPSU fibers and Nafion/PEO fibers were simultaneously collected on a rotating aluminum drum that also oscillated laterally to ensure a random distribution and orientation of fibers with a uniform fiber density. The flow rates and concentrations of Nafion/PEO and PPSU were varied to produce fiber mats of varying compositions (i.e. different Nafion volume fractions). Nafion/PEO was electropsun at flow rates ranging from 0.10 mL/hr to 0.60 mL/hr and concentrations from 20 wt % to 25 wt %. PPSU was electrospun at flow rates from 0.04 mL/hr to 0.40 mL/hr, at a constant concentration of 25 wt %: For Nafion/PEO electrospinning, the spinneret-to-collector distance (SCD) was fixed at 5.5 cm and the voltage was set between 3.75 and 4 kV. PPSU was electrospun at 7.5 kV with a SCD of 8.5 cm. All electrospinning experiments were performed at room temperature, where the relative humidity was 22-40%.

Electrospun mats were processed in two different ways to give two distinct membrane morphologies.

Method for Membranes where a Nafion Film is Reinforced by a PPSU Nanofiber Network:

The electrospun mat was compressed at 15,000 psi and 127° C. for about 10 seconds. The sample was rotated 90° three times and successively compressed to ensure even compression. The mat was then annealed in vacuum at 150° C. for 2 hours. The resulting membrane was boiled in 1M sulfuric acid and de-ionized water for one hour each to remove residual PEO and to protonate all ion-exchange sites. Membranes were fabricated with Nafion volume fractions ranging from 0.33 to 1.0 (for a membrane with a Nafion volume fraction of 1.0, a mat with no PPSU fibers was processed as described above).

Method for Membranes where Nafion Nanofibers are Embedded in PPSU:

Electrospun mats were compressed at 3,500 psi and 23° C. The sample was rotated 90° 3 times and successively compressed to ensure even compression. The mat was suspended above liquid chloroform at 23° C. (i.e., exposed to chloroform vapor) in a sealed jar for 8-16 minutes (depending on the Nafion volume fraction, e.g., 16 minutes for mats with 70 vol % Nation; 8 minutes for mats with 30 vol % Nafion). The membranes were immediately dried at 70° C. for 1 hour and then at 140° C. for 10 minutes, followed by thermal annealing of the Nafion (150° C. for 2 hours under vacuum). The membranes were then boiled in 1M sulfuric acid for one hour and boiled in de-ionized water for one hour. Membranes with Nation nanofibers embedded in PPSU were fabricated with Nation volume fractions ranging from 0.09 to 0.68.

Electrospun mats and membranes were imaged with a Hitachi S-4200 scanning electron microscope. Samples were sputter-coated with a gold layer (about 5 nm) to provide electrical conductivity. Freeze-fractured membrane cross-sections were prepared by immersing samples in liquid nitrogen. Fiber diameters were calculated using the ImageJ software package.

In-plane proton conductivity was measured by AC impedance. Water-equilibrated membrane samples were loaded into a BekkTech 4-electrode cell and immersed in water. Conductivity was calculated using the Equation (1).

$$\sigma = \frac{L}{w \times \delta \times R} \quad (1)$$

where σ[S/cm] is proton conductivity, R [Ω] is the measured resistance between the electrodes, L [cm] is the distance between the electrodes, w [cm] is the width of the sample (usually 1 cm), and δ [cm] is the thickness of the sample (typically between 0.0030 and 0.0060 cm).

Gravimetric, volumetric, and areal (in-plane) swelling (water uptake) was measured by boiling samples in 1M sulfuric acid for one hour and then boiling in 100° C. water for one hour. Samples were removed from the water bath, quickly wiped dry, and then membrane mass, area, and volume were measured. Swelling was determined by Equation (2).

$$WaterSwelling(\%) = \frac{x_{wet} - x_{dry}}{x_{dry}} \times 100 \quad (2)$$

where x is the membrane's volume, mass, or area, corresponding to mass swelling, in-plane/areal swelling, or volumetric swelling, respectively.

Ion-exchange capacity (IEC) was determined by a standard acid exchange and base titration experiment. A membrane sample of known dry weight in the H+ counterion form was soaked in 1 M NaCl for a minimum of 48 hours to exchange protons with Na+. The soak solution was then titrated to pH 7 with 0.01N NaOH. IEC was calculated by Equation (3).

$$IEC = \frac{V \times N}{m_{dry}} \times 1000 \quad (3)$$

where IEC [meq/g] is ion-exchange capacity (on a dry polymer weight basis), V [L] is the volume of the NaOH titrating solution, N [mol/L] is the normality of the NaOH titrating solution, and $m_{dry}$ [g] is the dry mass of the membrane. The Nafion volume fraction in a composite membrane was determined from the measured IEC, which was shown by Equation (4).

$$NafionVolumeFraction = \frac{IEC_{Composite}}{IEC_{Nafion}} \times \frac{\rho_{Composite}}{\rho_{Nafion}} \quad (4)$$

where $IEC_{composite}$ and $\rho_{composite}$ are the measured ion-exchange capacity and dry density of a nanofiber composite membrane, and $IEC_{Nafion}$ and $\rho_{Nafion}$ are the same quantities for a neat solution cast and annealed Nafion film.

Mechanical properties were measured with a TA Instrument Q800 Dynamic Mechanical Analyzer (DMA). Stress-strain curves were obtained for dry membranes at 30° C. and about 20% RH (all membranes were pre-dried at ambient conditions for a minimum of three days and in vacuum at 40° C. for one hour before the measurements). The DMA was operated in tension using the controlled force mode, where the force was increased at 0.1 000 N/min until the sample yielded.

Fuel cell polarization curves with a nanofiber composite membrane were obtained for a 5 cm² membrane-electrode assembly (MEA) at a cell temperature of 80° C., a feed gas humidity of 100%, and ambient pressure. For all experiments, the Pt electrode catalyst loading was 0.4 mg/cm², with 30 wt % Nafion binder. Catalyst inks were prepared from Pt/C catalyst (Alfa Aesar No. 42204) and Nafion solution (Sigma-Aldrich No. 527084). MEAs were fabricated using a standard decal method, where electrodes were painted onto Kapton films and then transferred to a membrane by hot-pressing for 10 minutes at 140° C. and 100 psi. Prior to a fuel cell test, the MEA was pre-conditioned overnight at room temperature by repeatedly cycling the cell for 5 minutes at a low current density (150 mA/cm²) and then 5 minutes at a low voltage (0.2 V) [69]. In a fuel cell experiment, feed gases were supplied at 100 mL/min (hydrogen) and 50p mL/min (air) for the anode and cathode, respectively. Polarization curves were obtained by measuring the current at specified voltages after 60 seconds of equilibration.

Fuel cell durability was determined by an accelerated open circuit voltage (OCV) test, where 100% and 0% hydrogen and air feed gases were successively and repeatedly passed through the fuel cell test fixture (2 min. each), while continuously monitoring the OCV. A 25 cm² fuel cell was operated at 80° C. for the test. The catalyst layers were prepared via a decal method, as stated above. The hydrogen limiting current was periodically measured during an OCV experiment by linear sweep voltammetry (0.0 to 0.50 V, using a Gamry Series G300 Potentiostat) after changing the feed gases (humidified hydrogen to the anode and nitrogen to the cathode at 200 mL/hr) [48].

Nafion and PPSU solutions were simultaneously electrospun from separate syringes to produce a nanofiber mat. Electrospinning perfluorosulfonic acid (PFSA) polymer solutions (e.g., DuPont's Nafion in alcohol:water solvents) is difficult because PFSAs do not dissolve in normal organic solvents but rather form micellar dispersions. Without the requisite chain entanglements, such solutions can only be electrospun by addition of a neutral high molecular weight carrier polymer like poly(ethylene oxide) (PEO), poly (acrylic acid) (PAA), or poly(vinyl alcohol) [66, 67, 71]. A high concentration of the carrier (as much as 25 wt %) was required in early studies to electrospin Nafion fibers [70-72]. More recently, electrospinning conditions have been identified for electrospinning Nafion and other PFSA materials with a much lower concentration of the carrier material (e.g., <1 wt % PEO) [67, 68, 73]. In this example, Nafion and PEO (400 kDa MW) were mixed and electrospun in a 99:1 wt. ratio (400 kDa MW) using a 2:1 n-propanol: water solvent. PEO was later removed from a fully processed membrane during the standard Nafion membrane pre-treatment sequence of boiling in sulfuric acid and then boiling in water.

Figure 12:
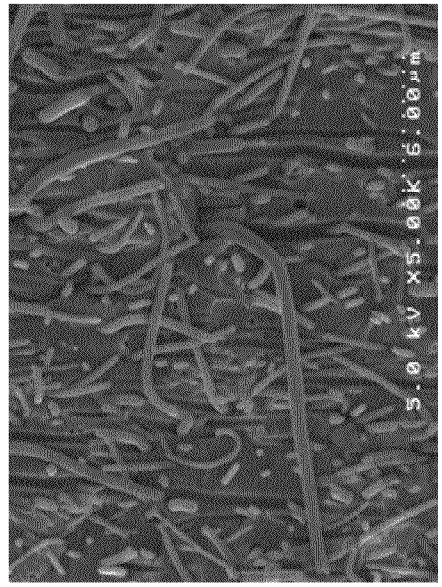
FIG. 12 shows SEM micrographs of (a) an electrospun dual nanofiber mat surface (fibers are visually indistinguishable but are composed of either PPSU or Nafion), (b) freeze-fractured cross-section of a Nafion film reinforced by a PPSU nanofiber network, (c) freeze-fractured cross-section of a membrane with Nafion nanofiber embedded in PPSU, and (d) surface of the Nafion nanofiber structure membrane after removal of all PPSU (by soaking in liquid chloroform) according to one embodiment of the present invention.
Figure 12:
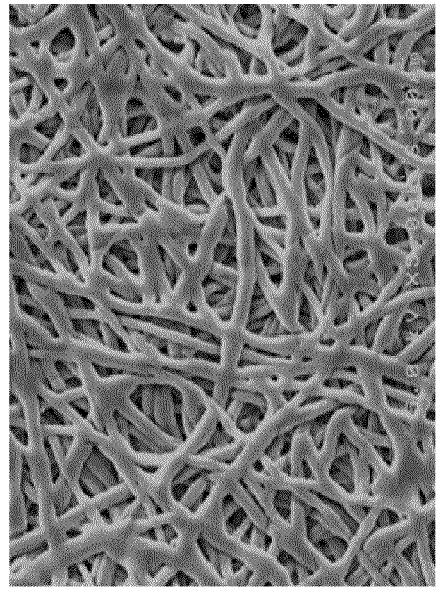
Figure 12:
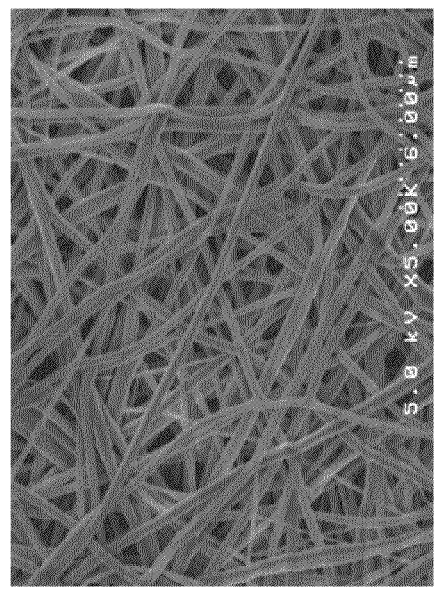
Figure 12:
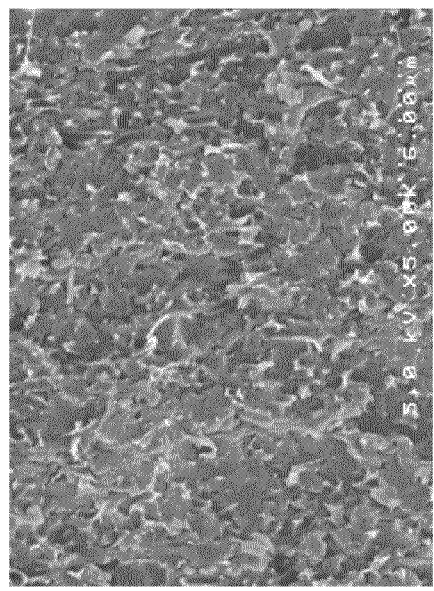

FIG. 12 shows SEM micrographs of (a) an electrospun dual nanofiber mat surface (fibers are visually indistinguishable but are composed of either PPSU or Nafion), (b) freeze-fractured cross-section of a Nafion film reinforced by a PPSU nanofiber network, (c) freeze-fractured cross-section of a membrane with Nafion nanofiber embedded in PPSU, and (d) surface of the Nafion nanofiber structure membrane after removal of all PPSU (by soaking in liquid chloroform) according to one embodiment of the present invention. The scale bars in FIG. 12 are 6 microns.

Figure (a) of FIG. 12 shows the fiber morphology of an electrospun mat containing Nafion/PEO and PPSU fibers where there is a uniform distribution of Nafion and PPSU nanofibers, with an average fiber diameter of 340 nm (the two types of fibers are indistinguishable in the SEM). As shown in figure (a), 60% of the fibers are composed of Nafion/PEO fibers, as determined by ion-exchange capacity and membrane density measurements. In its present form, the dual fiber mat is highly porous and cannot be used as a fuel cell membrane, so further processing of the mat is required to create a dense and defect-free film. This processing can follow two different paths: (i) the Nafion/PEO fibers can fill the voids between PPSU fibers (resulting in a Nafion membrane reinforced by PPSU nanofibers) or (ii) the PPSU polymer can fill the void space between Nafion nanofibers, resulting in a membrane where proton conducting PFSA nanofibers are embedded in an uncharged (or minimally charged)/uncharged PPSU matrix.

The processing steps for converting a dual fiber electrospun mat into a Nafion membrane with reinforcing PPSU nanofibers are as follows: hot press at about 15,000 psig and 127° C. and then anneal at 150° C. for 2 hours (this time and temperature are the normal annealing conditions for Nafion). In a previous study by Choi et al. [66] observed that Nafion nanofibers in a low fiber volume fraction mat would fuse/weld at an elevated temperature, thus creating a three-dimensional PFSA nanofiber network. The inventors have found that Nafion nanofibers will soften, flow, and fully fill the void space between PPSU nanofibers when a high fiber volume fraction mat is subjected to a high temperature annealing step. The softening and flow of Nafion/PEO nanofibers is attributed to partial plasticization of Nafion by trace amounts of adsorbed water and to morphological rearrangement of ionic and amorphous domains since compression and annealing occurs above Nafion's α-transition temperature (about 100° C.) [74, 75]. After annealing, the membrane is boiled in 1M sulfuric acid and water (one hour each) to remove residual PEO from the membrane (the presence of PEO is known to suppress proton conductivity in a Nafion nanofiber membrane) [66] and to insure that all sulfonic acid ion-exchange sites are in the proton counter-ion form. A freeze-fracture SEM cross-section of a completely processed Nafion membrane reinforced by PPSU nanofibers is shown in figure (b) of FIG. 12. The PPSU fibers are clearly visible and uniformly distributed throughout the membrane thickness and Nafion appears to completely fill the interfiber void volume.

A membrane with Nafion nanofibers embedded in PPSU (a morphology inverse to that in figure (b) of FIG. 12), was fabricated by: compacting the mat at about 3,500 psig, exposing the mat to chloroform vapor at room temperature to induce softening and flow of PPSU into the void space between Nafion nanofibers, drying the mat to remove chloroform, and then annealing the Nafion at 150° C. for 2 hours in vacuum. After the annealing step the membrane was pre-treated in the normal fashion, by boiling in sulfuric acid and water. A SEM freeze-fractured cross-section of a membrane with Nafion nanofibers embedded in PPSU is shown in figure (c) of FIG. 12. The Nafion fiber morphology cannot be seen in this image, so to confirm the membrane morphology a fully processed film was soaked in liquid chloroform for two hours to dissolve/remove all of the PPSU. An SEM of the resulting membrane surface is shown in figure (d) of FIG. 12, where an interconnected (welded) network of Nafion nanofibers is clearly visible. Thus, it can be concluded that encapsulation of the Nafion nanofibers by PPSU prevents Nafion flow during the high temperature annealing step, but it does allow for intersecting Nafion fibers to weld.

Figure 13:
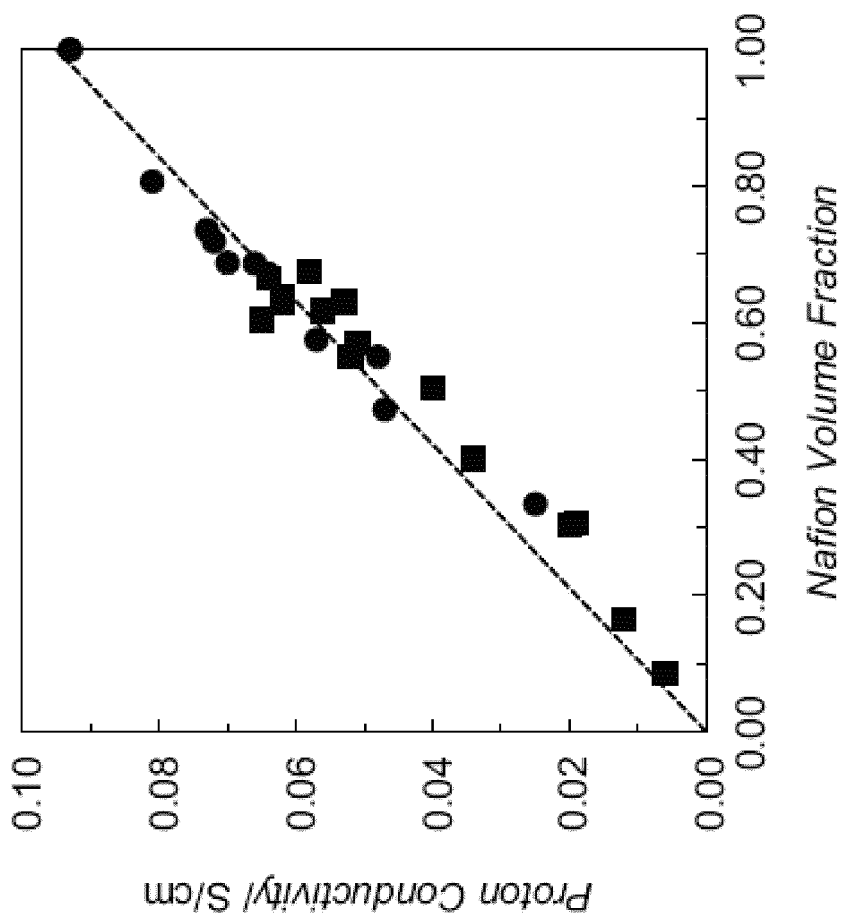
FIG. 13 shows a chart of in-plane proton conductivity of membrane samples for the two Nafion/PPSU composite structures in room temperature water as a function of Nafion volume fraction according to one embodiment of the present invention.

FIG. 13 shows in-plane proton conductivity of membrane samples for the two Nafion/PPSU composite structures in room temperature water as a function of Nafion volume fraction according to one embodiment of the present invention. Conductivity was measured in liquid water at room temperature. In FIG. 13, the curve marked with (■) represents the in-plane proton conductivity of the structure where Nation nanofibers embedded in PPSU, and the curve marked with (●) represents the in-plane proton conductivity of the structure where Nafion reinforced by PPSU nanofibers. The dashed line represents a simple volume fraction mixing rule (with zero ionic conductivity for PPSU) and Nafion 212 conductivity for a Nafion volume fraction of 1.0.

As shown in FIG. 13, there is no significant difference in conductivity between the two membrane morphologies, with proton conductivity being solely a function of the volume fraction of Nafion in the membrane (i.e., conductivity varies linearly with Nafion volume fraction, as shown by the straight line in FIG. 13). Extrapolation of the linear data to a fiber volume fraction of 1.0 gives a proton conductivity identical to that of bulk Nafion (0.095 S/cm). The results in FIG. 13 differ significantly from data in reference [76] where the authors report conductivities of a non-annealed electrospun Nafion fiber at 30° C. and 90% relative humidity that were unusually high (larger than 1 S/cm) for small fibers (less than 300 nm diameter) and anomalously low (0.025 S/cm) for larger fibers (5 μm diameter) [76]. In FIG. 13, the membrane conductivity for the two different Nafion/PPSU morphologies obey the same Nafion volume fraction mixing rule (with zero conductivity for PPSU), as has been reported for other nanofiber composite fuel cell membranes [64-68]. Also, there is no percolation threshold for conductivity at low Nafion volume fractions; composite films with as little as 9 vol % Nafion fit the linear straight line conductivity correlation. This is well below the 16-30 vol % ionomer percolation minimum for composite membranes fabricated by traditional blending methods [77-78]. Further, the proton conductivities of the nanofiber composite films are much higher than those reported for Nafion/PVDF solution cast blends. For example, a solution-cast Nafion/PVDF film with 80 wt % Nafion was found to have a conductivity of 0.012 S/cm in water at 25° C. (23% the measured conductivity for a neat Nafion film), whereas a nanofiber composite of similar Nafion content has a conductivity of 0.070 S/cm, or 70% that of neat Nafion. It should be noted that nanofiber composite membranes that are about 80 wt % Nafion are about 70 vol % Nafion due to differences in Nafion's and PPSU's density.

Figure 14:
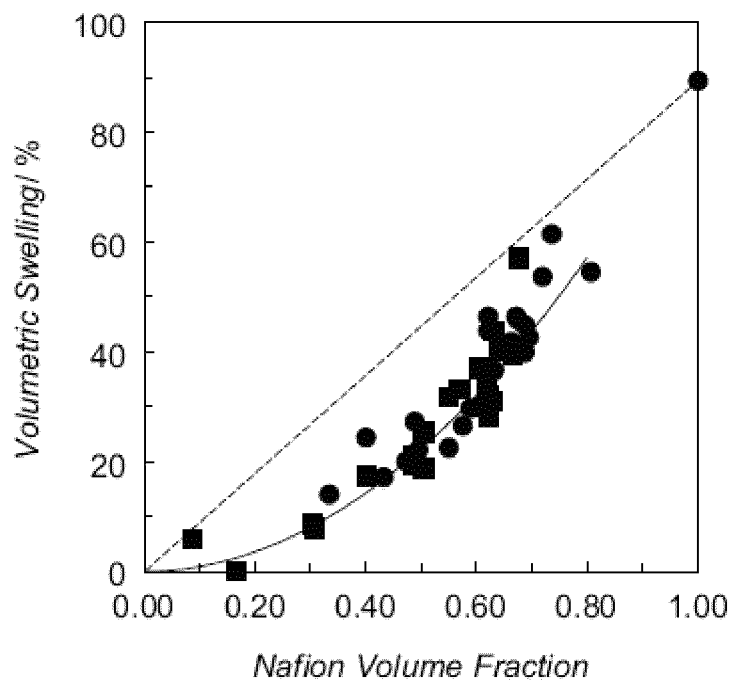
FIG. 14 shows charts of water swelling of nanofiber composite membranes as a function of Nafion volume fraction at 100° C. according to one embodiment of the present invention, where (a) shows volumetric swelling, and (b) shows mass swelling.
Figure 14:
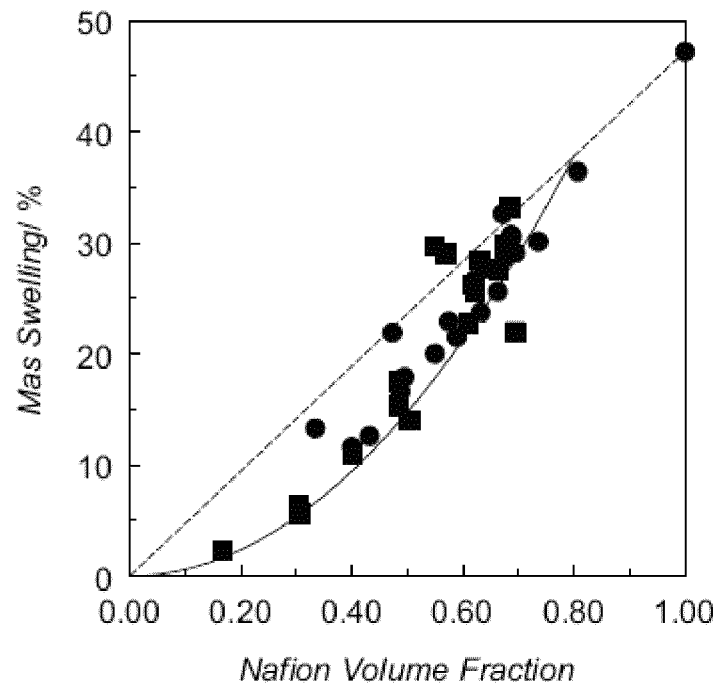

FIG. 14 shows a chart of water swelling of nanofiber composite membranes as a function of Nafion volume fraction at 100° C. according to one embodiment of the present invention, where (a) shows volumetric swelling, and (b) shows mass swelling. In FIG. 14, the curve marked with (■) represents the water swelling of the membrane structure where Nafion nanofibers embedded in PPSU, and the curve marked with (●) represents the water swelling of the membrane structure where Nafion reinforced by PPSU nanofibers.

As shown in FIG. 14, as was the case for proton conductivity, there is no obvious difference in swelling for the two different membrane structures (Nafion nanofibers embedded in PPSU and Nation reinforced by a PPSU nanofiber network). However, the swelling is lower than would be predicted by a simple Nafion volume fraction mixing rule below 70 vol % Nafion (but not so low as to adversely affect proton conductivity) because the presence of PPSU causes the Nafion component to swell less in the composite films (this has been observed in other Nation blended membranes) [78]. For example, a membrane with 50 vol % Nafion has a λ (moles of water per mole of sulfonic acid sites in Nafion) of 19 as compared to 21.5 for commercial Nafion 212. The low water content of the composite membranes in FIG. 14 is an important finding in terms of future applications of the membrane fabrication method with very high ion-exchange capacity (IEC) ionomer polymers that swell excessively in water.

Figure 15:
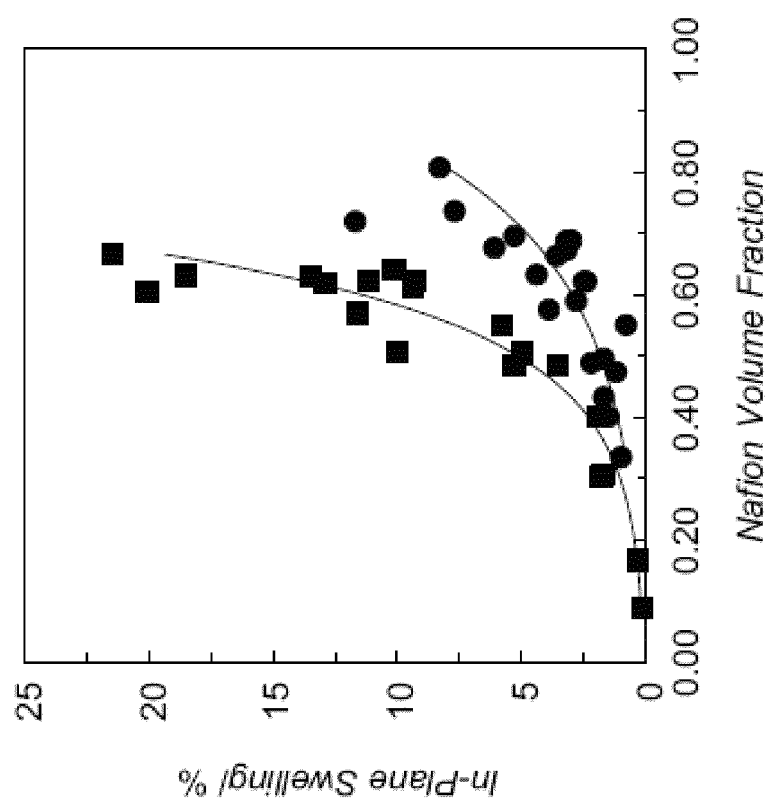
FIG. 15 shows a chart of in-plane water swelling of nanofiber composite membranes as a function of Nafion volume fraction according to one embodiment of the present invention, where swelling was measured in 100° C. water.

FIG. 15 shows in-plane water swelling of nanofiber composite membranes as a function of Nafion volume fraction according to one embodiment of the present invention, where swelling was measured in 100° C. water. In FIG. 15, the curve marked with (■) represents the in-plane water swelling of the membrane structure where Nafion nanofibers embedded in PPSU, and the curve marked with (●) represents the in-plane water swelling of the membrane structure where Nafion reinforced by PPSU nanofibers.

As shown in FIG. 15, unlike conductivity and volumetric/mass swelling, the in-plane swelling for the two membrane morphologies differ substantially, with Nafion films reinforced by PPSU nanofibers swelling less for a wide range of Nafion volume fractions. The swelling difference is attributed to differences in PPSU connectivity for the two membrane structures. A membrane with Nafion fibers embedded in PPSU has strong interconnectivity in three dimensions, with more isotropic water swelling. When PPSU is in the fiber form, there is minimal PPSU connectivity in the membrane thickness direction (the PPSU nanofibers were never welded to create a 3-D interconnecting network), with stronger connectivity for the in-plane direction (due to the presence of closed-form cells created by the PPSU fiber network). Thus, there is more membrane swelling in the thickness direction for membranes with reinforcing PPSU nanofibers, as compared to the inverse structure. For example, a membrane with 60 vol % Nafion had a thickness swelling of 29% for the Nafion film reinforced by PPSU nanofibers, but only 18% for the membrane with Nafion fibers embedded in PPSU.

It should be noted that the in-plane swelling of both composite membrane morphologies was lower than that of neat Nafion (37% in-plane swelling for Nafion 212) and lower than that of a hypothetical PPSU/Nafion composite film based on a simple Nafion volume fraction mixing rule. The swelling properties of the Nafion/PPSU nanofiber membranes compare favorably with other composite membranes found in the literature. A Nafion film reinforced by PPSU nanofibers had about 0.080 S/cm conductivity (in room temperature water) and an in-plane swelling of 8%, compared to 15% for a film of similar conductivity, as report by Lee and co-workers for a Nafion nanofiber mat impregnated with Norland Optical Adhesive 63 [68]. Similarly, a GORE-SELECT membrane with a conductivity similar to that of Nafion 212 has a reported in-plane water swelling of about 31% in 100° C. water [79]. Under similar experimental conditions, the Nafion film reinforced by PPSU fibers exhibited 73% lower in-plane swelling with a small (20%) loss in proton conductivity relative to the GORE-SELECT film (the loss in proton conductivity can be offset by simply making the membrane 20% thinner; changing membrane thickness will not alter in-plane swelling).

Figure 16:
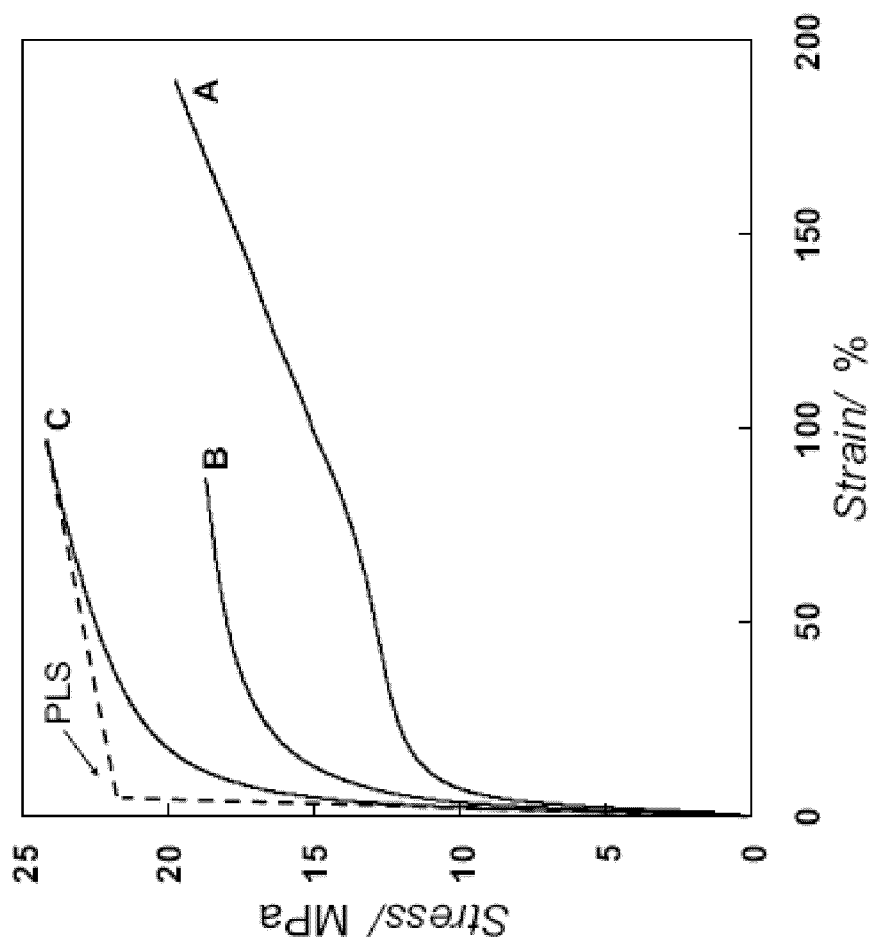
FIG. 16 shows a chart of Stress-strain curves for Nafion 212 and nanofiber composite membranes according to one embodiment of the present invention, where stress-strain curves were measured at 30° C. and about 20% RH.

FIG. 16 shows a chart of stress-strain curves for Nafion 212 and nanofiber composite membranes according to one embodiment of the present invention, where stress-strain curves were measured at 30° C. and about 20% RH. In FIG. 16, curve (a) represents Nafion 212, curve (b) represents Nafion reinforced by PPSU nanofibers (61 vol % Nafion), and curve (c) represents Nafion nanofibers embedded in PPSU (61 vol % Nafion).

PPSU has excellent mechanical properties and its presence improved the overall mechanical properties of the nanofiber composite membranes, as compared to commercial Nafion films. Mechanical properties (such as Young's modulus and the proportional limit stress, abbreviated as PLS) are summarized in Table 6.

TABLE 6

Young's Modulus and Proportional Limit Stress (PLS) for nanofiber composite membranes of different Nafion volume fractions

| Nanofiber Composite | Nafion Nanofibers Embedded in PPSU | | Nafion Reinforced by PPSU Nanofibers | |
|---|---|---|---|---|
| | Young's Modulus (MPa) | PLS (MPa) | Young's Modulus (MPa) | PLS (MPa) |
| 61 vol % Nafion | 566 | 21.1 | 444 | 15.9 |
| 48 vol % Nafion | 733 | 24.6 | 601 | 22.3 |
| 39 vol % Nafion | 852 | 29.2 | 624 | 23.4 |
| Neat Membrane | Young's Modulus (MPa) | | PLS (MPa) | |
| Nafion 212 | 294 | | 11.9 | |
| PPSU Film | 1057 | | 64.3 | |

PLS is a measure of yield strength which is useful for characterizing materials such as Nafion that do not undergo a clear transition from elastic to plastic deformation. PLS is determined by extrapolating lines tangent to the low- and high-strain regions of a stress-strain curve as shown in FIG. 16. The nanofiber composite membranes have a higher modulus and proportional limit stress than Nafion 212 and the mechanical properties improve as the volume fraction of PPSU in the composite membrane increases. For all Nafion volume fractions tested, the membranes with Nafion nanofibers embedded in PPSU exhibited superior mechanical properties as compared to the inverse morphology. This is attributed to the greater connectivity of PPSU when it is the matrix material, surrounding Nation nanofibers in a membrane, as opposed to having PPSU in the fiber form as a reinforcing non-woven network.

As to the fuel cell performance, the low in-plane swelling of a Nafion film reinforced by PPSU nanofibers should translate into improved membrane-electrode-assembly (MEA) durability in a hydrogen/air fuel cell. To test this hypothesis, fuel cell data were collected for such a film containing 65 vol % Nafion. At this Nafion volume fraction, the membrane had a conductivity of 0.066 S/cm in water (at 25° C.) and an in-plane swelling of 6% in 100° C. water. The composite film was fabricated into a MEA by attachment of Pt/C catalytic powder electrodes using a standard decal technique.

Figure 17:
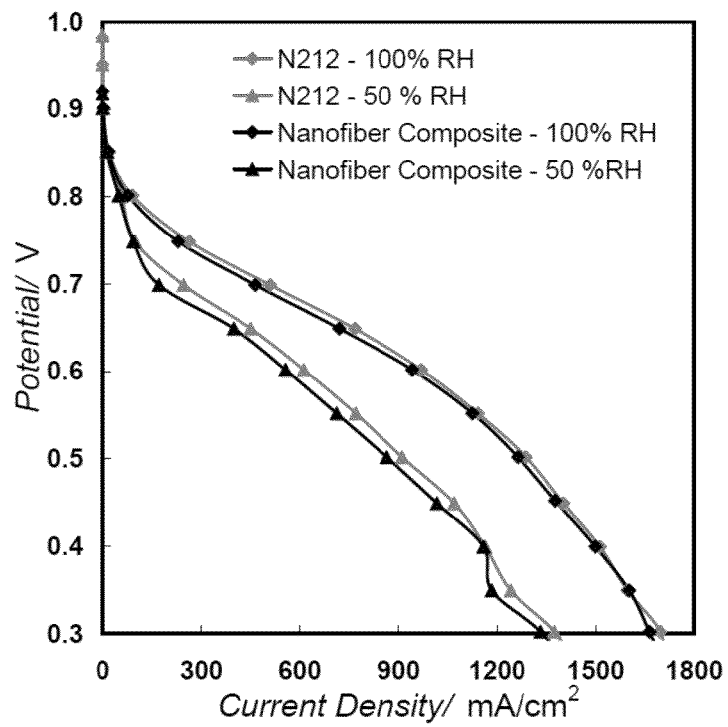
FIG. 17 shows charts of (a) fuel cell polarization and (b) accelerated durability tests of the composite membrane fuel cell according to one embodiment of the present invention, where the nanofiber composite membrane (with Nafion reinforced by PPSU nanofibers) was about 65 vol % Nafion and 31 μm thick for all fuel cell testing.
Figure 17:
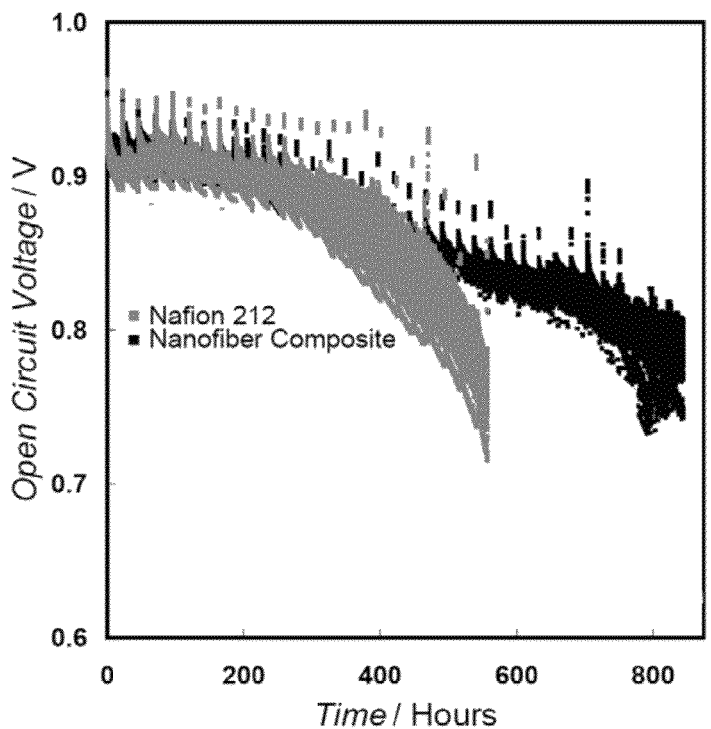

FIG. 17 shows charts of (a) fuel cell polarization and (b) accelerated durability tests of the composite membrane fuel cell according to one embodiment of the present invention, where the nanofiber composite membrane (with Nafion reinforced by PPSU nanofibers) was about 65 vol % Nafion and 31 µm thick for all fuel cell testing.

Voltage vs. current density fuel cell performance curves are shown in figure (a) of FIG. 17 for a 30 µm PPSU/Nafion nanofiber composite membrane and a commercial Nafion 212 film (51 µm dry thickness) at 80° C. for several different feed gas humidification levels. The area-specific resistance of the Nafion 212 and nanofiber composite membranes is approximately the same (the composite membrane has 65% of the conductivity and 60% of the thickness) and the fuel cell power output (voltage multiplied by current density) is essentially identical for the two MEAs. The high open circuit voltage for the composite membrane MEA indicates low gas crossover and a membrane free of pin-holes and defects.

Membrane durability was evaluated by an open circuit voltage (OCV) humidity cycling experiment at 80° C. with repeated cycling of 2 minutes 100% relative humidity (RH) hydrogen gas and air and then 2 minutes 0% RH hydrogen and air. This OCV experiment was used to evaluate the membrane for both mechanical durability (the membrane undergoes stresses from swelling and shrinking when the gases cycle between wet and dry) and chemical durability (the diffusion of hydrogen and oxygen into the membrane can result in the formation of harmful peroxides which can degrade Nafion for both the neat membrane and nanofiber composite) [81]. In this example, only OCV and hydrogen gas crossover were monitored during humidity cycling, and there was no attempt to quantify any membrane chemical degradation with time by measuring, for example, fluoride release rates.

The change in OCV (during the wet cycle) vs. time is shown in figure (b) of FIG. 17. Failure criteria for this test are defined as a drop in OCV (for a fully humidified MEA) below 0.8 V. The nanofiber composite membrane failed after 842 hours vs. 546 hours for Nafion 212 (a 54% improvement in membrane durability). Additionally, the hydrogen limiting current (measured in-situ at 100% RH) dramatically increased at membrane failure (increasing from <2 mA/cm$^2$ at the beginning of the test to over 13 mA/cm$^2$ at failure).

As disclosed above, the example presents a new approach to the design, morphology, and fabrication of composite ion-exchange membranes. Nanofiber mats of two dissimilar polymers (Nafion perfluorosulfonic acid polymer and polyphenylsulfone) were simultaneously and separately electrospun into the same mat and then the resulting dual fiber web was processed into two different defect-free dense film morphologies: (1) a Nafion film reinforced by polyphenylsulfone nanofibers and (2) an interconnecting nanofiber mat of Nafion embedded in polyphenylsulfone. The procedures for converting a dual-fiber mat into either of the two membrane morphologies are simple and straightforward. Both membrane structures exhibited similar volumetric/gravimetric water swelling and proton conductivity, where the conductivity scaled linearly with Nafion volume fraction and the swelling was less than expected based on the relative amounts of Nafion and polyphenylsulfone. Compared to other fuel cell membranes, the nanofiber composite membranes exhibited very low in-plane water swelling and better mechanical properties, which translated into improved membrane/MEA longevity in a hydrogen/air open circuit voltage humidity cycling durability test with no loss in power production as compared to a Nafion 212 membrane. The in-plane liquid water swelling of membranes with Nafion reinforced by a polyphenylsulfone nanofiber network was always less than that of the inverse structure. On the other hand, the mechanical properties of membranes with Nafion nanofibers embedded in polyphenylsulfone were superior to membranes with the opposite structure.

The impregnation-free dual-fiber electrospinning approach to composite membrane design can be expanded to produce composite films with any two polymers that are: (i) electrospinnable and (ii) have sufficient differences in solubility and/or thermal properties so as to allow for one component to soften, flow, and fill the interfiber void volume of the other. Additionally, one can fabricate a composite membrane for non-fuel-cell applications, e.g., as separators in electrochemical reactors, for sensors, and in industrial electrodialysis separations. Also, it is entirely possible to fabricate nanofiber composite membranes with three or more different fiber compositions, e.g., one charged polymer for normal fuel cell operating temperatures, and a second nanofiber for low (sub-zero) fuel cell operation, and a third polymer fiber for membrane reinforcement.

Example Four

Figure 18:
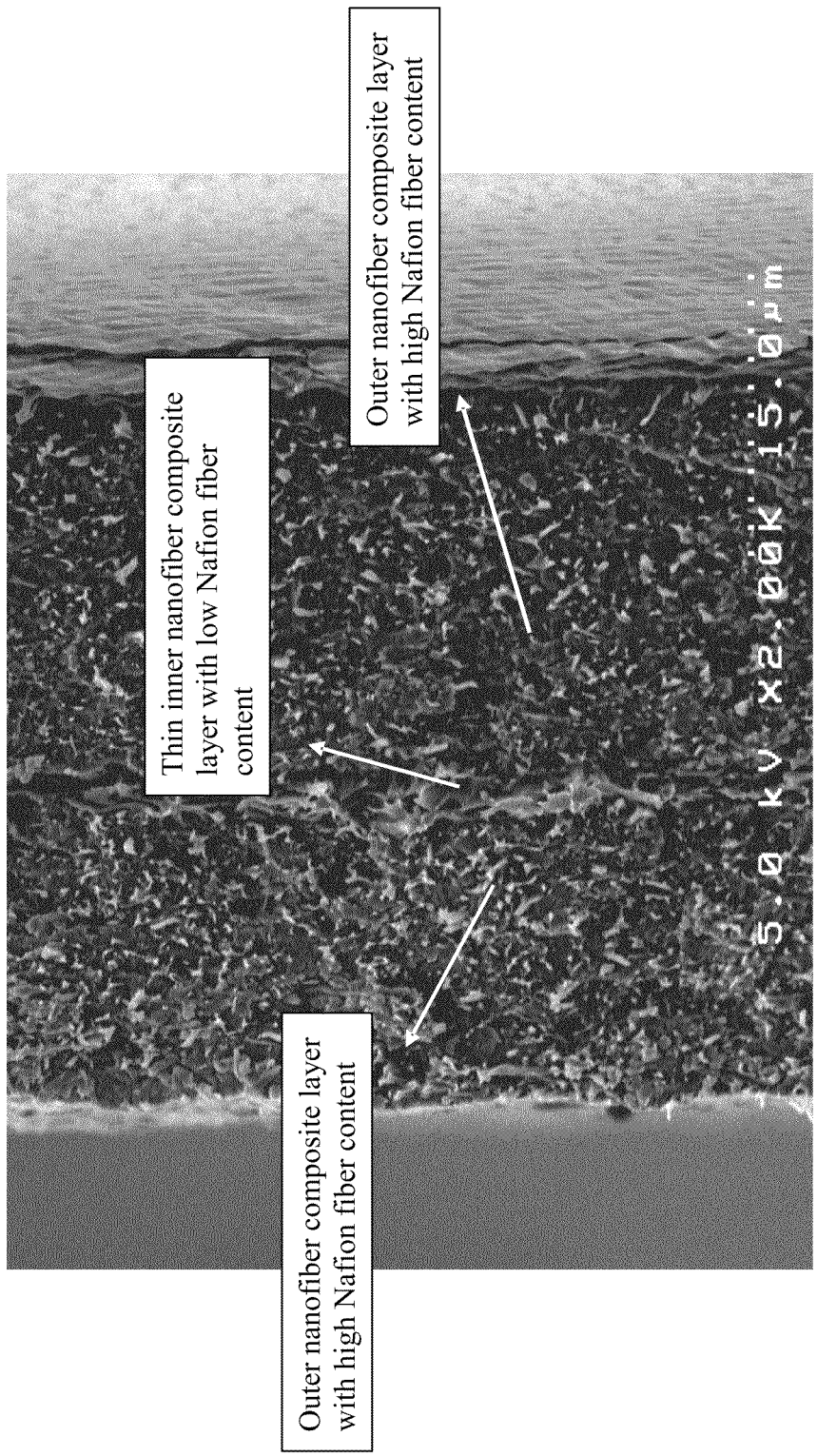
FIG. 18 shows an SEM cross-section of a multi-layer membrane according to one embodiment of the present invention, where outer layers are about 18 μm thick and about 60 vol % Nafion, the inner, barrier layer is 3 μm thick and about 6 vol % Nafion. In all layers, Nafion nanofibers are surrounded by PPSU.

This example shows multi-layered, dense nanofiber membranes fabricated using the dual-fiber electrospinning technique. The advantages of the dual-fiber electrospinning technique over other blending methods include, but not limited to, (i) enhanced morphological control: normally immiscible polymers can be mixed together with small domain sizes (less than about 500 nm diameter fibers) with no opportunity for significant phase separation, and (ii) no need for impregnating a second polymer, which often requires the use of surfactants and multiple impregnation steps for complete pore-filling. Another advantage of the dual-fiber technique is to easily control the spatial variation of the volume fraction loadings of the polymer components in the thickness direction. Thus, membranes with layered structures can be easily manufactured. For example, as shown in FIG. 18, a membrane with three layers is constructed with two 20 µm outer nanofiber composite layers containing 60 vol % Nafion and 40 vol % polyphenylsulfone (PPSU) and an inner nanofiber composite layer only 5 µm thick and containing 10 vol % Nafion and 90 vol % PPSU.

The ability to vary the volume fraction of charged polymer within a nanfobier composite membrane in the membrane thickness direction has potential applications for methanol and formic acid fuel cell membranes in which a thin, methanol-barrier layer or formic acid barrier layer is incorporated into a thicker nanofiber composite film. Such an approach has the potential to more easily take advantage of the barrier layer properties of composites with a high hydrophobic polymer loading, but whose low conductivity necessitates that the layer be very thin (to minimize ohmic resistance). The thick, more-conductive outer layers allow the three-layer film to be made relatively thick which is easy to handle, mechanically strong, and can withstand the processing steps required to convert the membrane into a fuel cell membrane-electrode-assembly.

According to the exemplary embodiments, layered membranes were prepared using a dual fiber elelctrospinning method, where Nafion/PEO nanofibers and polyphenylsulfone nanofibers are elecrospun separately and simultaneously from separate syringes, but onto a common, grounded collecting surface. An example of typical electrospinning conditions is shown in Table 7. Multi-layered structures were fabricated by changing the electrospinning flow rates of Nafion and PPSU during the electrospinning process. An example flow rates is listed in Table 8. In this example, PEO with MW=400 KDa was used in a 99:1 wt ratio of Nafion:

PEO. The small amount of PEO was extracted after membrane fabrication by boiling in acid and water. PPSU fibers were electrospun without the addition of a carrier polymer.

TABLE 7

Nafion and PPSU electrospinning conditions for a three-layer nanofiber composite membrane

|  | Nafion | PPSU |
|---|---|---|
| Polymer Composition | 20 wt % 99:1 Nafion:PEO | 25 wt % |
| Solvent | n-propanol:water in 2:1 ratio | NMP:acetone in 8:2 ratio |
| Voltage | 4.15 kV | 8.50 kV |
| Spinneret-to-collector-distance | 6.5 cm | 8.5 cm |

TABLE 8

Example of Nafion and PPSU flow rates for multi-layer membrane preparation.

| Time | Nafion Flow Rates (mL/hr) | PPSU Flow Rate (mL/hr) | Approximate Nafion volume fraction |
|---|---|---|---|
| t = 0.0 hr.-t = 4.0 hr. | 0.20 | 0.04 | 0.60 |
| t = 14.0 hr.-t = 14.8 hr | 0.10 | 0.40 | 0.06 |
| t = 14.8 hr-t = 28.8 hr | 0.20 | 0.04 | 0.60 |

Multi-layer composite membranes with Nafion fibers encapsulated in PPSU polymer were fabricated by compressing the electrospun dual-fiber mats, exposing the mats to chloroform solvent vapor, and then thermally annealing the membranes. Thus, dual-fiber mats of Nafion and PPSU were compressed to 3500 psi, then exposed to chloroform vapor for 16 minutes at 25° C. Membranes were then dried at 70° C. for 1 hour and 140° C. for 10 minutes and later annealed 2 hours at 150° C. After annealing, the membranes were boiled in 1M $H_2SO_4$ and $H_2O$ for 1 hour each to ensure full protonation of Nafion's sulfonic acid sites as well as to extract the PEO carrier polymer from the membrane. PEO dramatically reduces Nafion's conductivity and thus its extraction is an important step.

An SEM cross-section of a multi-layered membrane is shown in FIG. 18. The outer layers have a composition of 60 vol % Nafion and 40 vol % PPSU and are about 18 μm thick. The interior layer is about 6 vol % Nafion and 94 vol % PPSU and 3 μm thick. For all three layers, Nafion nanofibers are surrounded by a PPSU polymer matrix. In the SEM image, the interior layer is visible and distinguishable (the visibly lighter/brighter interior portion of the membrane).

The in-plane conductivity (in 25° C. liquid water) and methanol permeability (for 1M methanol at 25° C.) for three multi-layer composite membranes are listed in Table 9. The permeability of three composite membranes is significantly lower than a neat film of Nafion 117, the benchmark material ($2.4 \times 10^{-6}$ cm$^2$/s). Furthermore, the permeability of the membranes are between the permeability of a 60 vol % Nafion film ($1.4 \times 10^{-6}$ cm$^2$/s) and a 6 vol % Nafion film ($1.4 \times 10^{-9}$ cm$^2$/sec), as is expected for a layered membrane structure of this kind.

In-plane proton conductivity of the multi-layer membranes listed in Table 9 are similar, approximately 56 mS/cm. This compares to a conductivity of 95 mS/cm for Nafion 117, 63 mS/cm for a homogenous 60 vol % Nafion composite, and 6 mS/cm for a homogenous nanofiber composite film with 6 vol % Nafion. Again the conductivity of the tri-layer membrane is between that of the two uniform composite nanofiber composite films. No measurable difference was found for proton conductivity measured in water as compared to the conductivity measured in 1M methanol.

The very low permeability of the multi-layer composite membranes, when combined with their reasonable conductivity is expected to improve membrane performance in a direct methanol fuel cell system. Also, it should be noted that such a multiplayer nanofiber composite membrane cannot be fabricated using one or more standard polymer impregnation steps, thus further distinguishing the dual fiber elelctrospinning method and morphology as being unique, robust, and highly desirable for a variety of applications.

TABLE 9

Properties of duplicate three-layer nanofiber membranes.

| Membrane | Composition (% Nafion) Outer/Inner/Outer | Thickness (μm) Outer/Inner/Outer (Total) | Permeability (cm$^2$/s) | In-Plane Conductivity (mS/cm) |
|---|---|---|---|---|
| 1 | 60/6/60 | 18/3/18 (39) | $9.31 \times 10^{-8}$ | 57 |
| 2 | 60/6/60 | 17.5/3/17.5 (38) | $2.84 \times 10^{-7}$ | 57 |
| 3 | 60/6/60 | 20/1.5/20 (41.5) | $7.57 \times 10^{-7}$ | 55 |

Example Five

This example presents a nanofiber composite anion-exchange membrane, prepared using the dual fiber electrospinning method, where the anion-exchange polymer component of the membrane is covalently crosslinked.

In order to improve an anion-exchange membrane for fuel cell and other applications, a high membrane conductivity is required. The most common method to raise conductivity in ion-exchange membranes is to increase the ion exchange capacity (IEC). For quaternary ammonium polysulfone (QAPSF), the highest theoretical IEC is about 3.4 mmol/g. However, at an IEC greater than 2.5 mmol/g, the polymer becomes water soluble. One method to eliminate the problem of water solubility is to crosslink the QAPSF or to crosslink the QAPSF precursor CMPSF (chloromethylated polysulfone). In this new nanofiber composite membrane fabrication scheme, an aliphatic diol molecule, 1,6-hexanediol, was used to form the crosslinks between polymer chains of CMPSF. Iodine was substituted for chlorine in a portion of the chloromethyl groups to form iodomethyl groups, expediting the reaction process. The diol reacts with the benzyllic iodomethyl carbon at high temperature to eject the iodide atom and form an ether linkage. With ether linkages on the two ends of the diol, two separate polymer chains are crosslinked to one another.

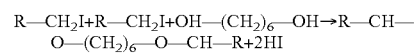

R—CH$_2$I+R—CH$_2$I+OH—(CH$_2$)$_6$—OH→R—CH—O—(CH$_2$)$_6$—O—CH—R+2HI

The end result is a tunable crosslinking scheme that can be combined with the dual nanofiber electrospinning method of preparing anion-exchange membranes.

To exchange iodine for chlorine on the benzyllic carbon of the anion-exchange polymer precursor, the CMPSF polymer was dissolved in a solution of dimethylacetamide (DMAc, 2% w/v) saturated with potassium iodide (1.4 g/100 mL). This solution was stirred for 16 hours. The iodide ions underwent a nucleophillic substitution reaction with the chlorine atoms in CMPSF replacing a portion of the chloromethyl groups with iodomethyl groups. The end result was a chloromethylated polysulfone with 30% iodide replacement (IMPSF). The IMPSF polymer was then simultaneously electrospun with uncharged polyphenylsulfone using the dual-fiber elelctrospinning method explained in Example Two. The electrospinning conditions are given in Table 10.

TABLE 10

Electrospinning conditions for fabricating a dual nanofiber mat that will be converted into a crosslinked ionomer AEM

| | Polymer Concentration (w/w) | Applied Voltage (kV) | Flow Rate (mL/hr) | Spinneret/ Collector Distance (cm) |
|---|---|---|---|---|
| Radel PPSU | 25 (in 4:1 wt. ratio NMP/Acetone) | +9 | 0.48 | 9 |
| IMPSF | 16 (in 9:1 wt. ratio THF/DMSO) | +12 | 1.0 | 11 |

Hexanediol was added to the IMPSF solution before electrospinning at a molar ratio of 40:1 IMPSF:Hexanediol. After electrospinning, the composition of the dual-fiber mat was 65% IMPSF with hexanediol and 35% uncharged polyphenylsulfone. NMR showed hexanediol to be present in its initial concentration, and well distributed in the IMPSF fibers. The mat was compressed at 5,000 psi to increase the volume fraction of fibers to 60%, then exposed to chloroform vapor for 4 minutes to allow the PPSU to soften and flow around all IMPSF fibers, thus forming a defect-free membrane. This membrane was then heated to 100° C. for 4 hours to introduce ether crosslinks between polymer chains. The crosslinked nanofiber membrane was soaked in trimethylamine for 48 hours to convert the remaining chloromethyl and iodomethyl groups into quaternary ammonium fixed charge sites. The membrane was washed in 1 M KOH to exchange $OH^-$ for chloride counterions and the final films were stored in argon-degassed DI water prior to testing.

The initial degree of iodo/chloromethylation of the IMPSF polymer was 1.91. Uncrosslinked, this polymer after quaternization would have resulted in an IEC of 3.3 mmol/g, much higher than the water solubility threshold. After crosslinking and quaternization, the membrane was stable and insoluble, demonstrating successful crosslinks. The conductivity of the electrospun composite crosslinked membrane in liquid water at room temperature was 0.052 S/cm. The gravimetric water swelling was 108%. The membranes were mechanically robust and very flexible, even when dry. After soaking for multiple days in water, there was no loss in membrane ionic conductivity, indicating sufficient crosslinking to eliminate polymer solubilization in water.

Example Six

The exemplary embodiments of the invention provide composite membranes fabricated by an electrospun multi fiber mat approach. In the multi fiber mat approach, one or more types of polyelectrolyte solutions (or polyelectrolyte precursors, or a combination of polyelectrolytes and precursors) and one or more types of uncharged (or minimally charged) polymer solutions are separately and simultaneously electrospun to form a dual or multi fiber mat of one or more types of polyelectrolyte fibers and one or more types of uncharged (or minimally charged) polymer fibers. Then, the dual or multi fiber mat is processed by softening and flowing at least one of the one or more types of polyelectrolyte fibers to fill in the void space between the one or more types of uncharged (or minimally charged) polymer fibers, or by softening and flowing at least one of the one or more types of uncharged (or minimally charged) polymer fibers to fill in the void space between the one or more types of polyelectrolyte fibers, so as to form the composite membrane. That is, during the mat processing, at least one of the polyelectrolyte fibers is softened and flown, while keeping at least one of the uncharged polymer nanofiber networks of the mat intact, or at least one of the uncharged polymer nanofibers are softened and flown, while keeping at least one of the polyelectrolyte fiber networks intact.

An example of a multi fiber mat composed of Nafion, PPSU and PVDF nanofibers (the latter two nanofibers being uncharged). PVDF has shown very good chemical stability in membranes but it does not have good mechanical properties. Thus, the PPSU nanofibers can be used to strengthen the PVDF, i.e., during the mat processing, only is the PVDF softened and flows around both the Nafion nanofibers and the PPSU nanofibers. Accordingly, the PPSU is protected from possible chemical attack by the surrounding PVDF and the PVDF matrix is strengthen by the presence of the embedded PPSU nanofibers. Meanwhile, the Nafion nanofiber network remains intact and provides pathways for ion/proton conduction. Such composite membranes made by the approach are AEMs or PEMs.

In sum, the present invention, among other things, recites composite membranes, such as PEMs or AEMs, methods of fabricating the same, and its corresponding applications. The composite membranes are fabricated from dual or multi fiber/nanofiber mats of one or more first-type electrospun polymer fibers and one or more second-type electrospun polymer fibers, by softening and flowing at least one of the one or more of the first-type polymer fibers to fill in the void space between the one or more second-type polymer fibers, or by softening and flowing at least one of the one or more of the second-type polymer fibers to fill in the void space between the one or more first-type polymer fibers. The one or more first-type polymer fibers comprise charged polymer fibers, e.g., polyelectrolyte fibers, or charged polymer precursor fibers, and the one or more second-type polymer fibers comprise uncharged polymer fibers. In addition, the composite membranes according to embodiments of the invention include multilayered structures, where the relative amounts of polyelectrolyte fibers and uncharged polymer matrix differs in the membrane thickness direction. Moreover, according to embodiments of the invention, one of the fiber types in the composite membranes is crosslinked after electrospinning.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCE LIST

[1] S. J. Hamrock, Yandrastis, Michael A., *Polymer Reviews*, 46, 219 (2006).

[2] X. L. Zhu, Yuxiu, Liu; Zhu, Lei, in *Polymer Membranes for Fuel Cells*, S. M. J. M. Zaidi, Takeshi Editor, Spring. Science+Business Media, LLC, New York (2009).

[3] K. D. Kreuer, *Journal of Membrane Science*, 185, 29 (2001).

[4] S. J. Hamrock, DOE Annual Progres Report: Membranes and MEAs for Dry, Hot Operating Conditions, in (2009).

[5] C. C. de Araujo, K. D. Kreuer, M. Schuster, G. Portale, H. Mendil-Jakani, G. Gebel and J. Maier, *Phys. Chem. Chem. Phys.*, 11, 3305 (2009).

[6] M. Schuster, C. C. de Araujo, V. Atanasov, H. T. Andersen, K. D. Kreuer and J. Maier, *Macromolecules*, 42, 3129 (2009).

[7] X. Y. Huang, R. Solasi, Y. Zou, M. Feshler, K. Reifsnider, D. Condit, S. Burlatsky and T. Madden, *J Polym. Sci. Pt. B-Polym. Phys.*, 44, 2346 (2006).

[8] H. Tang, S. Peikang, S. P. Jiang, F. Wang and M. Pan, *Journal of Power Sources*, 170, 85 (2007).

[9] J. Choi, K. M. Lee, R. Wycisk, P. N. Pintauro and P. T. Mather, *Macromolecules*, 41, 4569 (2008).

[10] J. Choi, K. M. Lee, R. Wycisk, P. N. Pintauro and P. T. Mather, *J Electrochem. Soc.*, 157, B914 (2010).

[11] J. Choi, K. M. Lee, R. Wycisk, P. N. Pintauro and P. T. Mather, *J Mater. Chem.*, 20, 6282 (2010).

[12] J. Choi, R. Wycisk, W. J. Zhang, P. N. Pintauro, K. M. Lee and P. T. Mather, *Chemsuschem*, 3, 1245 (2010).

[13] K. M. Lee, J. Choi, R. Wycisk, P. N. Pintauro and P. Mather, "Nafion Nanofiber Membranes", p. 1451, ECS (2009).

[14] J. B. Ballengee and P. N. Pintauro, "Nanofiber Composite Proton Exchange Membranes Fabricated by Dual-Fiber Electrospinning," *Advanced Functional Materials*, Submitted (2011).

[15] B. Loppinet, G. Gebel and C. E. Williams, *The Journal of Physical Chemistry B*, 101, 1884 (1997).

[16] J. B. Ballengee and P. N. Pintauro, *J Electrochem. Soc.*, 158, B568 (2011).

[17] H. Chen, J. D. Snyder and Y. A. Elabd, *Macromolecules*, 41, 128 (2008).

[18] S. J. Osborn, M. K. Hassan, G. M. Divoux, D. W. Rhoades, K. A. Mauritz and R. B. Moore, *Macromolecules*, 40, 3886 (2007).

[19] K. A. Page, F. A. Landis, A. K. Phillips and R. B. Moore, *Macromolecules*, 39, 3939 (2006).

[20] A. Kusoglu, A. M. Karlsson, M. H. Santare, S. Cleghorn and W. B. Johnson, *Journal of Power Sources*, 170, 345 (2007).

[21] A. Kusoglu, A. M. Karlsson, M. H. Santare, S. Cleghorn and W. B. Johnson, *Journal of Power Sources*, 161, 987 (2006).

[22] C. G. Arges, *The Electrochemical Society Interface*, 19, 31 (2010).

[23] B. Y. S. Lin, D. W. Kirk and S. J. Thorpe, *J. Power Sources*, 161, 474 (2006).

[24] J. R. Varcoe and R. C. T. Slade, *Fuel Cells*, 5, 187 (2005).

[25] Q. A. Zhang, Q. F. Zhang, J. H. Wang, S. B. Zhang and S. H. Li, *Polymer*, 51, 5407 (2010).

[26] V. V. Shevchenko and M. A. Gumennaya, *Theor. Exp. Chem.*, 46, 139 (2010).

[27] M. R. Hibbs, M. A. Hickner, T. M. Alam, S. K. McIntyre, C. H. Fujimoto and C. J. Cornelius, *Chem Mater*, 20, 2566 (2008).

[28] D. P. Tang, J. Pan, S. F. Lu, L. Zhuang and J. T. Lu, *Sci. China-Chem.*, 53, 357 (2010).

[29] S. Gu, R. Cai, T. Luo, Z. W. Chen, M. W. Sun, Y. Liu, G. H. He and Y. S. Van, *Angew. Chem.-Int. Edit.*, 48, 6499 (2009).

[30] S. Gu, R. Cai, T. Luo, K. Jensen, C. Contreras and Y. S. Van, *ChemSusChem*, 3, 555 (2010).

[31] S. Gu, R. Cai and Y. S. Van, *Chem. Commun.*, 47, 2856 (2011).

[32] J. H. Wang, S. H. Li and S. B. Zhang, *Macromolecules*, 43, 3890 (2010).

[33] J. Pan, S. F. Lu, Y. Li, A. B. Huang, L. Zhuang and J. T. Lu, *Adv. Funct. Mater.*, 20, 312 (2010).

[34] G. G. Wang, Y. M. Weng, D. Chu, R. R. Chen and D. Xie, *J. Membr. Sci.*, 332, 63 (2009).

[35] J. F. Zhou, M. Unlu, J. A. Vega and P. A. Kohl, *J Power Sources*, 190, 285 (2009).

[36] M. Tanaka, M. Koike, K. Miyatake and M. Watanabe, *Macromolecules*, 43, 2657 (2010).

[37] Q. A. Zhang, S. H. Li and S. B. Zhang, *Chem. Commun.*, 46, 7495 (2010).

[38] Z. Zhao, J. H. Wang, S. H. Li and S. B. Zhang, *J. Power Sources*, 196, 4445 (2011).

[39] J. H. Wang, J. Wang, S. H. Li and S. B. Zhang, *J. Membr. Sci.*, 368, 246 (2011).

[40] J. L. Van and M. A. Hickner, *Macromolecules*, 43, 2349 (2010).

[41] M. Tanaka, M. Koike, K. Miyatake and M. Watanabe, *Polym. Chem.*, 2, 99 (2011).

[42] M. R. Hibbs, C. H. Fujimoto and C. J. Cornelius, *Macromolecules*, 42, 8316 (2009).

[43] J. Choi, K. M. Lee, R. Wycisk, P. N. Pintauro and P. T. Mather, *Abstr. Pap. Am. Chem. Soc.*, 237, 99 (2009).

[44] J. B. Ballengee, P. N. Pintauro, *Adv. Funct. Mater.*, In Press (2011).

[45] J. B. Ballengee, P. N. Pintauro, ECS Trans. In Press (2011).

[46] E. Avram, E. Butuc, C. Luca and 1. Druta, *J. Macromol. Sci.l-Pure Appl. Chem.*, A34, 1701 (1997).

[47] Grot, W. G.; Rajendran, G., U.S. Pat. No. 5,919,583. 1999.

[48] Tang, H.; Peikang, S.; Jiang, S. P.; Wang, F.; Pan, M., *Journal of Power Sources* 2007, 170, (1), 85-92.

[49] Huang, X. Y.; Solasi, R.; Zou, Y.; Feshler, M.; Reifsnider, K.; Condit, D.; Burlatsky, S.; Madden, T., *Journal of Polymer Science Part B-Polymer Physics* 2006, 44, (16), 2346-2357.

[50] Wu, J.; Yuan, X. Z.; Martin, J. J.; Wang, H.; Zhang, J.; Shen, J.; Wu, S.; Merida, W., *Journal of Power Sources* 2008, 184, (1), 104-119.

[51] Kusoglu, A.; Karlsson, A. M.; Santare, M. H.; Cleghorn, S.; Johnson, W. B., *Journal of Power Sources* 2006, 161, (2), 987-996.

[52] Patil, Y. P.; Jarrett, W. L.; Mauritz, K. A., *Journal of Membrane Science* In Press, Corrected Proof.

[53] Kundu, S.; Simon, L. C.; Fowler, M.; Grot, S., *Polymer* 2005, 46, (25), 11707-11715.

[54] Kusoglu, A.; Karlsson, A. M.; Santare, M. H.; Cleghorn, S.; Johnson, W. B., *Journal of Power Sources* 2007, 170, (2), 345-358.

[55] Bauer, F.; Denneler, S.; Willert-Porada, M., *Journal of Polymer Science Part B: Polymer Physics* 2005, 43, (7), 786-795.

[56] Sethuraman, V. A.; Weidner, J. W.; Haug, A. T.; Protsailo, L. V., In ECS: 2008; Vol. 155, pp B119-B124.

[57] Kerres, J. A., *Fuel Cells* 2005, 5, (2), 230-247.

[58] Taylor, E. P.; Landis, F. A.; Page, K. A.; Moore, R. B., *Polymer* 2006, 47, (21), 7425-7435.

[59] Landis, F. A.; Moore, R. B., *Macromolecules* 2000, 33, (16), 6031-6041.

[60] Kyu, T.; Yang, J. C., *Macromolecules* 1990, 23, (1), 176-182.

[61] Yang, J. C.; Kyu, T., *Macromolecules* 1990, 23, (1), 182-186.
[62] Song, M.-K.; Kim, Y.-T.; Fenton, J. M.; Kunz, H. R.; Rhee, H.-W., *Journal of Power Sources* 2003, 117, (1-2), 14-21.
[63] Kolde, J. A.; Bahar, B.; Wilson, M. S.; Zawodzinski, T. A.; Gottesfeld, S., *Electrochemical Society Proceedings* 1995, 95-23, 193-201.
[64] Choi, J.; Lee, K. M.; Wycisk, R.; Pintauro, P. N.; Mather, P. T., *Macromolecules* 2008, 41, (13), 4569-4572.
[65] Choi, J.; Lee, K. M.; Wycisk, R.; Pintauro, P. N.; Mather, P. T., *Journal of the Electrochemical Society* 2010, 157, (6), B914-B919.
[66] Choi, J.; Lee, K. M.; Wycisk, R.; Pintauro, P. N.; Mather, P. T., *Journal of Materials Chemistry* 2010, 20, (30), 6282-6290.
[67] Choi, J.; Wycisk, R.; Zhang, W. J.; Pintauro, P. N.; Lee, K. M.; Mather, P. T., *Chemsuschem* 2010, 3, (11), 1245-1248.
[68] Lee, K. M.; Choi, J.; Wycisk, R.; Pintauro, P. N.; Mather, P., In ECS: 2009; Vol. 25, pp 1451-1458.
[69] Muldoon, J.; Lin, J.; Wycisk, R.; Takeuchi, N.; Hamaguchi, H.; Saito, T.; Hase, K.; Stewart, F. F.; Pintauro, P. N., *Fuel Cells* 2009, 9, (5), 518-521.
[70] Chen, H.; Snyder, J. D.; Elabd, Y. A., *Macromolecules* 2008, 41, (1), 128-135.
[71] Laforgue, A.; Robitaille, L.; Mokrini, A.; Ajji, A., *Macromolecular Materials and Engineering* 2007, 292, (12), 1229-1236.
[72] Zhou, C. S.; Liu, Z.; Dai, 1. Y.; Xiao, D., *Analyst* 2010, 135, (5), 1004-1009.
[73] Ballengee, J. B.; Pintauro, P. N., *Journal of the Electrochemical Society* 2011, 158, (5), B568-B572.
[74] Osborn, S. J.; Hassan, M. K.; Divoux, G. M.; Rhoades, D. W.; Mauritz, K. A.; Moore, R. B., *Macromolecules* 2007, 40, (10), 3886-3890.
[75] Page, K. A.; Landis, F. A.; Phillips, A. K.; Moore, R. B., *Macromolecules* 2006, 39, (11), 3939-3946.
[76] Dong, B.; Gwee, L.; Salas-de la Cruz, D.; Winey, K. 1.; Elabd, Y. A, Nano *Letters* 2010, 10, (9), 3785-3790.
[77] McLachlan, D. S.; Blaszkiewicz, M.; Newnham, R, *Journal of the American Ceramic Society,* 1990, 73, (8), 2187-2203.
[78] Lin, J.; Lee, J. K.; Kellner, M.; Wycisk, R; Pintauro, P. N., *Journal of the Electrochemical Society* 2006, 153, (7), A1325-A1331.
[79] Cleghorn, S.; Kolde, J.; Liu, W., *Handbook of Fuel Cells—Fundamentrals, Technology and Applications*, Vielstich, W.; Lamm, A.; Gasteiger, H. A, Eds. John Wiley & Sons, Ltd: Chichester, 2003; Vol. 3, PP 566-575.
[80] Tang, Y. L.; Karlsson, A M.; Santare, M. H.; Gilbert, M.; Cleghorn, S.; Johnson, W. B., *Materials Science and Engineering a-Structural Materials Properties Microstructure and Processing* 2006, 425, (1-2), 297-304.
[81] de Bruijn, F. A; Dam, V. A. T.; Janssen, G. J. M., *Fuel Cells* 2008, 8, (1), 3-22.

What is claimed is:

1. A method of fabricating a composite membrane, comprising:
   forming one or more first-type polymer solutions from one or more first-type polymers and one or more second-type polymer solutions from one or more second-type polymers, respectively, wherein each of the one or more first-type polymers comprises a charged polymer and each of the one or more second-type polymers comprises a uncharged or minimally charged polymer;
   electrospinning, separately and simultaneously, the one or more first-type polymer solutions and the one or more second-type polymer solutions to form a dual or multi fiber mat of one or more first-type polymer fibers and one or more second-type polymer fibers; and
   processing the dual or multi fiber mat by softening and flowing at least one of the one or more first-type polymer fibers to fill in the void space between the one or more second-types polymer fibers, or by softening and flowing at least one of the one or more second-type polymer fibers to fill in the void space between the one or more first-types polymer fibers, so as to form the composite membrane.

2. The method of claim 1, wherein the composite membrane is a multilayered composite membrane in which relative amounts of the first-type polymer fibers and the softened and flown second-type polymer matrix, or relative amounts of second-type polymer fibers and the softened and flown first-type polymer matrix, vary in a thickness direction of the composite membrane.

3. The method of claim 2, wherein the relative amounts vary in a step function or a continuous gradient function in the thickness direction of the composite membrane.

4. The method of claim 1, wherein processing the dual or multi fiber mat by softening and flowing at least one of the one or more first-type polymer fibers comprises:
   compressing the dual or multi fiber mat; and
   thermal annealing the dual or multi fiber mat to soften and flow at least one of the one or more first-type polymer fibers to fill in the void space between the one or more second-type polymer fibers.

5. The method of claim 1, wherein processing of the dual or multi fiber mat by softening and flowing at least one of the one or more second-type polymer fibers comprises:
   compressing the dual or multi fiber mat; and
   exposing the dual or multi fiber mat to solvent vapor to soften and flow at least one of the one or more second-type polymer fibers to fill in the void space between the one or more first-type polymer fibers.

6. The method of claim 5, wherein processing the dual or multi fiber mat by softening and flowing the at least one of the one or more second-type polymer fibers further comprises:
   thermal annealing the dual or multi fiber mat.

7. The method of claim 5, wherein the processing of the dual or multi fiber mat comprises crosslinking the first-type polymers in the one or more first-type polymer fibers.

8. The method of claim 1, wherein the one or more first-type polymers comprise a polyelectrolyte, and the one or more second-type polymers comprise an uncharged or minimally charged polymer.

9. A fuel cell comprising at least one composite membrane fabricated by the method of claim 1.

10. A composite membrane, comprising:
   a fiber network, formed from a dual or multi fiber mat of one or more first-type polymer fibers and one or more second-type polymer fibers; and
   a polymer matrix encompassing the fiber network, wherein the polymer matrix is formed by softening and flowing at least one of the one or more of the first-type polymer fibers of the dual or multi fiber mat to fill in the void space between the one or more second-type polymer fibers of the dual or multi fiber mat, or by softening and flowing at least one of the one or more of the second-type polymer fibers of the dual or multi fiber mat to fill in the void space between the one or more first-type polymer fibers of the dual or multi fiber mat, wherein the one or more first-type polymer fibers are formed by a first polymer, and the one or more second-type polymer fibers are formed by a second polymer different from the first polymer, and wherein the one or more first-type polymer fibers are charged polymer fibers or charged polymer precursor fibers, and the one or more second-type polymer fibers are uncharged polymer fibers.

11. The composite membrane of claim 10, wherein the composite membrane contains nanofibers.

12. The composite membrane of claim 10, wherein the composite membrane is a proton exchange membrane (PEM), or an anion exchange membrane (AEM).

13. The composite membrane of claim 10, wherein the composite membrane has a multilayer structure, and relative amounts of the first-type polymer fibers and the softened and flown second-type polymer matrix, or relative amounts of second-type polymer fibers and the softened and flown first-type polymer matrix, vary in a thickness direction that is perpendicular to the membrane surface of the composite membrane.

14. The composite membrane of claim 13, wherein the relative amounts vary in a step function or a continuous gradient function in the thickness direction of the composite membrane.

15. The composite membrane of claim 10, wherein the one or more first-type polymer fibers comprise polyelectrolyte fibers, and the one or more second-type polymer fibers comprise uncharged or minimally charged polymer fibers.

16. The composite membrane of claim 15, being formed by electrospinning one or more polyelectrolyte solutions and one or more uncharged or minimally charged polymer solutions.

17. The composite membrane of claim 16, wherein the one or more polyelectrolyte solutions contain one or more polyelectrolytes, one or more polyelectrolyte precursors, or a combination thereof.

18. The composite membrane of claim 15, being formed by electrospinning one or more polyelectrolyte precursors and one or more uncharged or minimally charged polymers.

19. The composite membrane of claim 15, wherein one or more of the polyelectrolytes or polyelectrolyte precursors are crosslinked in the fibers.

20. A fuel cell comprising at least one composite membrane of claim 10.

* * * * *